US006854177B2

(12) United States Patent
Hoffa

(10) Patent No.: US 6,854,177 B2
(45) Date of Patent: Feb. 15, 2005

(54) APPARATUS FOR PROCESSING WIRE

(75) Inventor: Jack L. Hoffa, Brea, CA (US)

(73) Assignee: Eubanks Engineering Co., Monrovia, CA (US)

( * ) Notice: Subject to any disclaimer, the term of this patent is extended or adjusted under 35 U.S.C. 154(b) by 11 days.

(21) Appl. No.: 10/044,657

(22) Filed: Jan. 8, 2002

(65) Prior Publication Data

US 2002/0059720 A1 May 23, 2002

Related U.S. Application Data

(63) Continuation of application No. 09/494,461, filed on Jan. 31, 2000, now Pat. No. 6,336,267, which is a division of application No. 09/320,096, filed on May 26, 1999, now Pat. No. 6,272,740, which is a continuation of application No. 08/845,065, filed on Apr. 21, 1997, now Pat. No. 5,937,511, which is a continuation of application No. 08/353,352, filed on Dec. 2, 1994, now Pat. No. 5,664,324, which is a continuation-in-part of application No. 08/022,981, filed on Feb. 25, 1993, now Pat. No. 5,375,485, which is a continuation-in-part of application No. 07/857,972, filed on Mar. 26, 1992, now Pat. No. 5,293,683, which is a division of application No. 07/765,986, filed on Sep. 29, 1991, now Pat. No. 5,253,555, which is a continuation-in-part of application No. 07/659,557, filed on Feb. 22, 1991, now abandoned, which is a continuation-in-part of application No. 07/611,057, filed on Nov. 9, 1990, now Pat. No. 5,146,673, and a continuation-in-part of application No. 08/148,568, filed on Nov. 8, 1993, now Pat. No. 5,469,763, which is a continuation-in-part of application No. 08/022,981, filed on Feb. 25, 1993, now Pat. No. 5,375,485, which is a continuation-in-part of application No. 07/857,972, filed on Mar. 26, 1992, now Pat. No. 5,293,683, which is a division of application No. 07/765,986, filed on Sep. 26, 1991, now Pat. No. 5,253,555, which is a continuation-in-part of application No. 07/659,557, filed on Feb. 22, 1991, now abandoned, which is a continuation-in-part of application No. 07/611,057, filed on Nov. 9, 1990, now Pat. No. 5,146,673.

(51) Int. Cl.[7] .............................................. B23P 19/00
(52) U.S. Cl. ......................... 29/745; 748/755; 748/728; 748/825; 748/33 M; 81/9.51
(58) Field of Search .................................. 29/745, 33 M, 29/728, 748, 564.4, 828, 747; 81/9.51, 9.44, 9.42; 198/345.1, 626; 83/71, 151, 373

(56) References Cited

U.S. PATENT DOCUMENTS

| 1,433,320 A | 10/1922 | Wersel |
| 1,477,678 A | 12/1923 | Wetmore |
| 2,523,936 A | 9/1950 | Axelsen |
| 2,645,959 A | 7/1953 | Fuchs et al. |
| 2,671,363 A | 3/1954 | Wells |

(List continued on next page.)

FOREIGN PATENT DOCUMENTS

| DE | 1084799 | 7/1960 |

(List continued on next page.)

OTHER PUBLICATIONS

Standard Logic Catalogue, "DWS–6K Electronic Wire Stripper", , Feb. 1974.

(List continued on next page.)

Primary Examiner—Minh Trinh
(74) Attorney, Agent, or Firm—William W. Haefliger

(57) ABSTRACT

An apparatus for processing wire to cut the wire into sections and to expose section wire ends, the wire having an inner core and sheathing about the core, the apparatus including structure for displacing the wire axially endwise comprising multiple blade structures, including at least two of the structures that move adjacent one another as the two structure move relatively oppositely toward and away from the axis in directions generally normal to the axis; each of the two structures having first and second cutting edges; the cutting edges configured such that, when the two the structures are moved relatively longitudinally in a primary mode, two of the cutting edges cut through the wire, and when the two structures are moved relatively longitudinally in a second mode, the remaining two of the cutting edges cut into the wire sheathing to enable stripping of the sheathing of the wire.

11 Claims, 41 Drawing Sheets

U.S. PATENT DOCUMENTS

| | | | |
|---|---|---|---|
| 2,722,145 A | 11/1955 | Schulenburg | |
| 2,765,685 A | 10/1956 | Stratman et al. | |
| 2,811,063 A | 10/1957 | Eubanks | |
| 2,880,635 A | 4/1959 | Harris | |
| 2,934,982 A | 5/1960 | Eubanks | |
| 3,176,550 A | 4/1965 | Marcotte | |
| 3,222,957 A | 12/1965 | Kramer et al. | |
| 3,251,253 A | 5/1966 | Eubanks | |
| 3,292,462 A | 12/1966 | Turecek et al. | |
| 3,309,948 A | 3/1967 | Falken | |
| 3,368,428 A | 2/1968 | Gudmestad | |
| 3,376,627 A | 4/1968 | Sitz | |
| 3,479,718 A | 11/1969 | Van De Kerkhof et al. | |
| 3,552,449 A | 1/1971 | Woodward | |
| 3,570,100 A | 3/1971 | Kindell et al. | |
| 3,604,291 A | 9/1971 | Weidner | |
| 3,612,111 A * | 10/1971 | Meyer | 81/9.51 |
| 3,614,905 A | 10/1971 | Bieganski | |
| 3,645,156 A | 2/1972 | Meyer et al. | |
| 3,653,412 A | 4/1972 | Gudmestad | |
| 3,701,301 A | 10/1972 | Gudmestad | |
| 3,769,681 A | 11/1973 | Eubanks | |
| 3,795,159 A | 3/1974 | Steiner et al. | |
| 3,838,612 A | 10/1974 | Inami | |
| 3,857,306 A | 12/1974 | Gudmestad | |
| 3,857,313 A | 12/1974 | Endo | |
| 3,869,781 A | 3/1975 | Eubanks et al. | |
| 3,872,584 A | 3/1975 | Chick et al. | |
| 3,881,374 A | 5/1975 | Gudmestad | |
| 3,918,330 A | 11/1975 | Blaha | |
| 3,921,472 A | 11/1975 | Gudmestad et al. | |
| 3,927,590 A | 12/1975 | Gudmestad et al. | |
| 3,942,221 A * | 3/1976 | Sipusic et al. | 452/29 |
| 3,951,016 A | 4/1976 | Gudmestad et al. | |
| 4,009,738 A | 3/1977 | Baba et al. | |
| 4,027,557 A | 6/1977 | Stepan | |
| 4,091,695 A | 5/1978 | Funcik et al. | |
| 4,112,791 A | 9/1978 | Wiener | |
| 4,156,961 A | 6/1979 | Agoh | |
| 4,164,808 A | 8/1979 | Gudmestad et al. | |
| 4,165,768 A | 8/1979 | Gudmestad | |
| 4,166,315 A | 9/1979 | Gudmestad et al. | |
| 4,175,316 A | 11/1979 | Gudmestad | |
| 4,194,281 A | 3/1980 | Gudmestad | |
| 4,238,981 A | 12/1980 | Karl | |
| 4,244,101 A | 1/1981 | Talley | |
| 4,261,230 A | 4/1981 | Sindelar | |
| 4,266,455 A | 5/1981 | Ago | |
| 4,275,619 A | 6/1981 | Shimizu | |
| 4,327,609 A | 5/1982 | Resch | |
| 4,350,061 A | 9/1982 | Isham et al. | |
| 4,364,289 A | 12/1982 | Sorensen | |
| 4,370,786 A | 2/1983 | Butler | |
| 4,403,383 A | 9/1983 | Dewhurst et al. | |
| 4,428,114 A | 1/1984 | Teagno | |
| 4,446,615 A | 5/1984 | Talley | |
| 4,493,233 A | 1/1985 | Dusel et al. | |
| 4,502,586 A | 3/1985 | Dusel et al. | |
| 4,521,946 A | 6/1985 | Dusel et al. | |
| 4,543,717 A | 10/1985 | Luka | |
| 4,581,796 A | 4/1986 | Fukuda et al. | |
| 4,584,912 A | 4/1986 | Gudmestad et al. | |
| 4,597,179 A | 7/1986 | Goforth | |
| 4,601,093 A | 7/1986 | Cope | |
| 4,631,822 A | 12/1986 | Reinertz | |
| 4,638,558 A | 1/1987 | Eaton | |
| 4,663,822 A | 5/1987 | Blaha et al. | |
| 4,699,027 A | 10/1987 | Guyette et al. | |
| 4,713,880 A | 12/1987 | Dusel et al. | |
| 4,739,019 A | 4/1988 | Schappert et al. | |
| 4,745,828 A | 5/1988 | Stepan | |
| 4,802,512 A | 2/1989 | Kodera | |
| 4,827,592 A | 5/1989 | Kodera | |
| 4,833,778 A | 5/1989 | Loustau | |
| 4,838,129 A | 6/1989 | Cope | |
| 4,852,433 A | 8/1989 | Butler | |
| 4,869,135 A | 9/1989 | Hoffa | |
| 4,932,110 A | 6/1990 | Tanaka | |
| 4,942,789 A | 7/1990 | Hoffa et al. | |
| 5,016,347 A | 5/1991 | Okazaki et al. | |
| 5,067,379 A | 11/1991 | Butler et al. | |
| 5,109,598 A | 5/1992 | Koch | |
| 5,142,950 A | 9/1992 | Takano et al. | |
| 5,146,673 A * | 9/1992 | Hoffa | |
| 5,188,213 A | 2/1993 | Koch | |
| 5,199,328 A * | 4/1993 | Hoffa | |
| 5,235,735 A | 8/1993 | Koch | |
| 5,253,555 A * | 10/1993 | Hoffa | 81/9.51 |
| 5,285,502 A * | 2/1994 | Walton et al. | 81/9.51 |
| 5,285,569 A * | 2/1994 | Hoffa | 29/825 |
| 5,293,683 A * | 3/1994 | Hoffa | |
| 5,297,457 A * | 3/1994 | Hoffa | |
| 5,343,605 A * | 9/1994 | Nazerian et al. | 29/825 X |
| 5,368,212 A | 11/1994 | Koch | |
| 5,375,485 A * | 12/1994 | Hoffa | 29/825 X |
| 5,402,693 A * | 4/1995 | Hoffa | 81/9.51 |
| 5,412,856 A * | 5/1995 | Nazerian et al. | 29/825 X |
| 5,445,051 A | 8/1995 | Carpenter et al. | |
| 5,456,148 A * | 10/1995 | Hoffa | 81/9.51 X |
| 5,469,763 A * | 11/1995 | Hoffa | |
| 5,515,602 A * | 5/1996 | Hoffa | 29/825 |
| 5,517,882 A * | 5/1996 | Hoffa | 81/9.51 |
| 5,526,718 A * | 6/1996 | Hoffa | 81/9.51 |
| 5,528,962 A * | 6/1996 | Hoffa | 29/825 X |
| 5,539,967 A * | 7/1996 | Nazerian et al. | 29/825 X |
| 5,630,341 A * | 5/1997 | Hoffa | 29/825 X |
| 5,653,016 A * | 8/1997 | Hoffa | 29/825 |
| 5,664,324 A * | 9/1997 | Hoffa | 29/825 |
| 6,272,740 B1 * | 8/2001 | Hoffa et al. | 29/825 |

FOREIGN PATENT DOCUMENTS

| | | |
|---|---|---|
| DE | 2927235 | 8/1980 |
| DE | 0423443 | 7/1990 |
| DE | 3926782 | 12/1990 |
| FR | 2525402 | 4/1982 |
| FR | 2525403 | 7/1984 |
| FR | 2513478 | 2/1985 |
| GB | 609834 | 10/1948 |
| JP | 51-13869 | 5/1976 |
| JP | 54118584 | 9/1979 |
| SU | 1216815 | 3/1986 |
| SU | 1293779 | 2/1987 |

OTHER PUBLICATIONS

Artos Catalog Sheet, "Single Blade, Fully Automatic Wire Processing", 1989.
Komax 33 Catalogue Sheet, 1988.
Eubanks Model 83 Cable Stripper.
Copies of three photographs of the Eubanks Model 83 Heavy Cable Stripper and its belt drive assembly, pp. 1–3.
A copy of a photograph of a Eubanks prefeed that includes a belt drive assembly for feeding wire, p. 4.
The Operating and Maintenance Instructions for the Eubanks Model 83 Heavy Cable Stripper, pp. 5–41.
The two–page data sheet on the Eubanks Model 5900 Precision Wire and Cable Cutter, p. 42.
A copy of the two–page data sheet on the Hodosy AG Model PF–110 Prefeeder, p. 43.

* cited by examiner

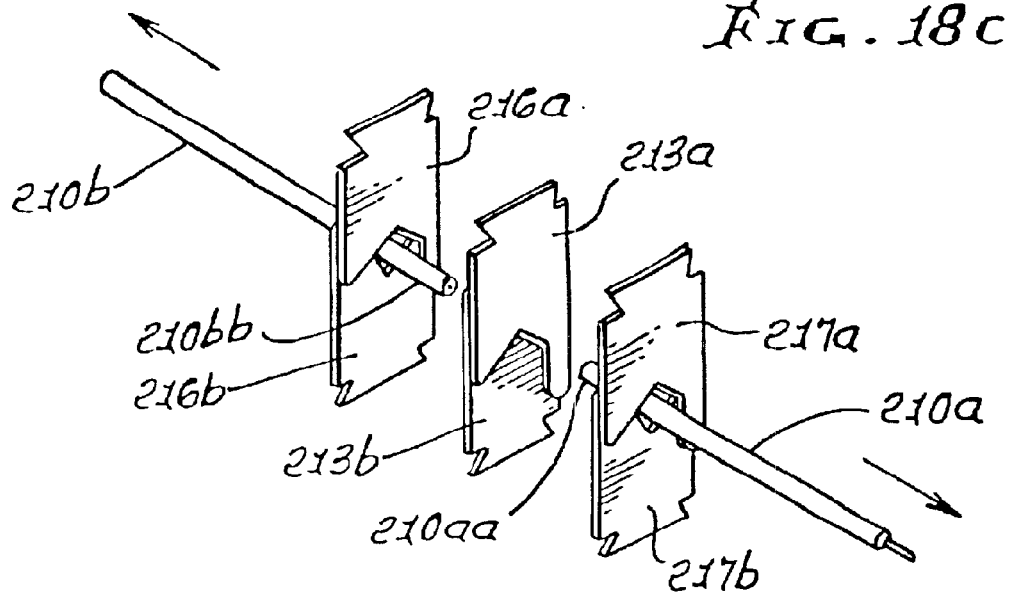
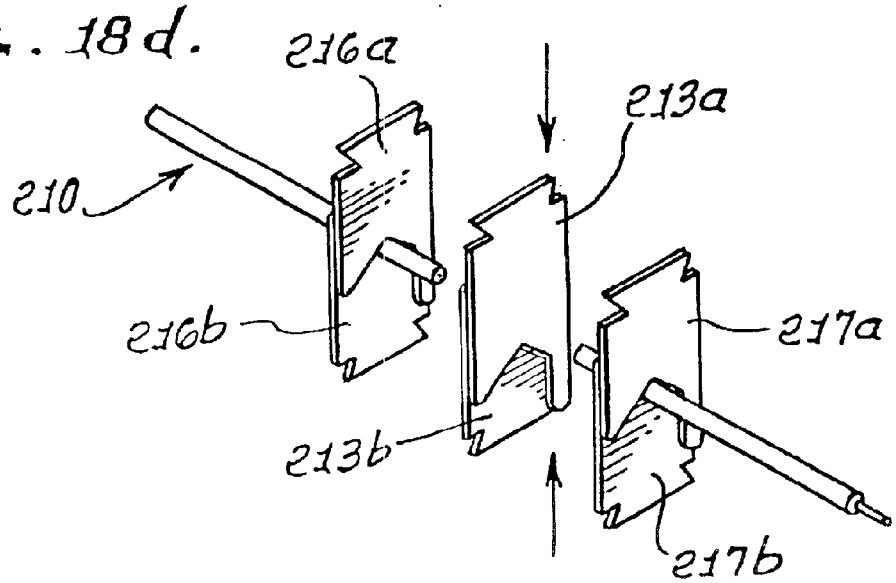

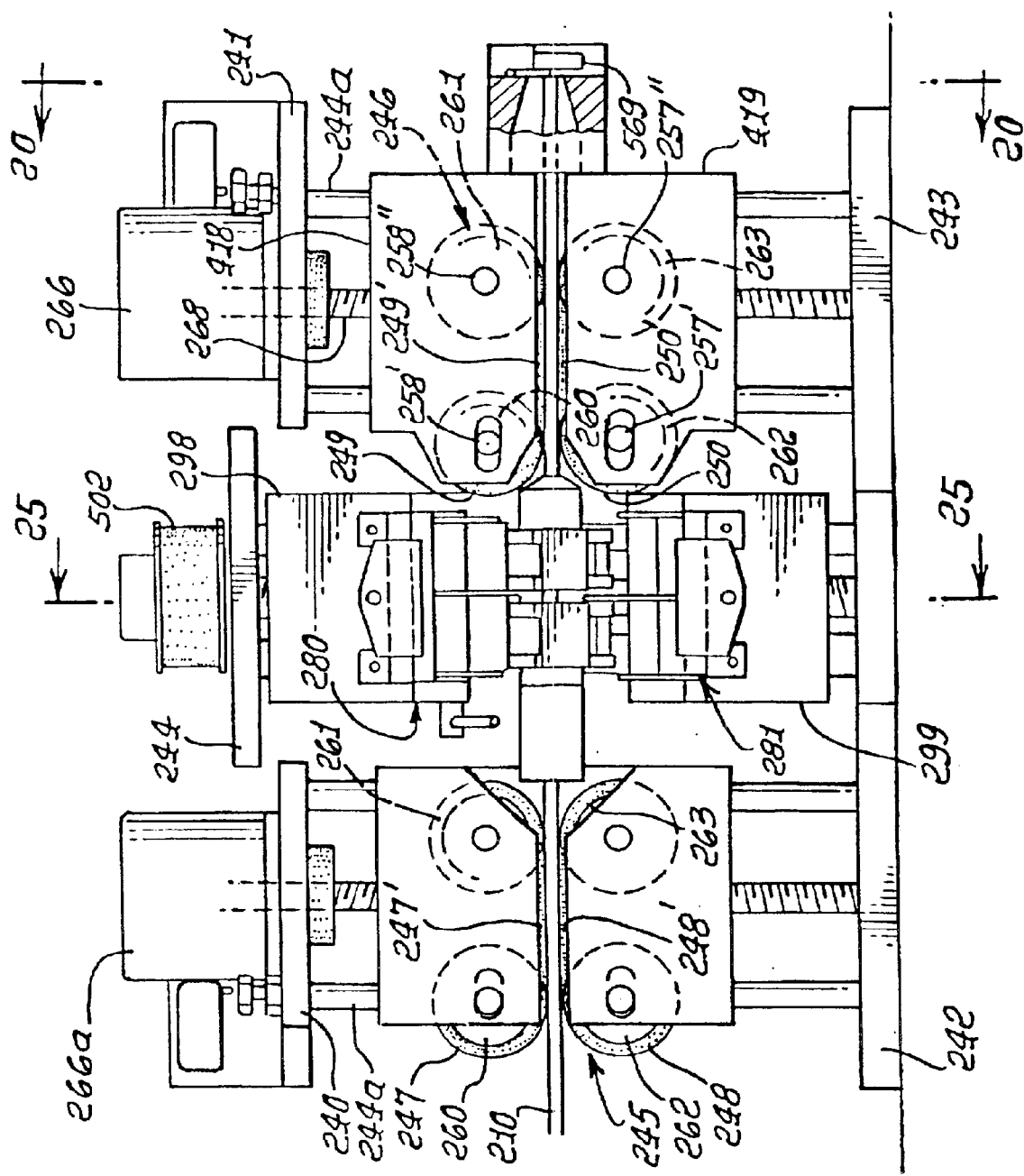

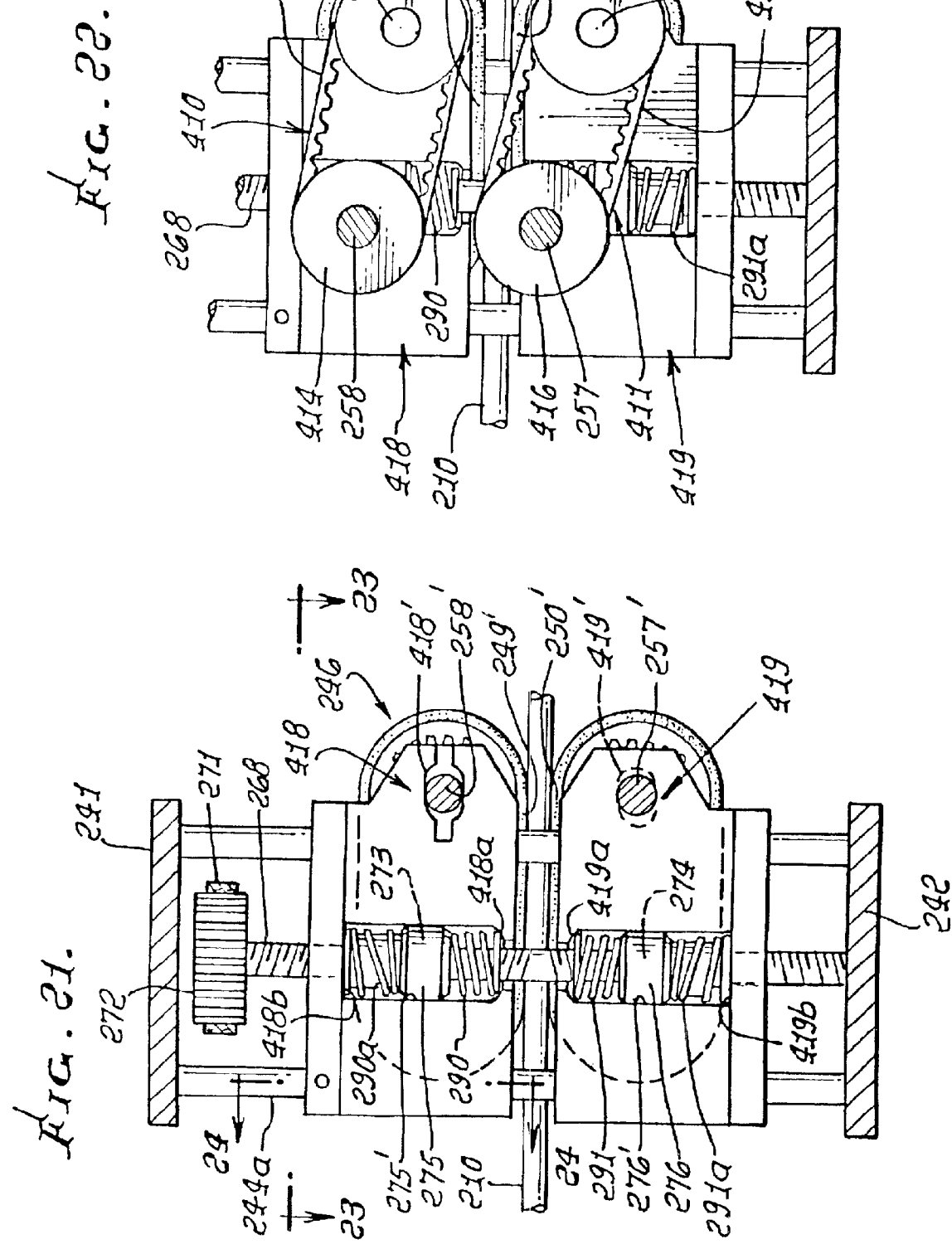

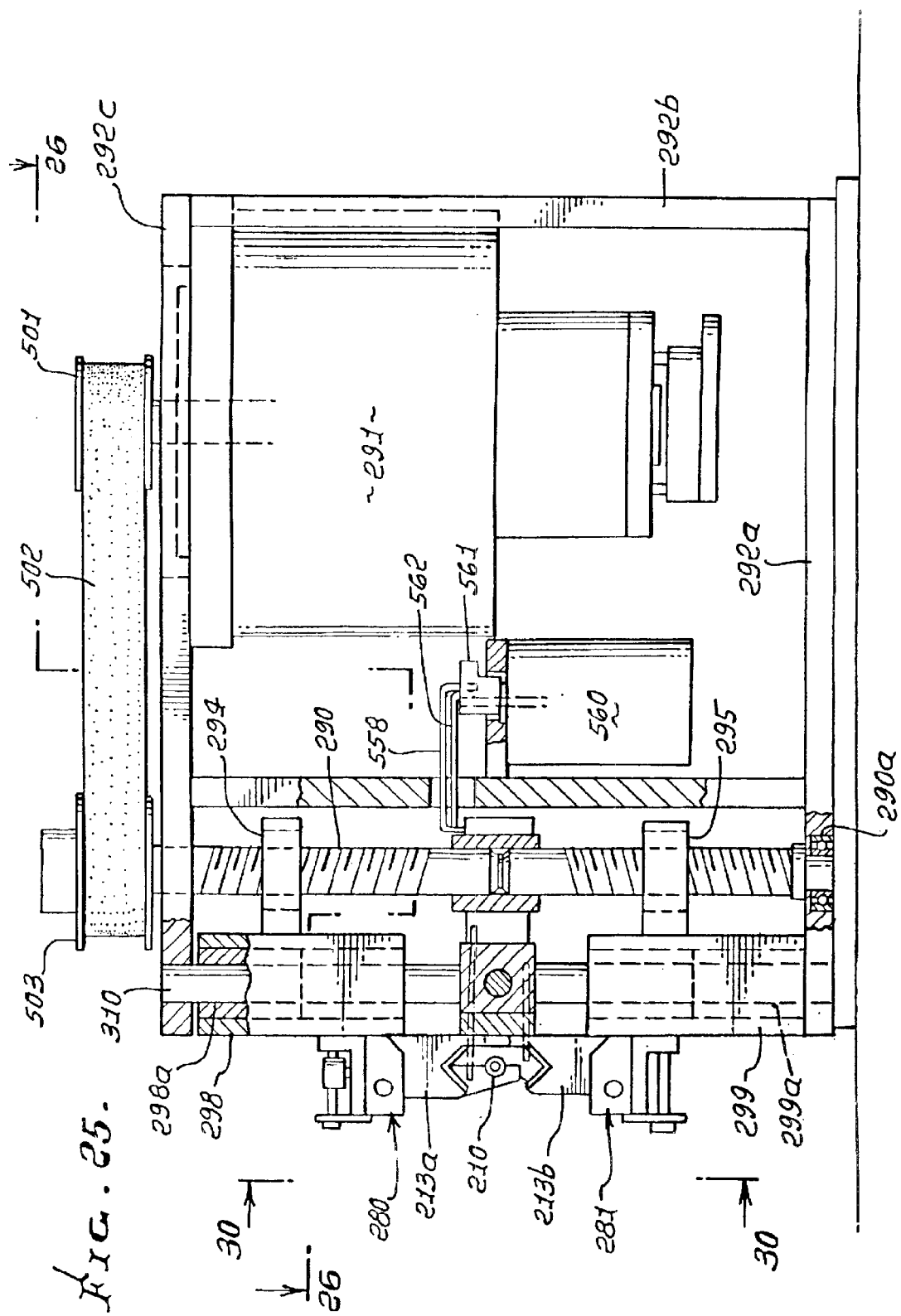

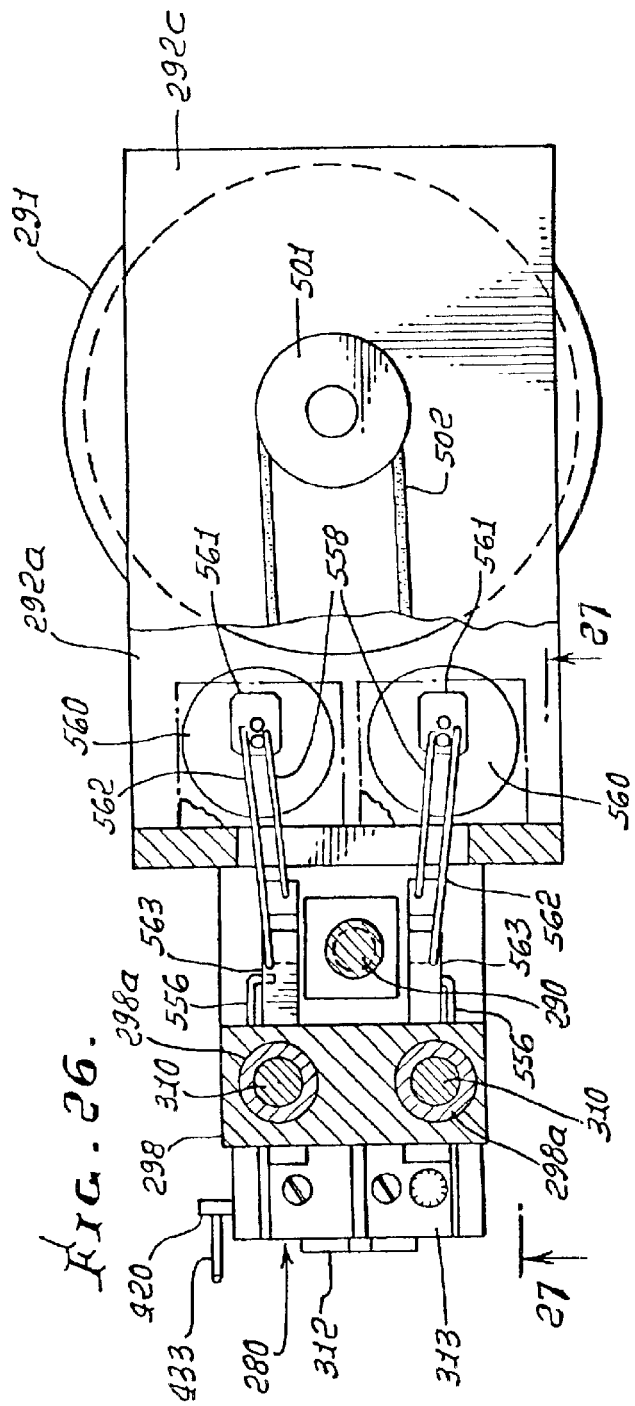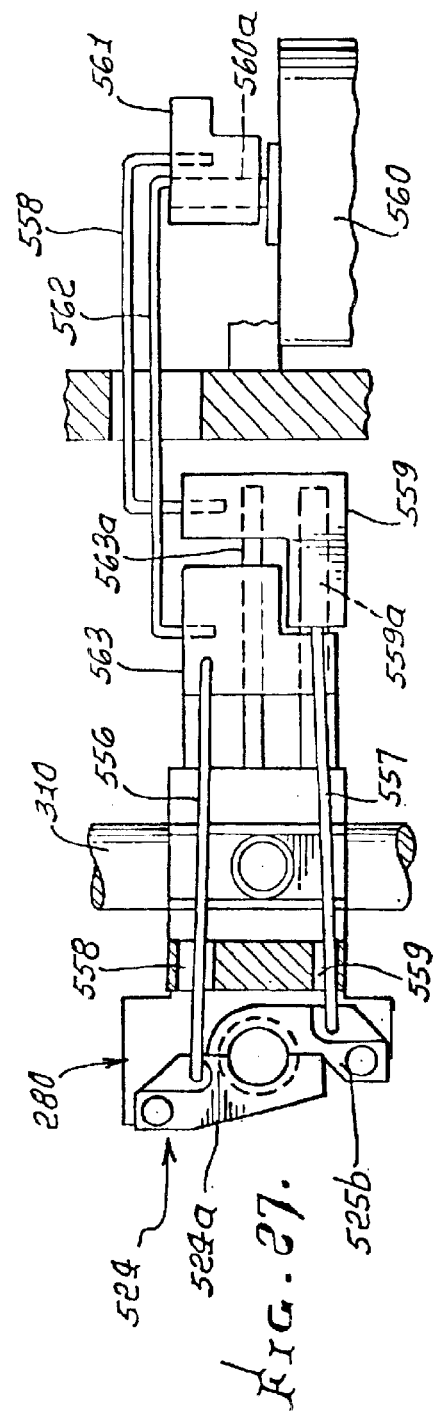

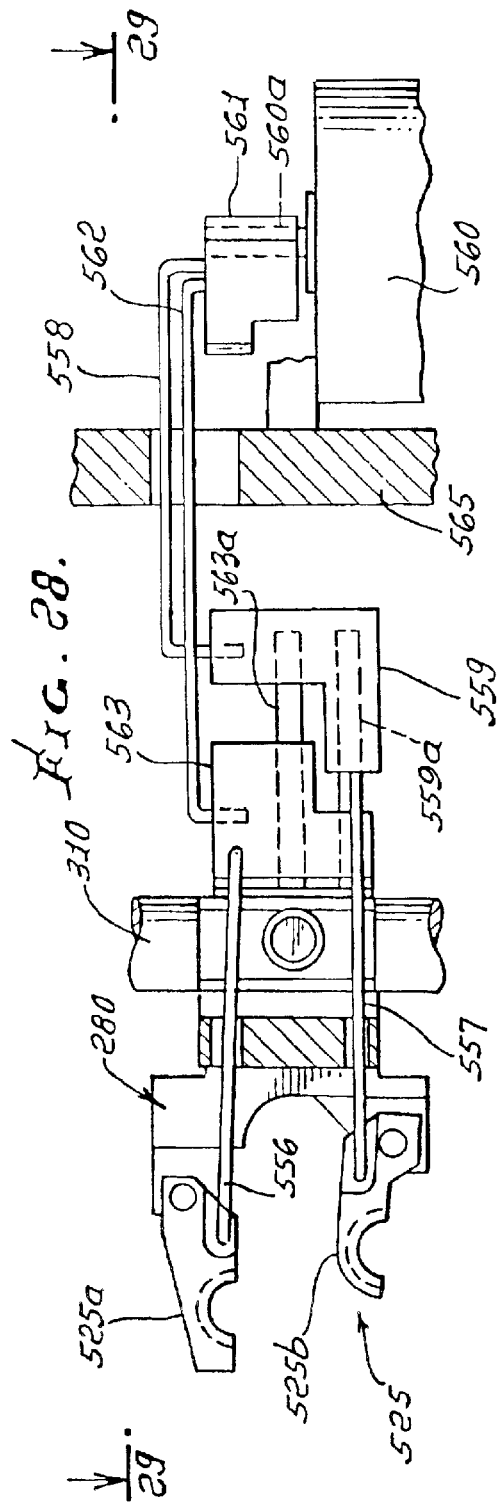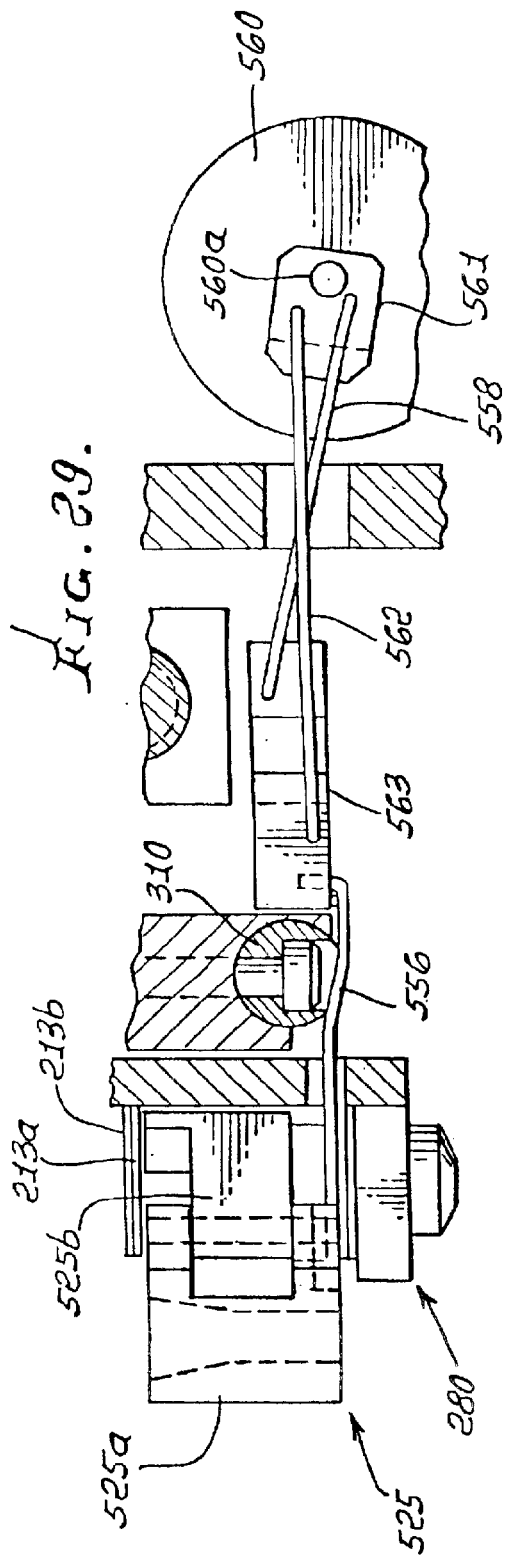

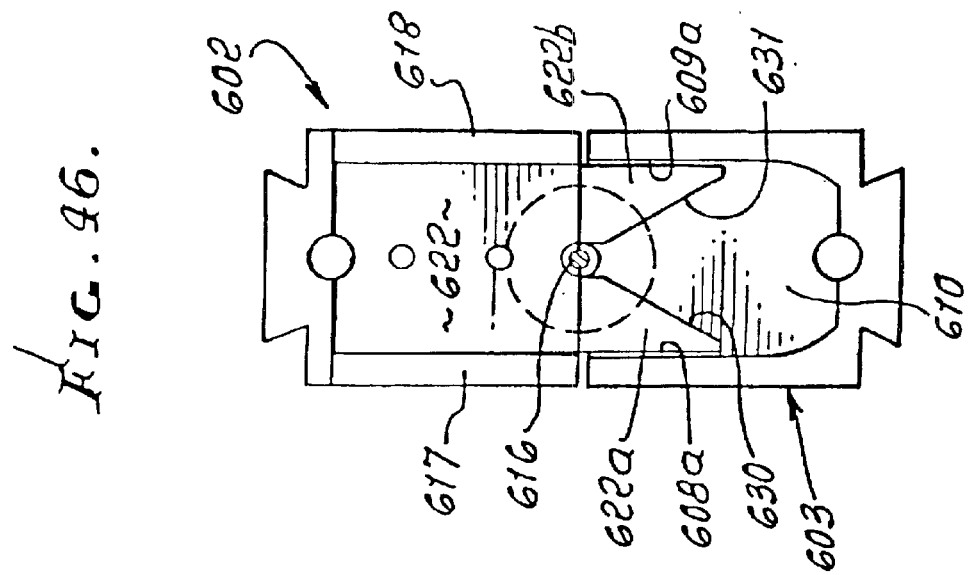
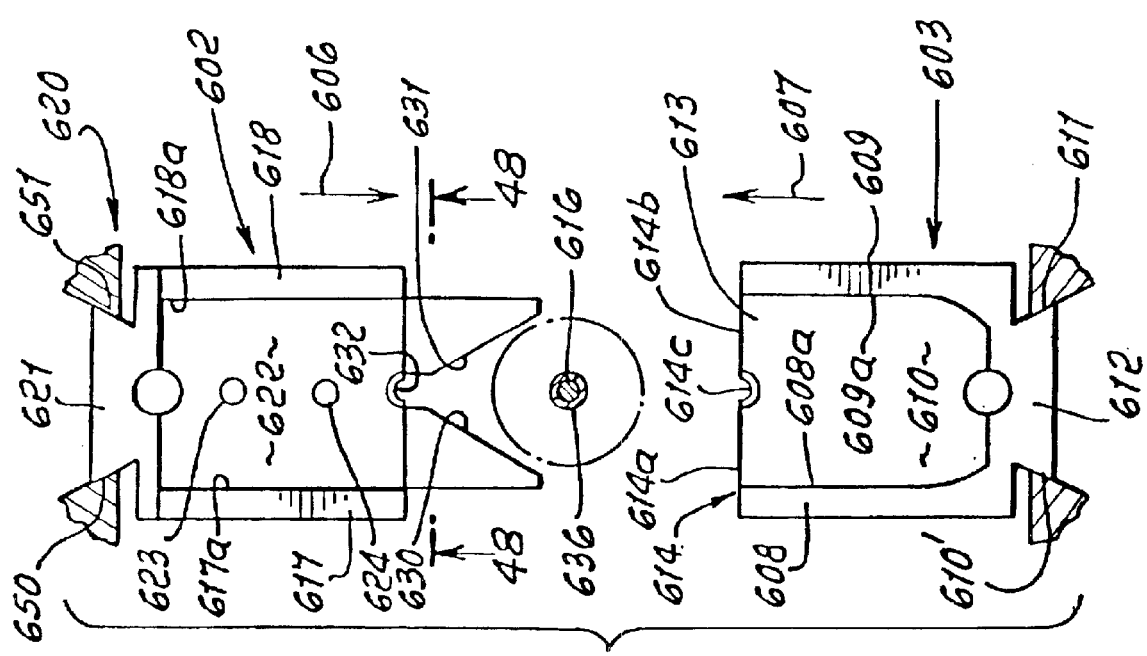

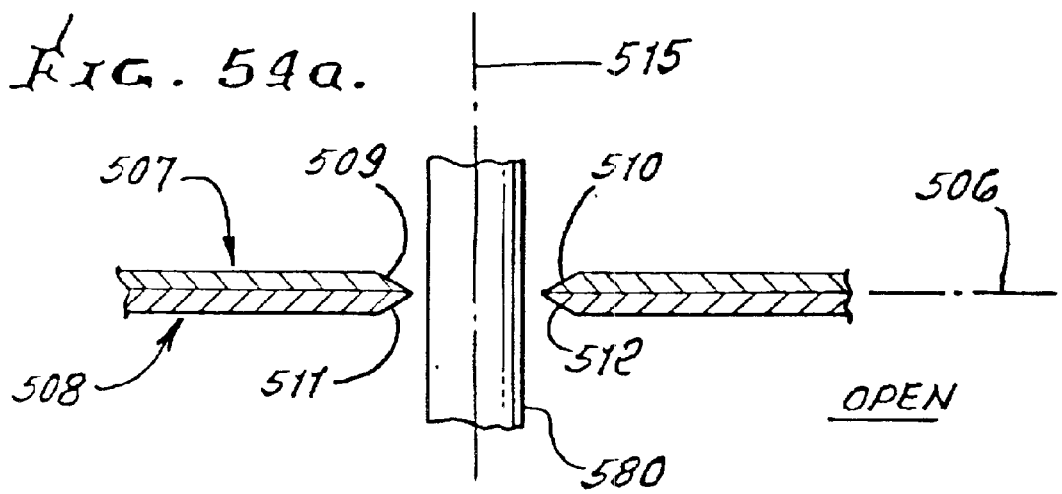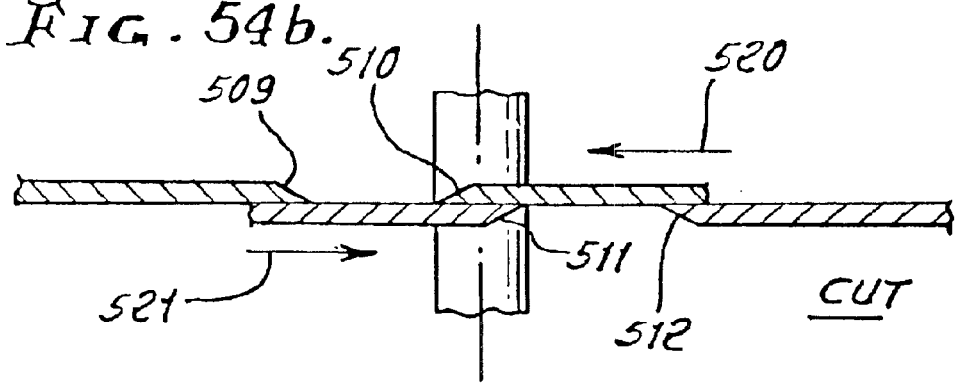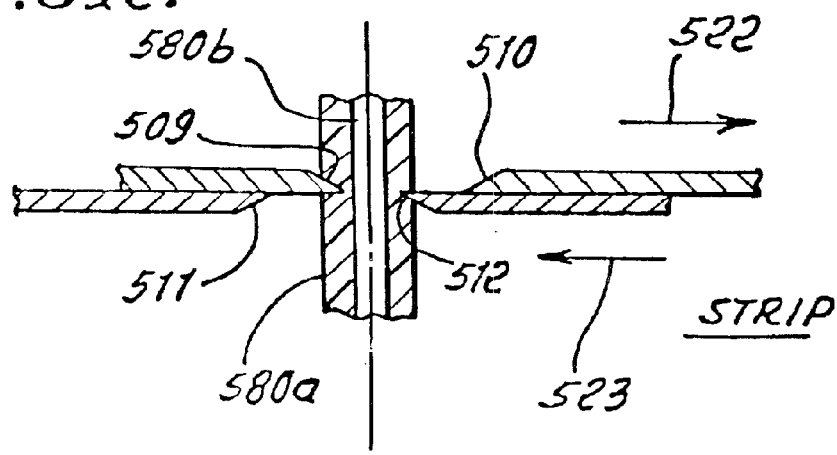

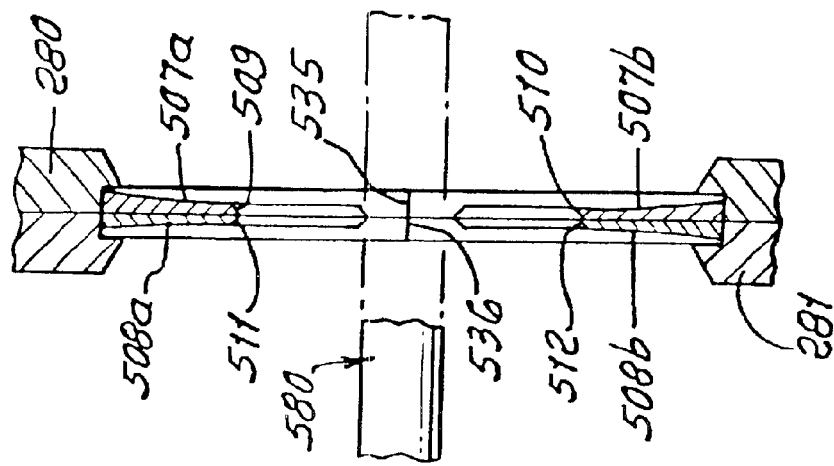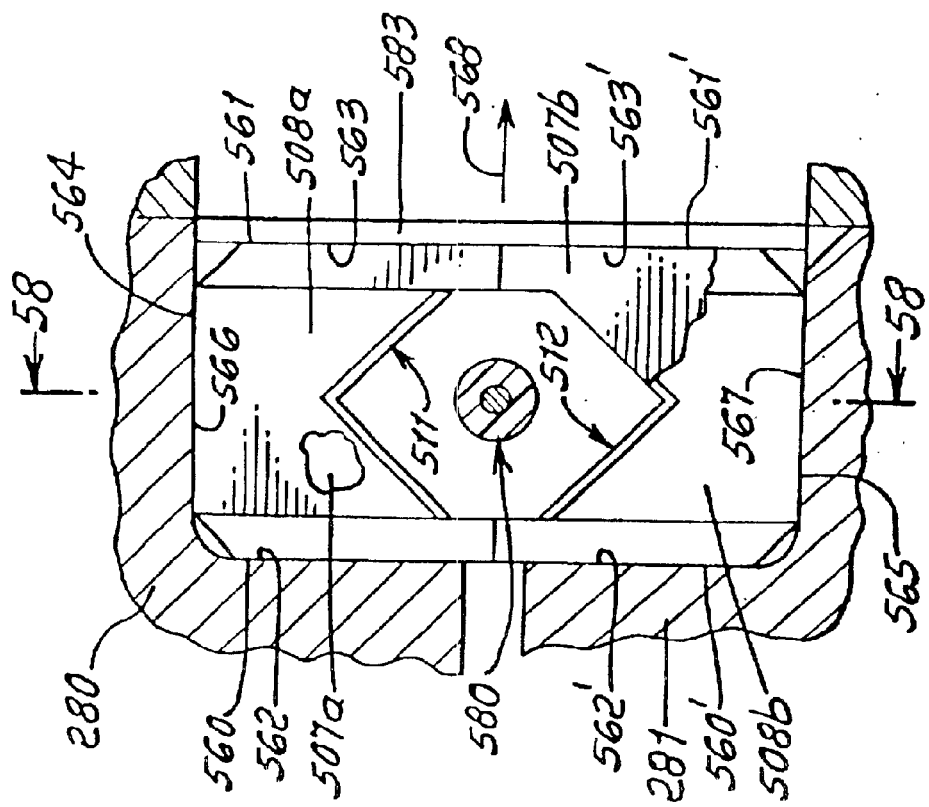

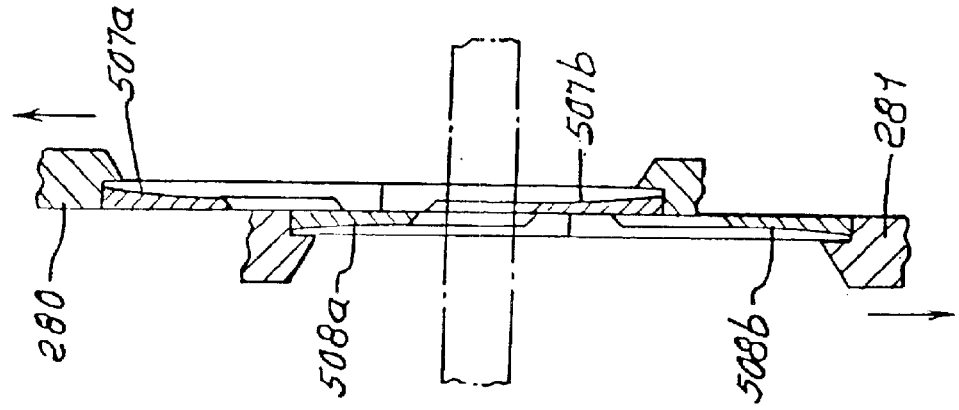
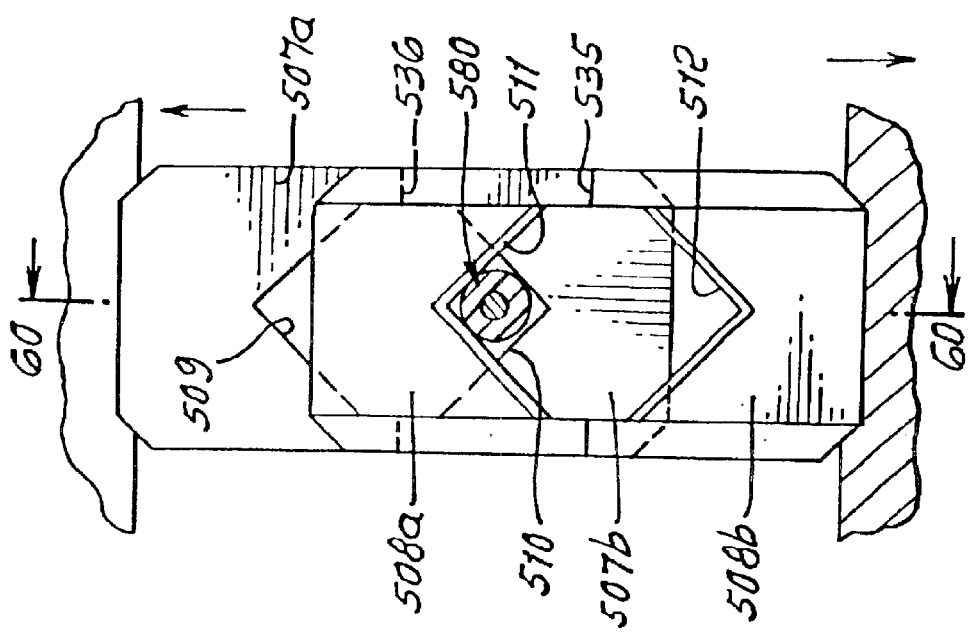

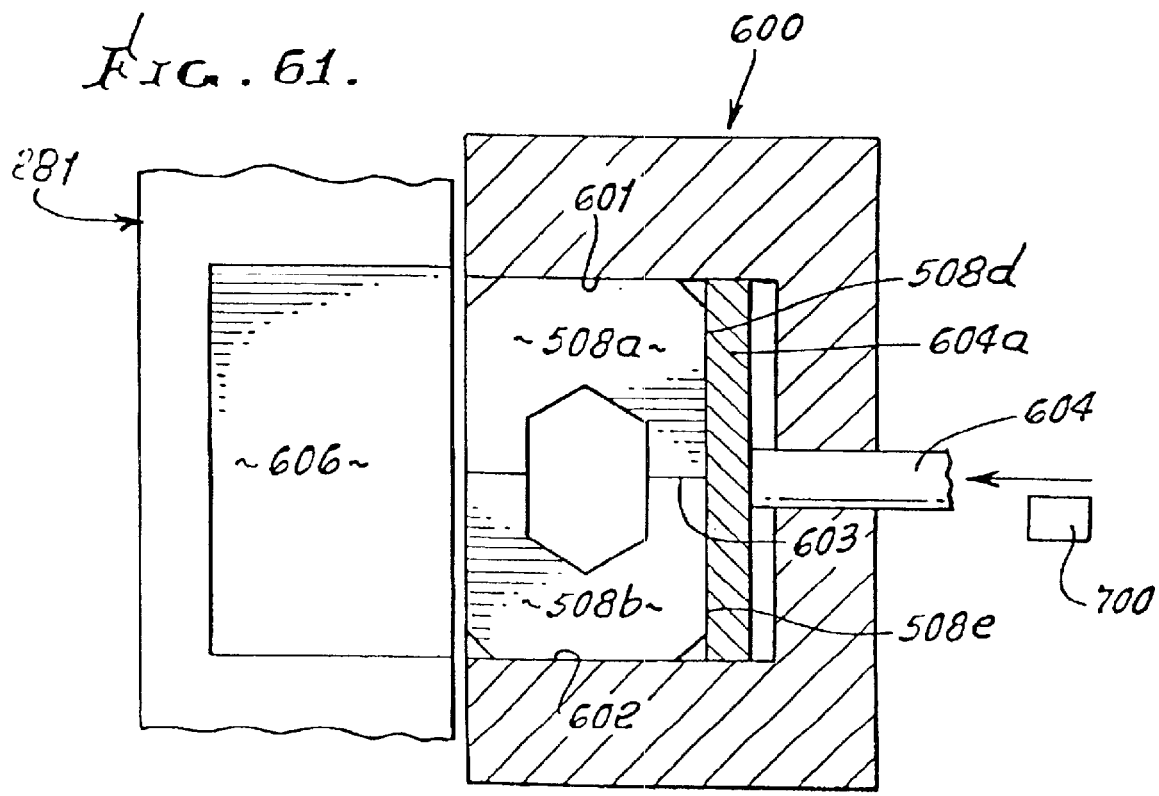
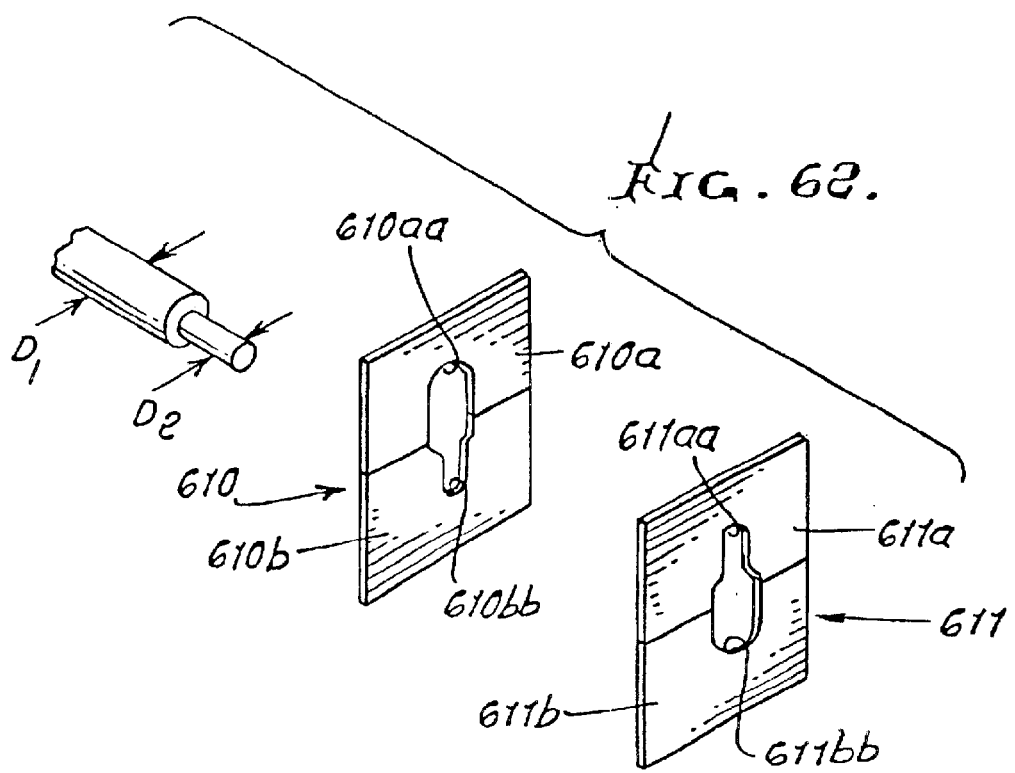

APPARATUS FOR PROCESSING WIRE

This application is a continuation of prior U.S. application Ser. No. 09/494,461 filed Jan. 31, 2000 now U.S. Pat. No. 6,336,267, which is a divisional of prior U.S. application Ser. No. 09/320,096 filed May 26, 1999, now U.S. Pat. No. 6,272,740, which is a continuation of prior U.S. application Ser. No. 08/845,065 filed Apr. 21, 1997, now U.S. Pat. No. 5,937,511, which is a continuation of prior U.S. Ser. No. 08/353,352 filed Dec.2, 1994, now U.S. Pat. No. 5,664,324, which is a continuation in part of prior U.S. application Ser. No. 08/022,981 filed Feb. 25, 1993, now U.S. Pat. No. 5,375,485, which is a continuation in part of prior U.S. application Ser. No. 07/857,972 filed Mar. 26, 1992, now U.S. Pat. No. 5,293,683, which is a divisional of prior U.S. application Ser. No. 07/765,986 filed Sep. 26, 1992 now U.S. Pat. No. 5,253,555 which is a continuation in part of prior U.S. application Ser. No. 07/659,557 filed Feb. 22, 1991, abandoned, which is a continuation in part of prior U.S. application Ser. No. 07/611,057 filed Nov. 9, 1990 now U.S. Pat. No. 5,146,673 and a continuation in part of prior U.S. application Ser. No. 08/148,568 filed Nov. 8, 1993 now U.S. Pat. No. 5,469,763, which is a continuation in part of prior U.S. application Ser. No. 08/022,981 filed Feb.25, 1993 now U.S. Pat. No. 5,375,485, which is a continuation in part of prior U.S. application Ser. No. 07/857,972 filed Mar.26, 1992 now U.S. Pat. No. 5,293,683, which is a divisional of prior U.S. application Ser. No. 07/765,986 filed Sep. 26, 1991, now U.S. Pat. No. 5,253,555, which is a continuation in part of prior U.S. Ser. No. 07/659,557 filed Feb. 22, 1991 now abandoned, which is a continuation in part of prior U.S. application Ser. No. 07/611,057 filed Nov. 9, 1990 now U.S. Pat. No. 5,146,673.

BACKGROUND OF THE INVENTION

This invention relates generally to wire or cable severing, as well as stripping sheathing from severed wire sections; and more particularly, it concerns unusual advantages, method and apparatus to effect severing of a wire or cable into two sections, and stripping of sheathing off ends of both sections, with minimal motions of severing and stripping elements and in minimum time.

There is continual need for equipment capable of severing wire or cable into sections, and also capable of rapidly and efficiently stripping sheathing off ends of those sections. It is desirable that these functions be carried out as a wire or cable travels along generally the same axis, i.e., progresses forwardly, and that multiple wire and cable sections of selected length be produced, each having its opposite ends stripped of sheathing, to expose bare metal core wire at each end. Further, it is desirable that simple, radial and axial stripping adjustments be achieved upon multiple wire sections.

SUMMARY OF THE INVENTION

It is a major object of the invention to provide apparatus and method meeting the above need. The word "wire" will be used to include cable within its scope, and vice versa.

Basically, the apparatus of the invention comprises improved blade structures usable in apparatus for processing wire to cut the wire into sections and to expose section wire ends, the wire having an inner core and sheathing about that core, the apparatus including means for displacing the wire axially endwise; in this environment the invention comprises the combination:

a) multiple blade structures, including at least two of the structures that move adjacent one another as the two structure move relatively oppositely toward and away from the axis in directions generally normal to the axis, b) each of the two structures having first and second cutting edges, c) the cutting edges configured such that, when the two the structures are moved relatively longitudinally in a primary mode, two of the cutting edges cut through the wire, and when the two structures are moved relatively longitudinally in a second mode, the remaining two of the cutting edges cut into the wire sheathing to enable stripping of the sheathing of the wire.

In this regard, the cutting edges of each blade structure typically may face one another in longitudinally spaced relation and be located at opposite sides of the wire axis, both blade structures being displaced longitudinally, for example to sever the wire and also to strip sheathing from the wire.

It is another object to provide programmable means associated with the apparatus to provide programmable strip depth of the sheathing.

An additional object is to provide said two structures to define first shoulders elongated longitudinally and forming a space between which the other of the two structures extends during relative movement; and also to provide second shoulders also elongated longitudinally and extending in proximity with said first shoulders during said relative movement.

Yet another object is to provide blade structures that employ blade plates having wire cutting edges, the blade plates extending in close, parallel, overlapping relation during their relative movement. Typically, the cutting edges on two of the overlapping plates include V-shaped edge portions that overlap when the blade plates are moved in said secondary mode during their relative movement.

A further object is to provide support means for the blade structures for holding the blade structures attached in fixed positions on the support means, the blade structures having shoulders engageable with the support means. Retainers may be associated with the support means for holding the blade structures attached in fixed positions on the support means, and to allow release of the blade structures from the support means, enabling their selective replacement.

These and other objects and advantages of the invention, as well as the details of an illustrative embodiment, will be more fully understood from the following specification and drawings, in which:

DRAWING DESCRIPTION

FIGS. 18a–18f are perspective views showing steps in the method of wire processing;

FIG. 19 is a side elevational view like that of FIG. 2 showing wire conveying and processing apparatus;

FIG. 21 is a section taken in elevation on lines 21—21 of FIG. 20;

FIG. 22 is a section taken in elevation on lines 22—22 of FIG. 20;

FIG. 24 is a section taken on lines 24—24 of FIG. 21;

FIG. 25 is a vertical section taken on lines 25—25 of FIG. 19;

FIG. 26 is a plan view, partly in section, taken on lines 26—26 of FIG. 25;

FIG. 27 is an elevation taken on lines 27—27 of FIG. 26;

FIG. 28 is an enlarged plan view, like that of FIG. 26, showing wire slug trap door and pusher elements in outwardly pivoted states;

FIG. 36 is a section taken on lines 36—36 of FIG. 35a;

FIG. 42 is a circuit diagram;

FIG. 45 is an elevation showing two blade structures that are movable in opposite directions to cut into a wire;

FIG. 46 is a view like FIG. 45 showing the two structures closed together in interfitting relation during wire cutting;

FIG. 46b is a section taken on lines 46b—46b of FIG. 46a;

FIG. 54 is a diagrammatic view showing steps in the improved method of wire or cable processing, in accordance with the present invention;

FIG. 57 is an elevation showing two overlapping and oppositely movable blade structures, in accordance with the present invention, and in open position (blade cutting edges spaced from the wire, as in FIG. 54(b));

FIG. 58 is a section taken on lines 58—58 of FIG. 57;

FIG. 59 is like FIG. 57 but showing the blade structure in position to cut into wire or cable insulation, for stripping;

FIG. 60 is a section taken on lines 60—60 of FIG. 59;

FIG. 61 shows a blade load apparatus; and

FIG. 62 shows blades with variable cutting edges.

Figure 1A:
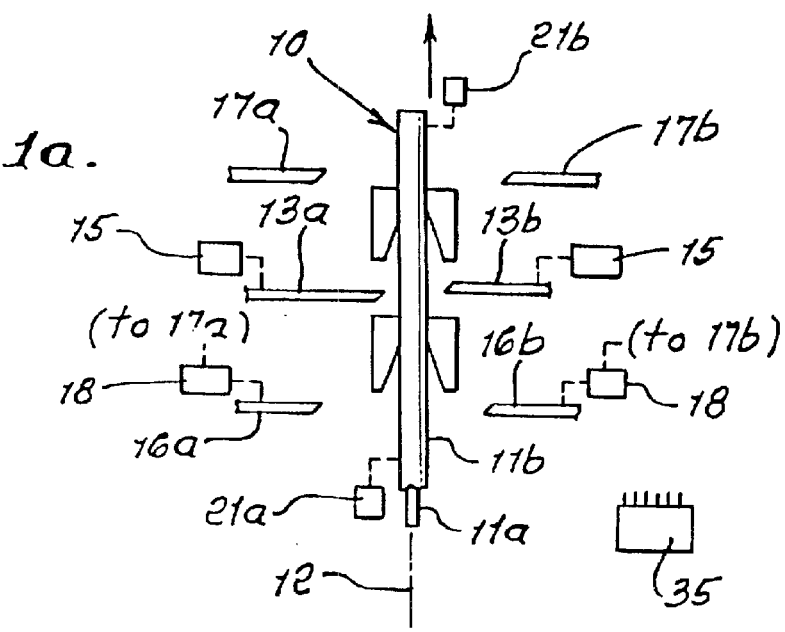
FIGS. 1a–1f are diagrammatic views showing steps in the method of wire or cable processing.

DETAILED DESCRIPTION OF BACKGROUND APPARATUS AND METHOD DISCLOSED IN U.S. Ser. No. 08/022,981 AND U.S. Ser. No. 08/148,568

Referring first to FIGS. 1a–1f, they show in diagrammatic form the positions of both wire severing and sheathing stripping blades, during various steps in a wire processing procedure or method. In this regard, the "wire" 10 (meant to also refer to cable) has a metal core 11a and a tubular sheathing 11b about the core. The wire is shown extending axially longitudinally in FIGS. 1a–1f, the axis being located at 12.

First cutter means is provided to include, or may be considered to include, multiple blades. See for example the two wire-cutting blades 13a and 13b of a first set, located or carried for movement laterally toward and away from the wire axis 12. A first drive for controllably simultaneously enabling or advancing the blades toward one another, laterally oppositely (see arrows 14a and 14b in FIG. 1b), is shown at 15. That drive is also operable to retract the blades 13a and 13b away from one another.

Second and third cutter means are also provided, for sheathing stripping, and each may be considered to include multiple blades located for movement toward and away from the axis 12. See for example the second set of two blades 16*a* and 16*b,* and the third set of two blades 17*a* and 17*b*.

Blades 16*a* and 16*b* are located, or considered to be, controllably simultaneously displaced, as by drive 18, (or by separate or multiple drives) laterally oppositely, toward one another (see arrows 19*a* and 19*b* in FIG. 1*d*), the drive also operable to retract the blades 16*a* and 16*b* away from one another. Similarly, the blades 17*a* and 17*b* are located, or carried to be, controllably displaced simultaneously laterally oppositely toward one another (see arrows 20*a* and 20*b* in FIG. 1*d*), and drive 18 may be used for this purpose. Thus, blades 16*a* and 16*b* may be displaced toward one another at the same time and to the same extent as blades 17*a* and 17*b* are displaced toward another, as is clear from FIG. 1*d*. The latter shows that the blades 16*a* and 16*b*, and 17*a* and 17*b*, do not sever the wire but may closely approach the wire, while cutting into sheathing 11 for stripping purposes.

Figure 9:
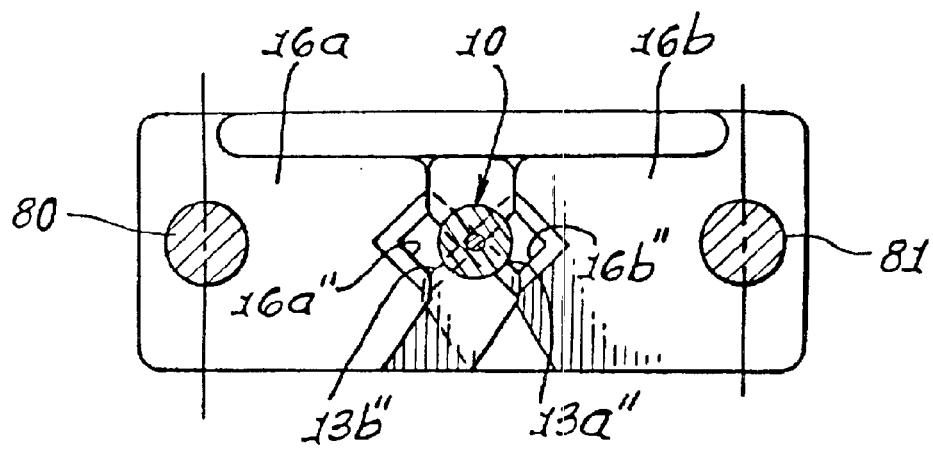
FIG. 9 is an end view showing wire severing blades in wire severing position, as in FIG. 1b.
Figure 10:
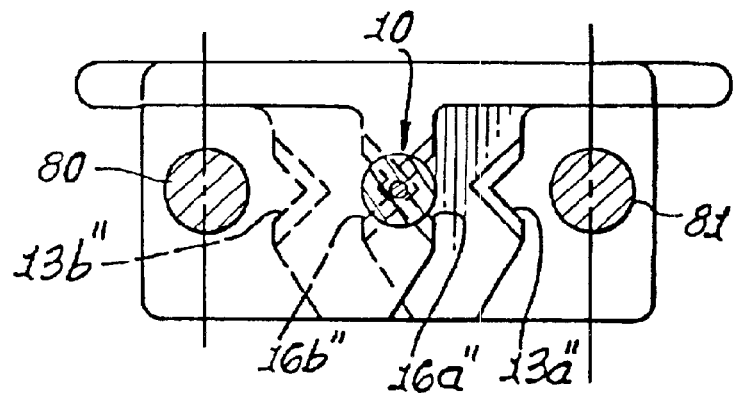
FIG. 10 is an end view like FIG. 9 showing the sheathing stripping blades, in sheathing stripping position, as per FIG. 1d.
Figure 10A:
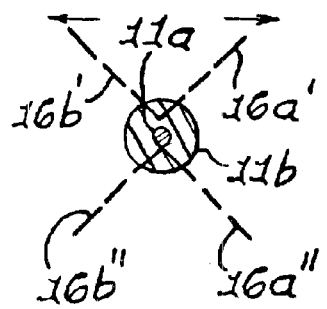
FIG. 10a is a view showing stripping blade edge penetration into wire sheathing.
Figure 11:
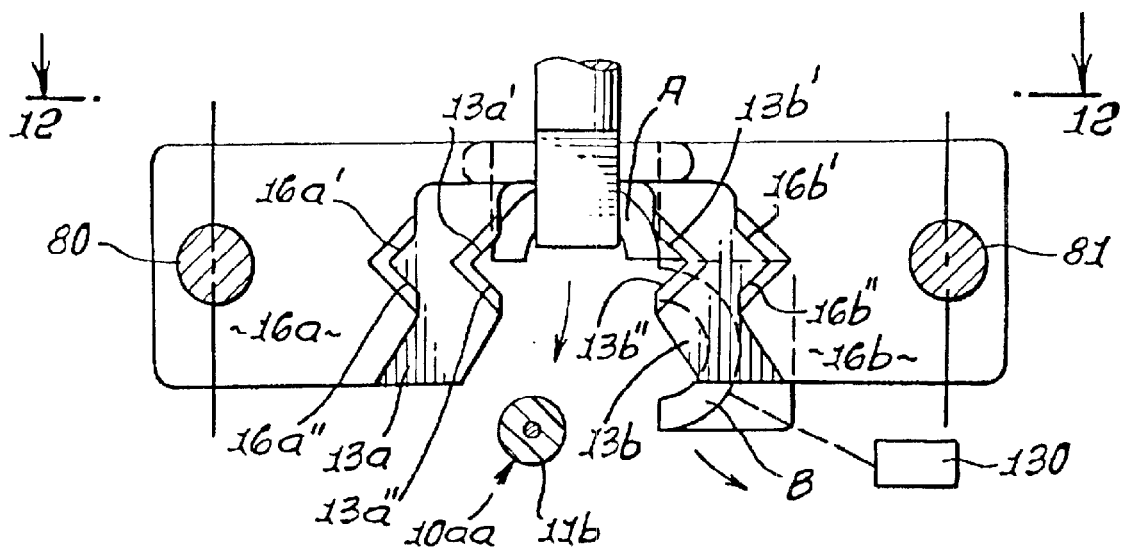
FIG. 11 is a view like FIGS. 9 and 10 but showing all blades in retracted position, as in FIGS. 1a and 1f.
Figure 12:
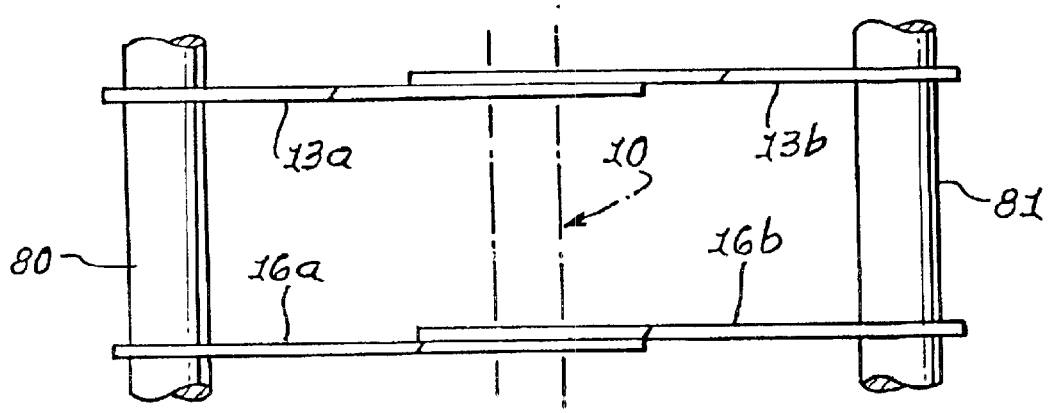
FIG. 12 is an end view taken on lines 12—12 of FIG. 11.

Brief reference to FIGS. 9–11 show the blades 16*a* and 16*b* to have V-shape, as do wire severing blades 13*a* and 13*b*, and blades 17*a* and 17*b*. Note edges 16*a*' and 16*a*", and 16*b*' and 16*b*" (of blades 16*a* and 16*b*) cutting into the sheathing in FIG. 10*a* to approach the wire core from four sides, for efficient stripping, while leaving the core uncut. Similar functioning of blade edges 17*a*' and 17*a*", and 17*b*' and 17*b*", also takes place, as in FIG. 1*d*.

Figure 1B:
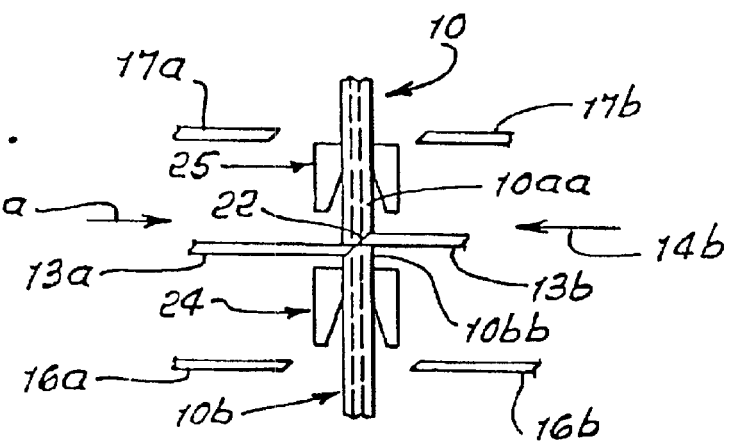

FIG. 1*a* shows displacement of the wire axially endwise and longitudinally, as by a conveyor means 21*a* to the first position as shown. FIG. 1*b* shows the step of severing the wire thereby to form wire forward and rearward sections 10*a* and 10*b*, the blades 13*a* and 13*b* being advanced laterally to accomplish complete severing at locus 22, as shown. Note that wire forward section 10*a* has a rearward end portion 10*aa*; and the wire rearward section 10*b* has a forward end portion 10*bb*.

Figure 1C:
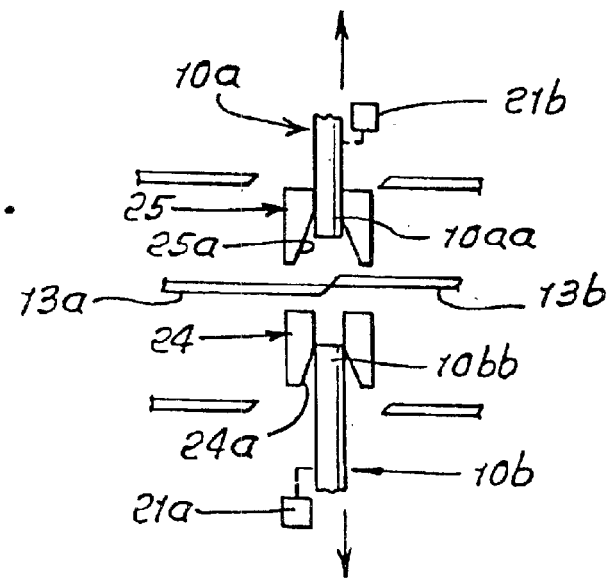

FIG. 1*c* shows the step of controllably separating the two sections 10*a* and 10*b* axially endwise oppositely, as to the positions shown, in which the end portions 10*aa* and 10*bb* are spaced from the closed-together blades 13*a* and 13*b*. Guides 24 and 25, provided between the blade sets, serve to accurately guide the wire and the sections 10*a* and 10*b* during the cutting and severing operation, as is clear from FIGS. 1*a*–1*f*. Note the tapered entrances 24*a* and 25*a* to the guides to receive and center the forwardly advanced wire.

Wire drives 21*a* and 21*b* are controllably operated to engage and separate the two sections 10*a* and 10*b*, as indicated in FIGS. 1*a* and 1*c*.

Figure 1D:
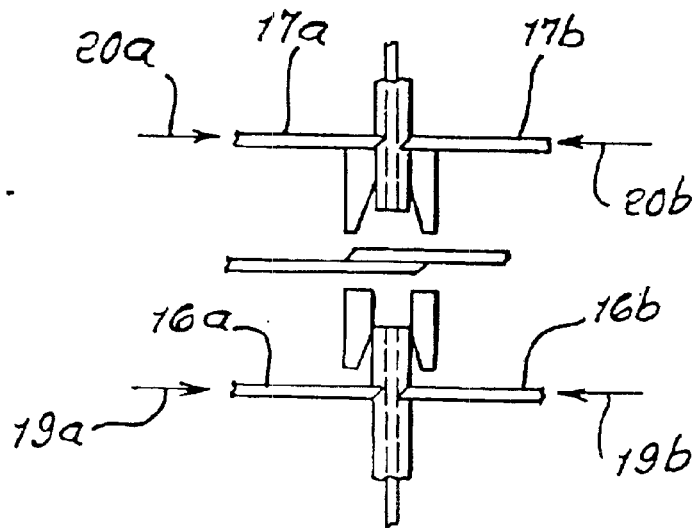

FIG. 1*d* shows a sub-step included within the step of stripping sheathing from the forward section rearward portion and from the rearward section forward portion, thereby to expose wire ends at the portions. Note that blades 16*a* and 16*b* are simultaneously advanced laterally oppositely, as to blade edge positions described above, as respects FIG. 10*a*, and as blades 17*a* and 17*b* are also simultaneously advanced laterally oppositely (as to the same extent if such stripping is to be equal for each wire section). Note that blades 13*a* and 13*b* now extend in laterally overlapping condition, due to operation of drives 15 and 18 as one, i.e., equal rightward lateral displacement for blades 13*a*, 16*a* and 17*a*, and equal leftward lateral displacement for blades 13*b*, 16*b* and 17*b*; however, they may be separately driven so as not to extend in such relation, as shown. Blades 13*a*, 16*a* and 17*a* may be connected together to move rightwardly to equal extent; and blades 13*b*, 16*b* and 17*b* may also be connected together to move leftwardly as one, for extreme simplicity.

Figure 1E:
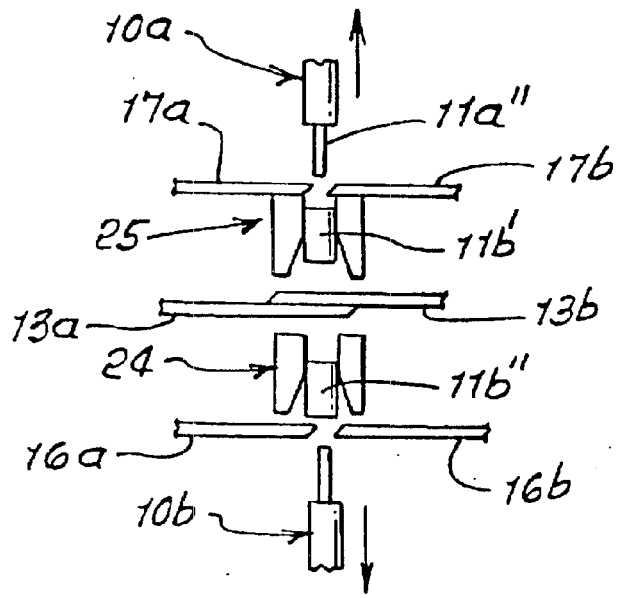

FIG. 1*e* shows operation of the wire drives to further endwise separate the wire sections 10*a* and 10*b* so as to pull or strip two sheathing end portions 11*b*' and 11*b*" from the wire sections 10*a* and 10*b*, thereby to expose the wire core end portions 11*a*' and 11*a*". The stripped sheathing end portions 11*b*' and 11*b*", or slugs, are allowed to drop out from between the pairs of guides 24 and 25 which may be split, as shown, to provide slug drop-out openings, and may be movable to facilitate such drop out.

Figure 1F:
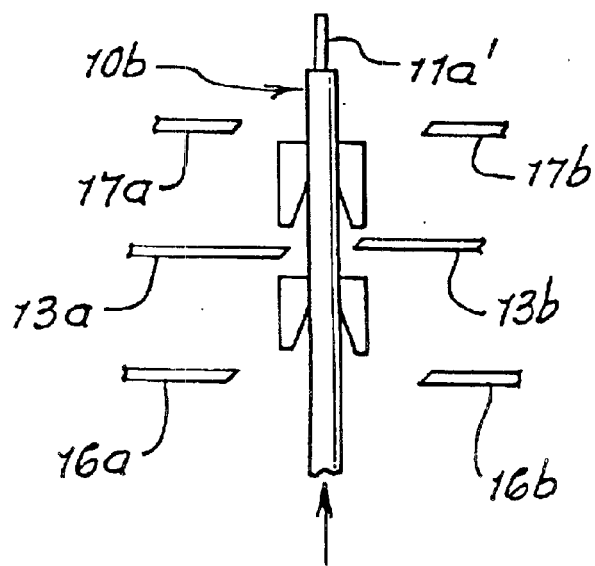

FIG. 1*f* shows all blades laterally retracted and the wire rearward section 10*b* fully advanced into position corresponding to FIG. 1*a* position for controlled length endwise positioning to be processed, as in FIGS. 1*b*–1*e*, to provide an exposed core end at its opposite end. Thus, controlled length wires (or cables), with exposed core lengths at each end of each wire, is efficiently and rapidly and controllably provided. See master control 35 to control all the driving, as described, and to be described.

Referring now to FIGS. 2–8, one form of apparatus to accomplish the above operations (FIGS. 1*a*–1*f*) is shown in detail. A frame is provided, as at 40-44 and 44*a*, to mount two conveyors 45 and 46, which may be considered as included within the wire drives 30 and 31, as mentioned. Such conveyors may include two rearwardly positioned endless belts 47 and 48, and two forwardly positioned endless belts 49 and 50. The belts provide stretches, as at 47' and 48', which are adapted to sidewise flatly grip the wire 10 (and specifically the wire rearward section 10*b*) for endwise advancement and retraction, as during separation of the sections 10*a* and 10*b* in FIG. 1*c*; and stretches 49' and 50' are adapted to sidewise grip the wire 10 (and specifically the wire forward section 10*a*) for endwise advancement and retraction.

Figure 4:
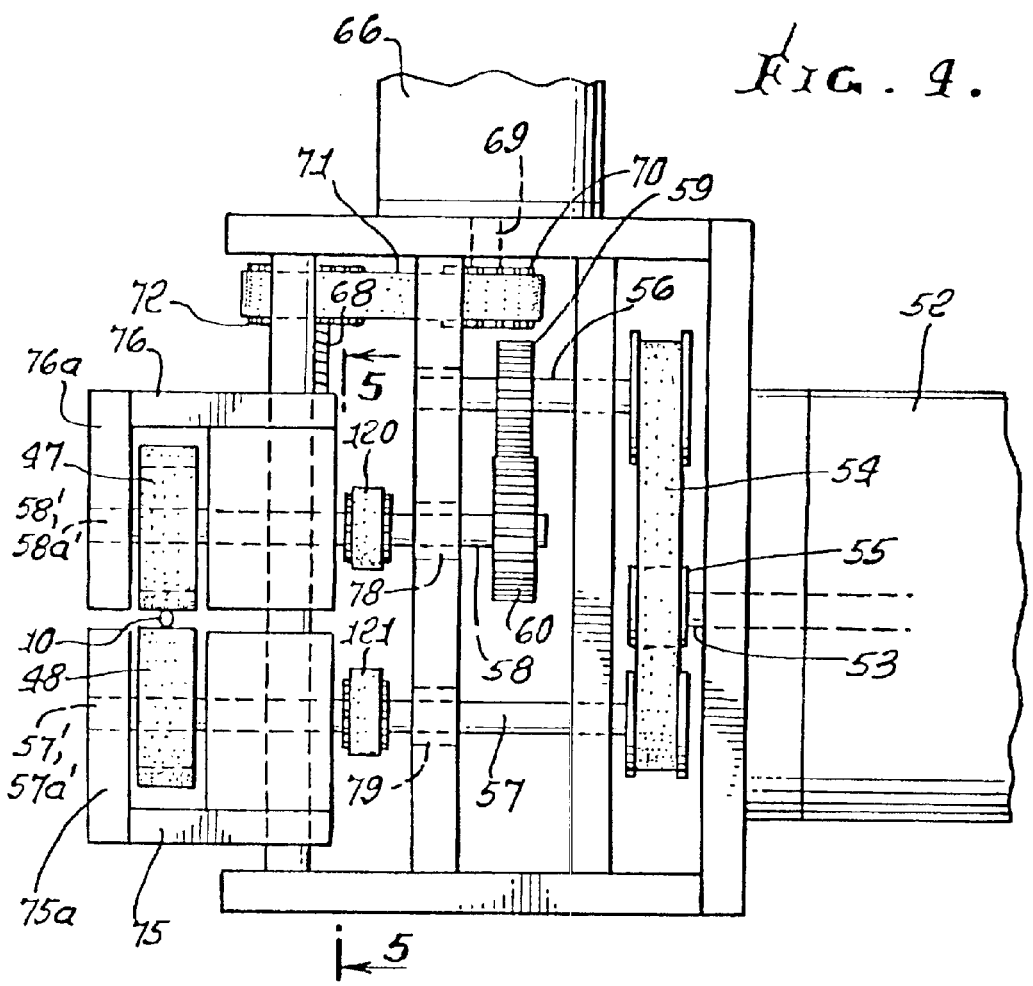
FIG. 4 is an end view, taken in elevation, showing wire belt displacing drive apparatus.

The belts 47 and 48 are driven to advance or retract the wire section 10*a*, as from a drive motor 52 (see FIG. 4). The output shaft 53 of the motor drives belt 54, as via a pulley 55, and belt 54 drives shafts 56 and 57. Shaft 56 drives another shaft 58, through gearing 59 and 60, to drive shaft 58 and upper conveyor belt 47 clockwise; whereas, lower shaft 57 and lower belt 48 are driven counterclockwise in FIG. 2. This drives the wire forwardly; whereas, when motor 52 is reversed, the wire is driven rearwardly. Additional axles or shafts for the conveyor belts 47 and 48 appear at 58*a* and 57*a*.

Figure 2:
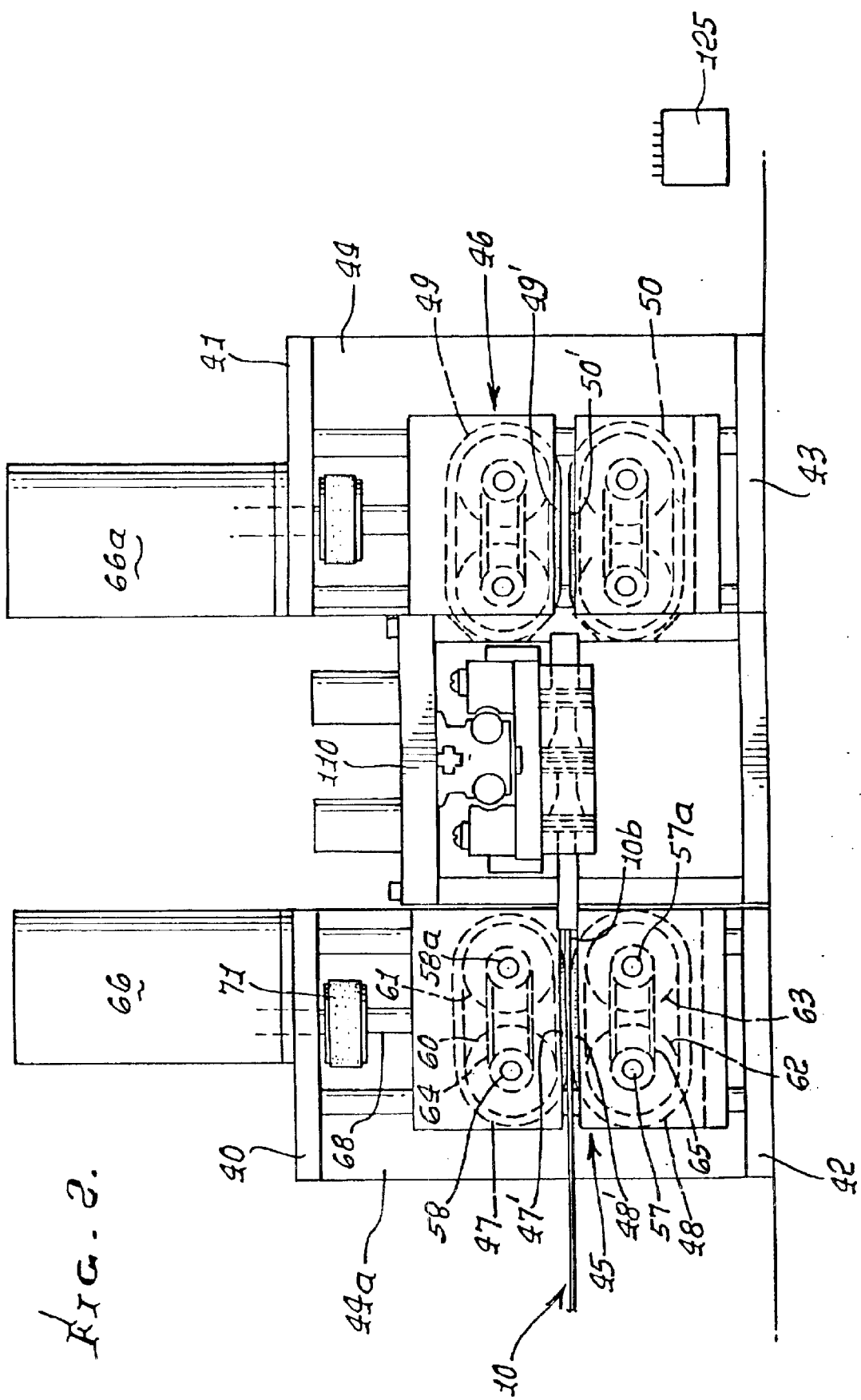
FIG. 2 is a side view elevation showing wire displacing and processing apparatus.

FIG. 2 shows conveyor rotors 60 and 61, and 62 and 63. These carry the belts 47 and 48. Axles 58*a* and 57*a* are driven by drive belts 64 and 65 extending between pulleys on the shafts 58 and 58*a*, and 57 and 57*a*, as shown. Accordingly, when the belt stretches 47' and 48' are closed against opposite sides of the wire 10, and the motor 52 is operating, the wire is displaced endwise.

Means is provided to move the conveyor belt stretches 47' and 48' toward one another to clutch the wire, and away from one another to de-clutch the wire. See for example in FIGS. 3–5 the motor or drive 66 carried by a frame part 67, to rotate a vertical screw shaft 68, as via motor output shaft 69, pulley 70, belt 71, and pulley 72 on the screw shaft 68. The screw shaft has screw thread engagement at 73 and 74 with frame members 75 and 76. Frame member 76 supports the ends of shafts 58 and 58*a*, via member extension 76*a*, as at 58' and 58*a*'; whereas, frame member 75 supports the ends of shafts 57 and 57*a*, via member extension 75*a*, as at 57' and 57*a*'. Screw threading interfit at 74 is oppositely "handed" relative to threading interfit at 73, so that, when shaft 68 is rotated in one direction about its axis, the frame members 75 and 76 are displaced toward one another, whereby conveyor stretches 47' and 48' may clamp the wire; and when the shaft 68 is rotated in the opposite direction about its axis, the members 75 and 76 are displaced away from each other, and the wire is de-clutched.

The bearing supports at 78 and 79 for shafts 58 and 57 are made loose enough to accommodate such up/down movement of those shafts at the conveyor belt drive locations. Note also couplings at 110 and 111.

Tension springs 90 and 91 are provided (see FIG. 5) between fixed frame structure 92 and shoulders 76a' on 76a, to yieldably urge the structures 76 and 76a, and the belt stretch 47' downwardly; and similarly, tension springs 93 and 94 are provided between fixed frame structure 95 and shoulder 75a' on 75 to yieldably urge the structure 75 and 75a, and the belt stretch 48', upwardly. This provides clearance "take-up" for better control of wire gripping or clamping.

Figure 3:
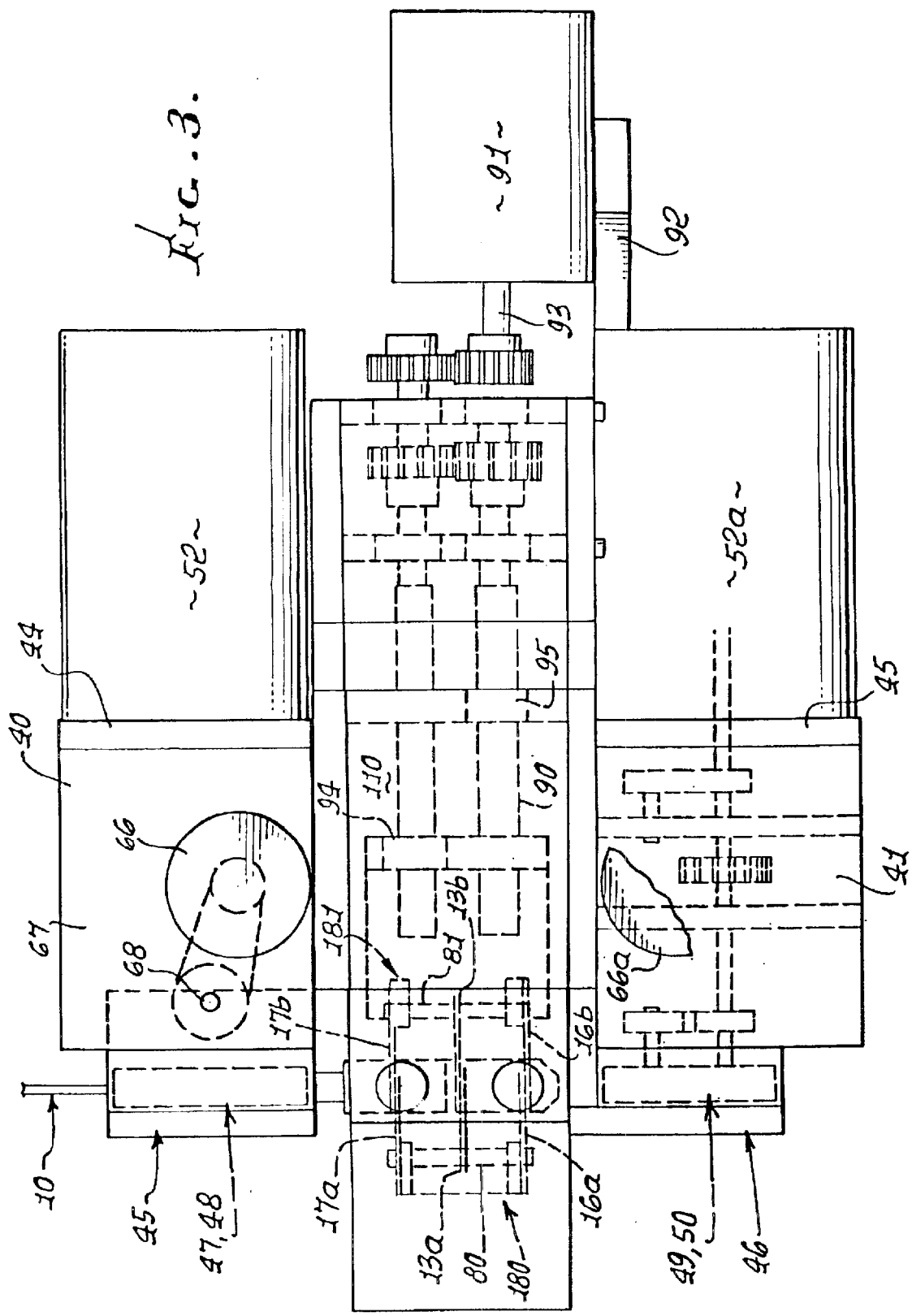
FIG. 3 is a top plan view showing the apparatus of FIG. 2.
Figure 5:
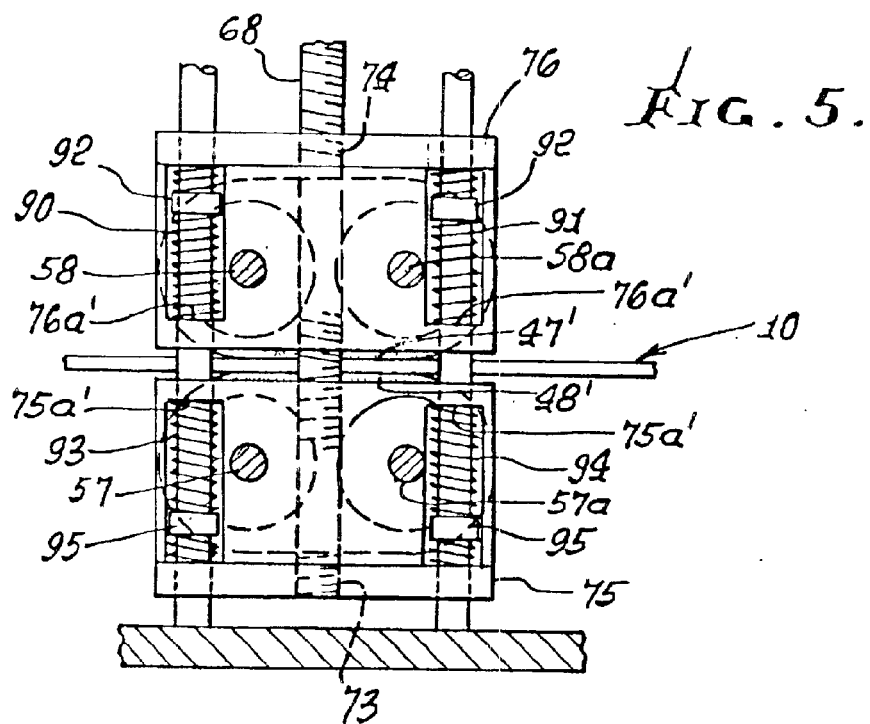
FIG. 5 is an elevation showing spring urging of wire drive belts.
Figure 6:
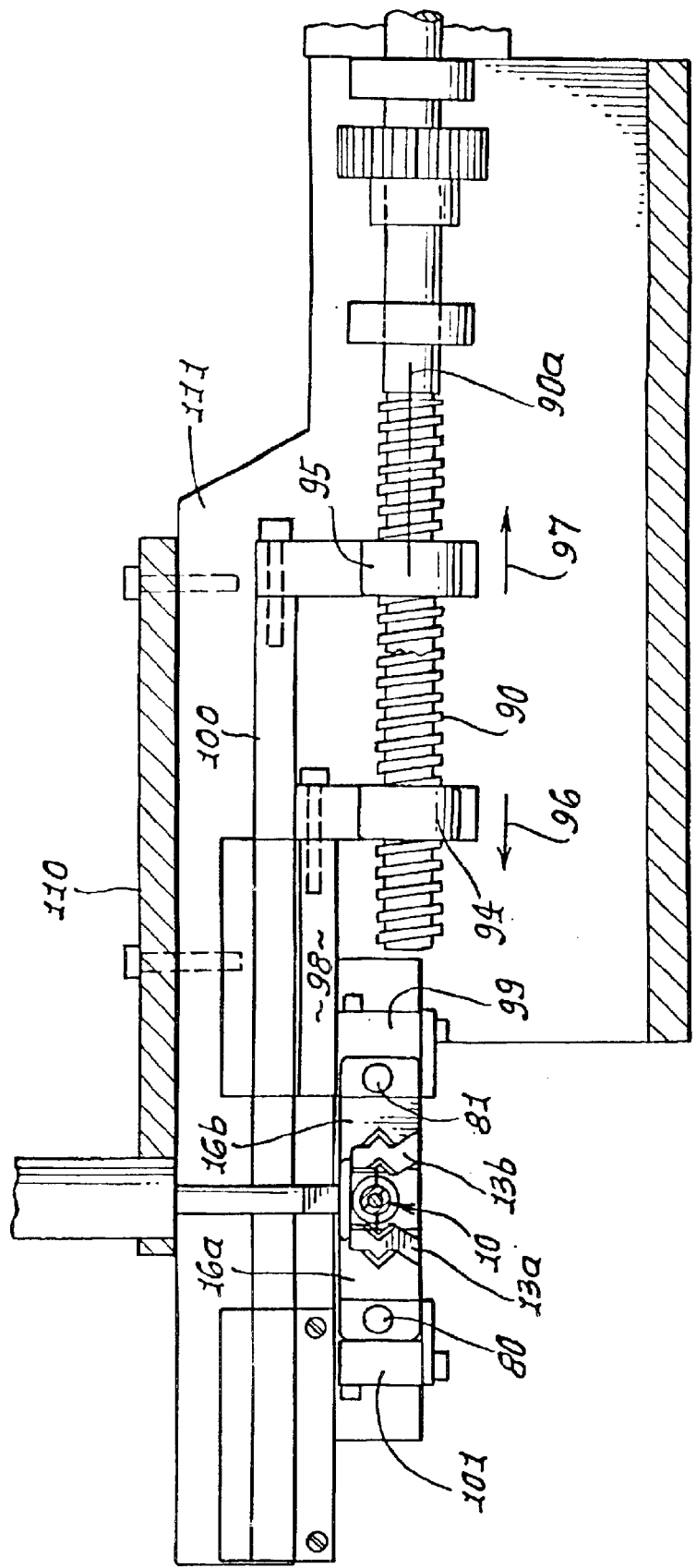
FIG. 6 is an enlarged cross section taken in elevation to show sheathing stripping actuator structure.
Figure 7:
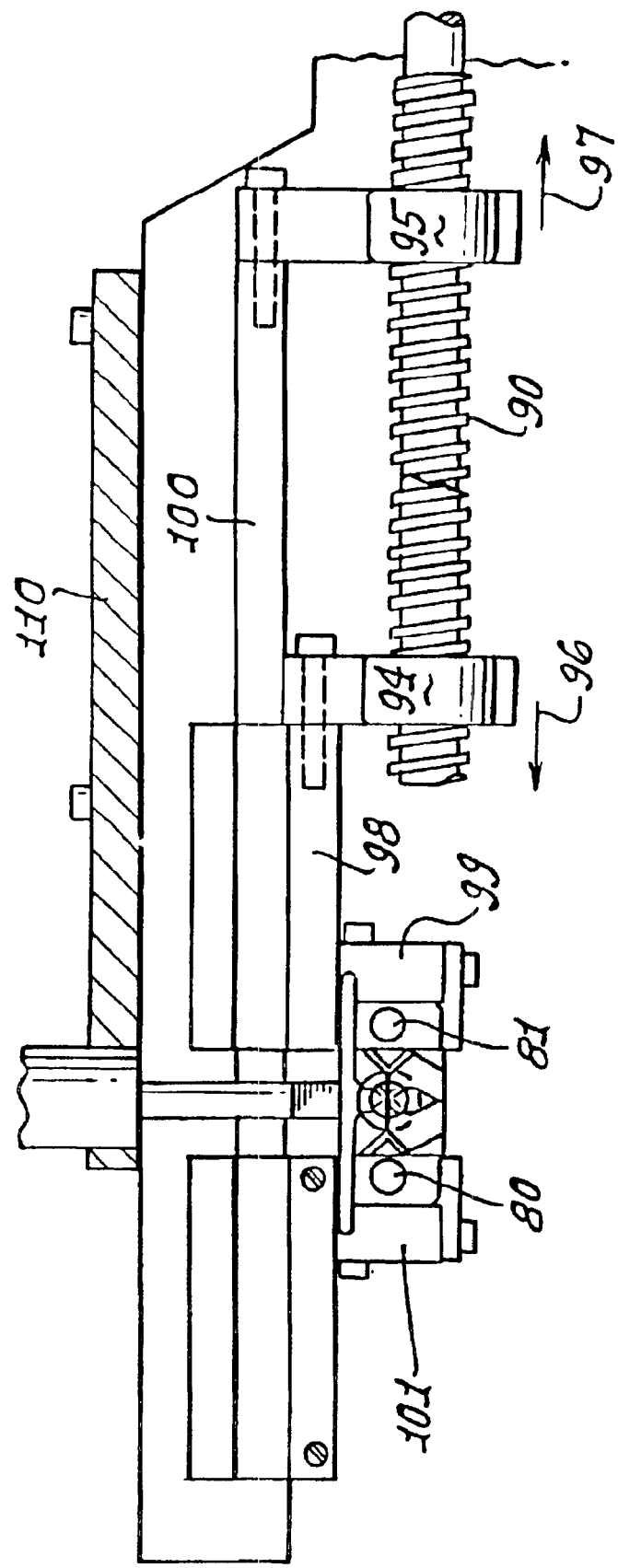
FIG. 7 is a view like FIG. 6 but showing the blades in advanced positions.

The forward conveyor unit 46 embodies conveyor belt drive and up/down movement, the same as described in connection with unit 45 in FIGS. 3–5. The drive motor 52a, for driving the belt stretches 49' and 50' forwardly and reversely, is seen in FIG. 3, as is the motor 66a to control belt clamping of the forward wire section. Mechanism between the motors 52a and 66a, and the respective forward conveyor belts 49 and 50, is the same as above described mechanism between motors 52 and 66, and the respective rearward conveyor 47 and 48; however, the motors 52 and 51a are typically operated simultaneously, either to drive the wire or wire sections forwardly, as in FIGS. 1a and 1f, or to drive the wire sections endwise oppositely, as in FIGS. 1c and 1e. A master control to control all drives, in a preprogrammed manner, is seen at 125.

Referring to FIG. 11, the wire severing blades 13a and 13b are fully laterally retracted, as are the wire sheathing stripping blades 16a and 16b. Blades 17a and 17b are in axial alignment with blades 16a and 16b and are not shown. Note V-angled blade edges 13a' and 13a", and blade edges 13b' and 13b".

The blades 13a, 16a and 17a at one side of the wire 10 are interconnected by axially extending carrier rod 80; and the blades 13b, 16b and 17b at the opposite ends of the wire are interconnected by axially extending carrier rod 81, laterally spaced from rod 80. Rods 80 and 81 are relatively movable laterally toward one another to effect wire severing, as by blades 13a and 13b (see FIG. 9 and also FIG. 1b). Rods 80 and 81 are further laterally movable toward one another to effect penetration of the blade edges 16a' and 16a", and 16b' and 16b", into the sheathing (as in FIGS. 10 and 10a), and as also seen in FIG. 1d. Thereafter, the wire forward and rearward sections 10a and 10b are separated, as in FIG. 1e, to endwise strip the slugs 10aa and 10bb off the wire cores, as also seen in FIG. 11. Dropping of the slug is also seen in FIG. 11, as is lowering of a wire guide lower sector B of guide 11b", to release the slug. The upper guide sector is shown at A. A drive 130 is operable to lower and raise sector B.

Means to effect the described lateral movement of the blade carrier rods 80 and 81 is shown in FIGS. 3 and 6–8. As seen, a laterally extending lead screw 90 is rotatable by a drive motor 91, carried by frame part 83. See connecting shaft 93. As screw 90 rotates in one direction about its axis 90a, nuts 94 and 95 on the screw threads travel axially oppositely (see arrows 96 and 97) to move rod 80 to the right and rod 81 to the left, as in FIGS. 9 and 10. See connectors 98 and 99 connecting nut 94 with rod 81, and connectors 100 and 101 connecting nut 95 with rod 80.

Figure 8:
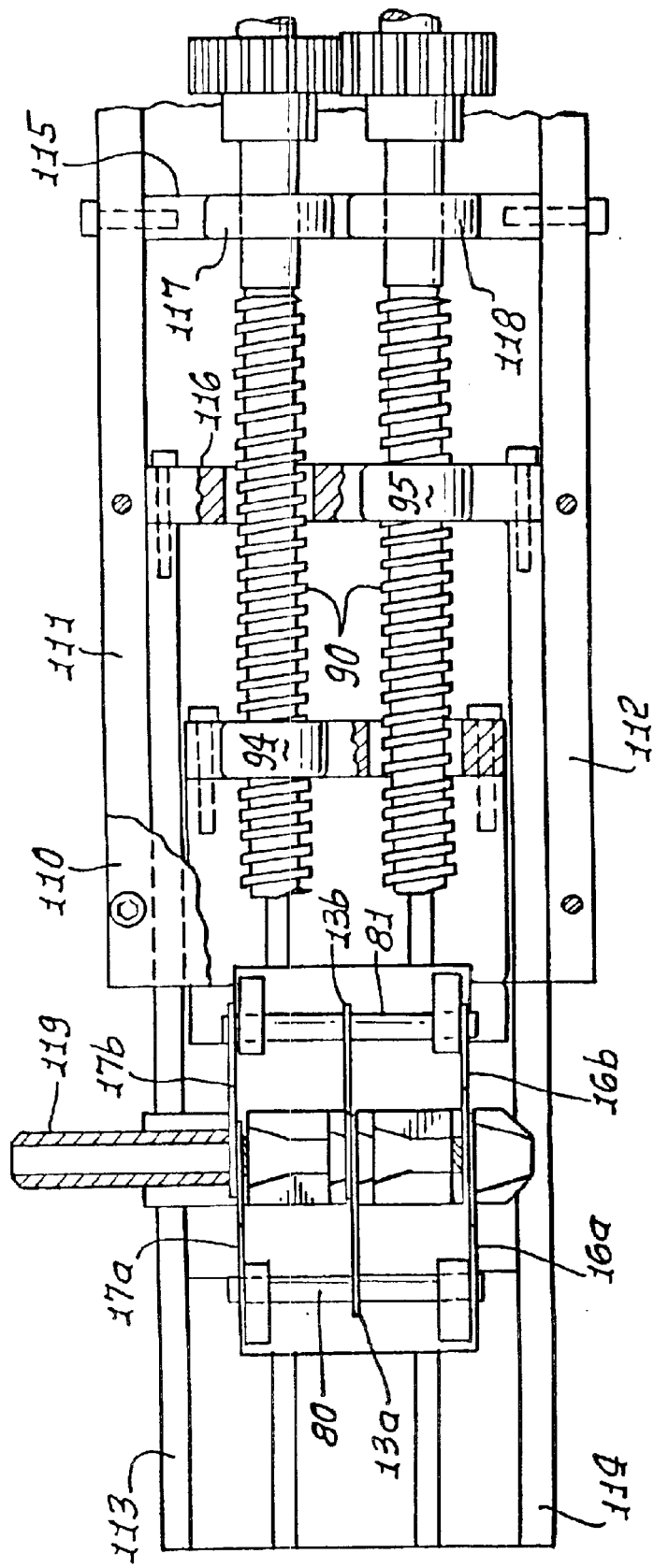
FIG. 8 is a plan view of the FIG. 6 and FIG. 7 mechanism.

A pair of parallel lead screws 90 may be utilized for these purposes, as seen in FIG. 8, each driven by the motor 91, with one lead screw associated with blades 16a and 16b, and the other associated with blades 17a and 17b. Balanced force transmission to the two sets of blades is thereby effected. See also frame elements 110–116 supporting the structure, as indicated. Bearings appear at 117 and 118. An additional tubular wire guide is seen at 119.

Figure 13A:
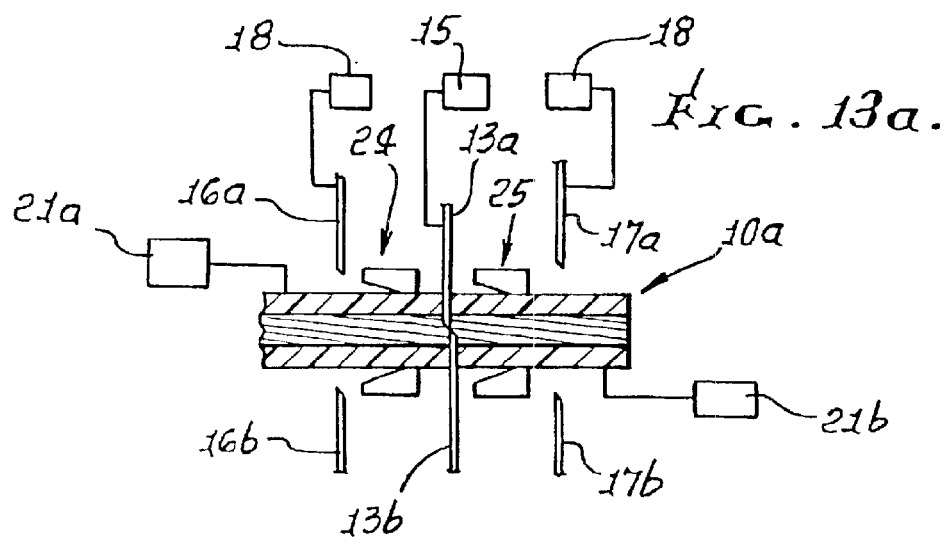
FIGS. 13a–13d are diagrammatic views showing additional steps in the method of wire or cable processing.
Figure 13B:
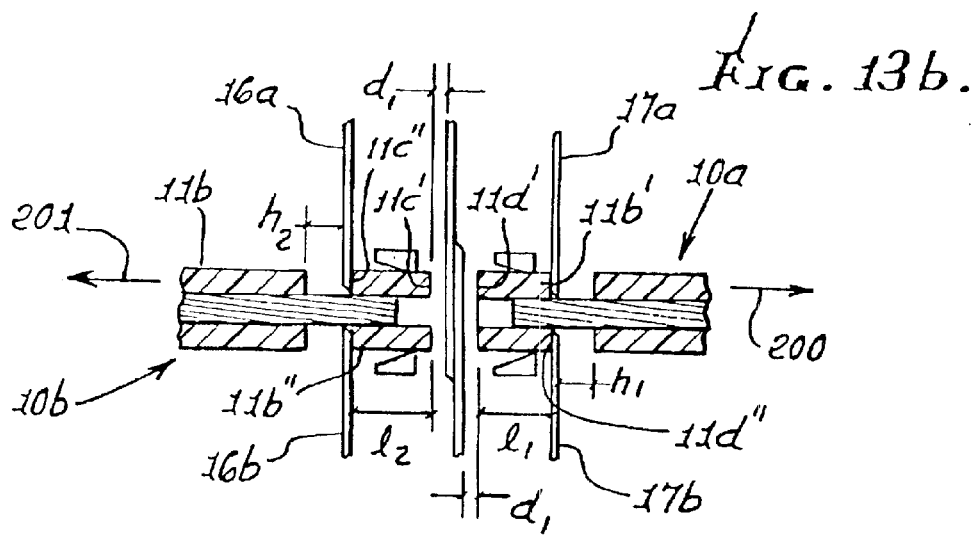

Referring now to FIGS. 13a–13b, the elements which correspond to those in FIGS. 1a)–1f) bear the same numerals. FIG. 13a corresponds to FIG. 1c; and FIG. 13b corresponds to FIG. 1e. In FIG. 13b, prior to the time the blades 16a, 16b, 17a, and 17b penetrate into the sheathing 11b, the wire sections 10a and 10b are displaced, endwise axially oppositely, to controlled extent, as by drives 21a and 21b, under computer control, so as to control such displacement. See for example the displacements $d_1$. This in effect controls the length $l_1$ and $l_2$ of slugs of insulation 11b' and 11b", as between slug ends 11c' and 11c", and 11d' and 11d", ends 11c" and 11d" being adjacent, respectively, the cutters 16a and 16b, and 17a and 17b, which penetrate and cut the insulation.

Figure 13C:
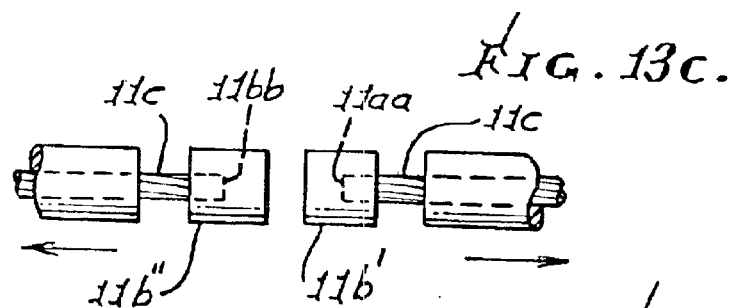
Figure 13D:
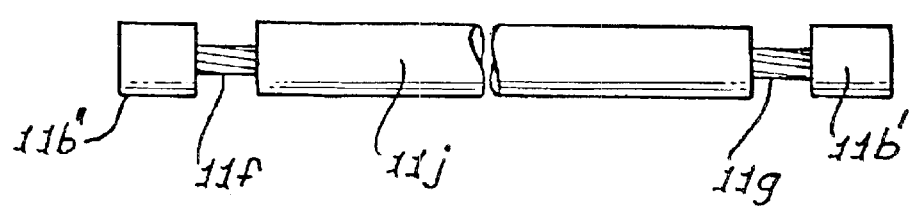

Thereafter, the blades 16a and 16b, and 17a and 17b, penetrate into the sheathing; and wire sections 10a and 10b are displaced axially endwise oppositely (see arrows 200 and 201), to controlled extents $h_1$ and $h_2$, as by the computer-controlled drives 21a and 21b, to relatively displace the insulation slugs to positions shown in FIGS. 13b, 13c, and 13d, wherein the slugs protectively overhang the cut ends 11aa and 11bb of wire core. This protects against fraying of ends of wire clustered strands, as seen at 11c in FIGS. 13b–13d. The blades are then retracted, to leave the wire sections and slugs, as seen in FIG. 13c, the final product being seen in FIG. 13d. Note the exposed wire core extents 11f and 11g between the opposite end insulation slugs 11b' and 11b", the main extent 11j of insulation. The slugs are held in position on the core by friction, and may be pulled off at time of wire use.

In the above, the cutters can be oriented to move horizontally, or vertically, or in other directions.

Figure 14:
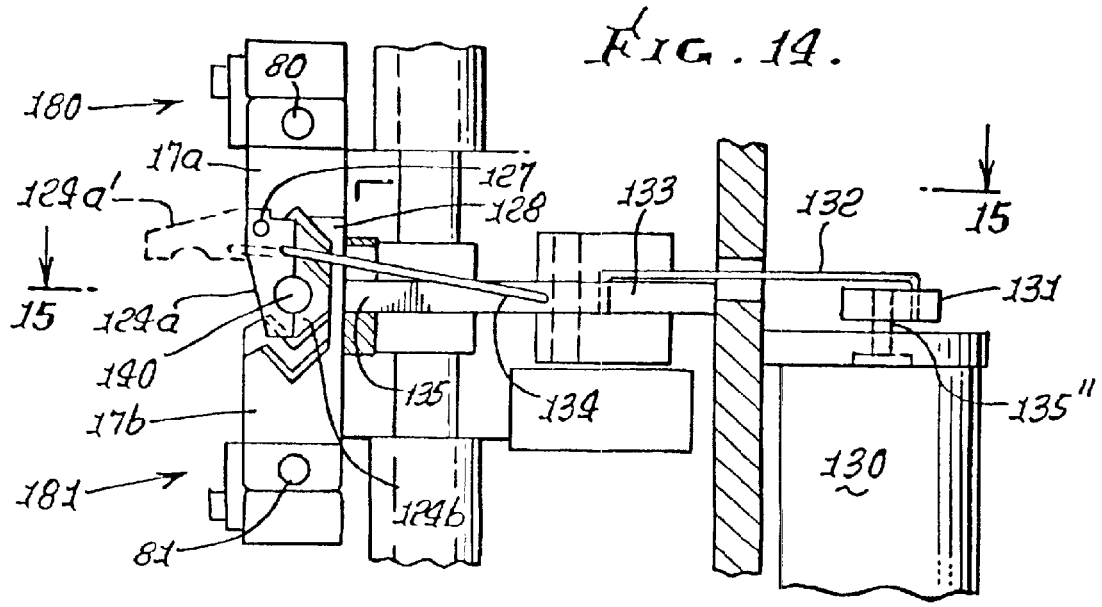
FIG. 14 is a side elevation showing cut insulation slug release and ejection means.
Figure 15:
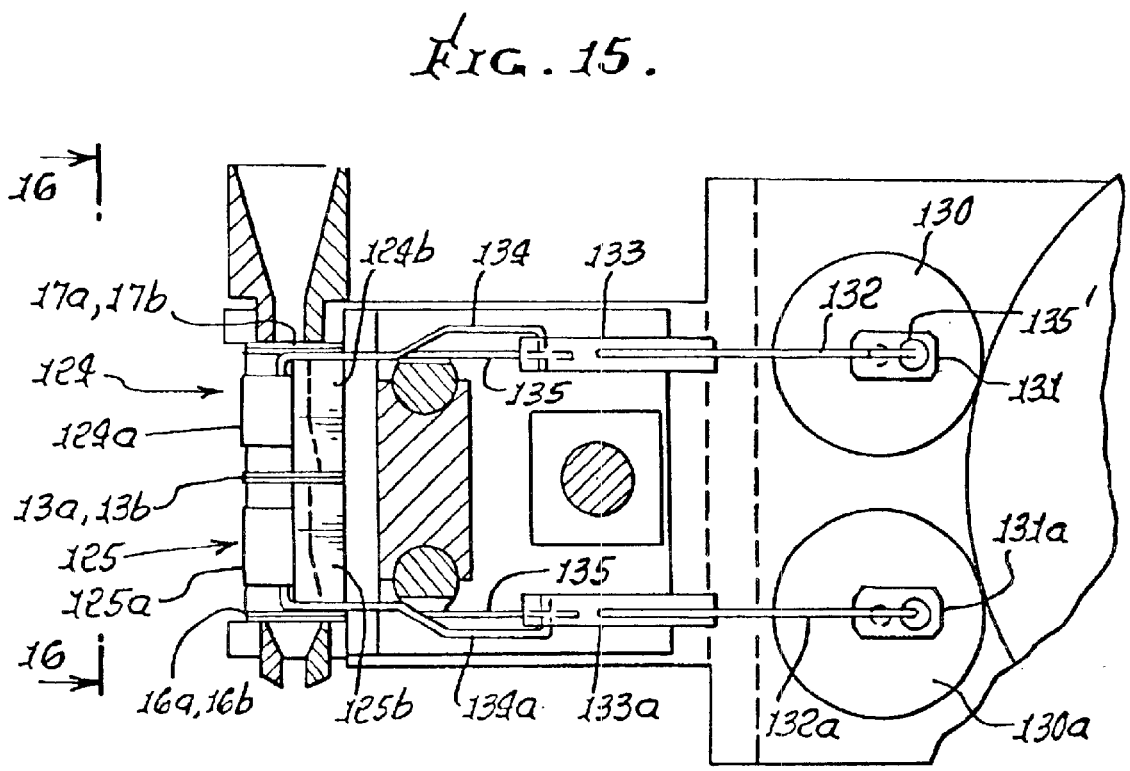
FIG. 15 is a plan view on lines 15—15 of FIG. 14.
Figure 16:
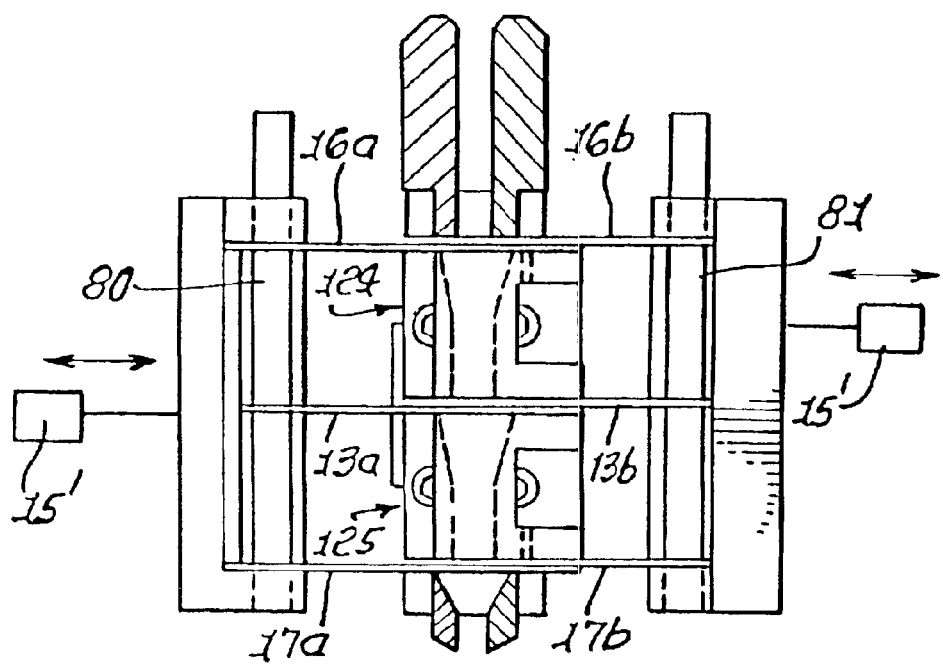
FIG. 16 is an end elevation taken on lines 16—16 of FIG. 15.

In FIGS. 14–16, the blade arrangements and operations are the same as in FIGS. 1a–1f, and 13a and 13b, the blades moving vertically. Note in this regard the blade actuators 180 and 181, carrying rods 80 and 81 see in FIGS. 9–12. Such actuators are also seen in FIGS. 3 and 8. Drives for the actuators are schematically indicated at 15' in FIG. 16. Wire 10 passing endwise through the blade region is guided by guides 124 and 125, corresponding to guides 24 and 25 in FIGS. 1a–1f. As in FIG. 11, a part of each guide is movable away from a slug of insulation formed by closing of the blades, as described above.

In this embodiment, the two guides have parts 124a and 125a that are swingable away from the wire axis (see the broken line position 124a' of guide part 124a in FIG. 14 for example). Guide parts that do not move away from the wire are indicated at 124b and 125b. A pin 127 pivotally attaches each part 124a and 125a to frame structure 128.

A reciprocating drive swings the part 124a to position 124a' and back, under the control of master control 35. That drive, for example, includes a motor 130, and linkage means, including interconnected links 131–134, operatively connected between the motor shaft 135" and the part 124a. A corresponding motor 130a and links 131a–134a are connected to part 125a to pivot same. Guide parts 124a and 125a have concave arcuate wire guide surfaces, as at 124aa.

Also provided is a pusher and drive therefor for displacing the pusher to bodily push against the side of the severed length of sheathing (slug) for ejecting same in operative conjunction with moving (pivoting) of the part 124a. See for example the reciprocating plunger 135, and its drive, connected to the same drive as used to pivot the part 124a.

Figure 17:
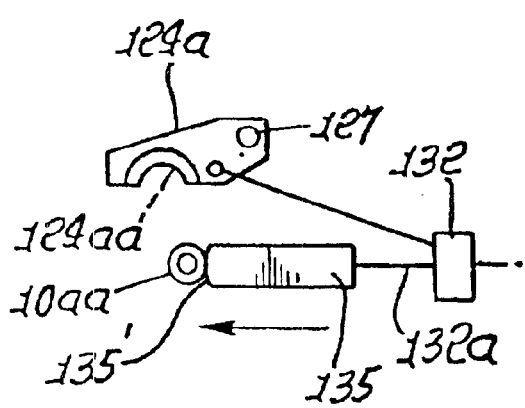
FIG. 17 is a schematic showing of slug pusher operation.

In FIG. 14, the plunger 135 is connected to the linkage 133 and 132. See also FIG. 17 showing plunger 135 connected at 132a to link 132. The nose 135' of the plunger is shown pushing the wire slug 10aa to the left. A similar pusher is operated in conjunction with pivoting of wire guide part 125a. A wire guide opening appears at 140 in FIG. 14. Motors 130 and 130a operate in one direction (rotate 180°), and then operate in reverse (−180°), to drive the pushers and swingable guide parts.

Referring now to FIGS. 18a–18f, they correspond generally and respectively to FIGS. 1a–1f, insofar as successive blade positions in severing the wire 210 and stripping insulation therefrom are concerned. Thus, first cutter means includes the two wire-cutting blades 213a and 213b of a first set, located or carried for movement laterally toward and away from the wire axis 212. Second cutter means includes blades 216a and 216b located for movement toward and away from axis 212, for stripping sheathing from the wire at one axial side of blades 213a and 213b; the third cutter means includes blades 217a and 217b movable toward and away from axis 212, for stripping sheathing from the wire at the opposite axial side of blades 213a an 213b.

Blades 216a and 216b, and blades 217a and 217b, do not sever the wire, but closely approach the wire while cutting into sheathing 211, for stripping purposes. See FIGS. 18d and 18e. A drive 218 is connected at 218a to blades 213a, 216a, and 217a, to move them laterally and simultaneously toward and away from the wire; and a drive 219 is connected at 219a to blades 213b, 216b, and 217b, to move them laterally and simultaneously toward and away from the wire.

The blades are shown as thin, flat, steel sheets, formed to have dovetailed tongue ends at $213a_1$, $216a_1$, $217a_1$, and at $213b_1$, $216b_1$, and $217b_1$. Such dovetailed ends are receivable in and gripped by dovetailed groove holders schematically indicated at 229 and 230, assuring ease of replacement of the blades, while also assuring positive gripping of the blades and their proper alignment.

Such holders 229 and 230 may be considered as parts of the drives 218a and 219a, respectively. The blades themselves have V-shaped cutting edges arranged in pairs in opposed relation. Thus, blades 213a and 213b have opposed V-shaped edges at $213a_2$ and $213b_2$, which sidewardly slidably overlap completely during wire severing (see FIG. 18b); blades 216a and 216b have opposed V-shaped edges at $216a_2$ and $216b_2$, which sidewardly slidably overlap to limited extent during sheathing stripping (see FIGS. 18d and 18e); and blades 217a and 217b have opposed V-shaped edges at $217a_2$ and $217b_2$, which sidewardly overlap to limited extent during sheathing stripping (see FIGS. 18d and 18e). Such opposed V-shapes of the cutting edges assure complete severing of the sheathing.

Figures 18A, 18B:
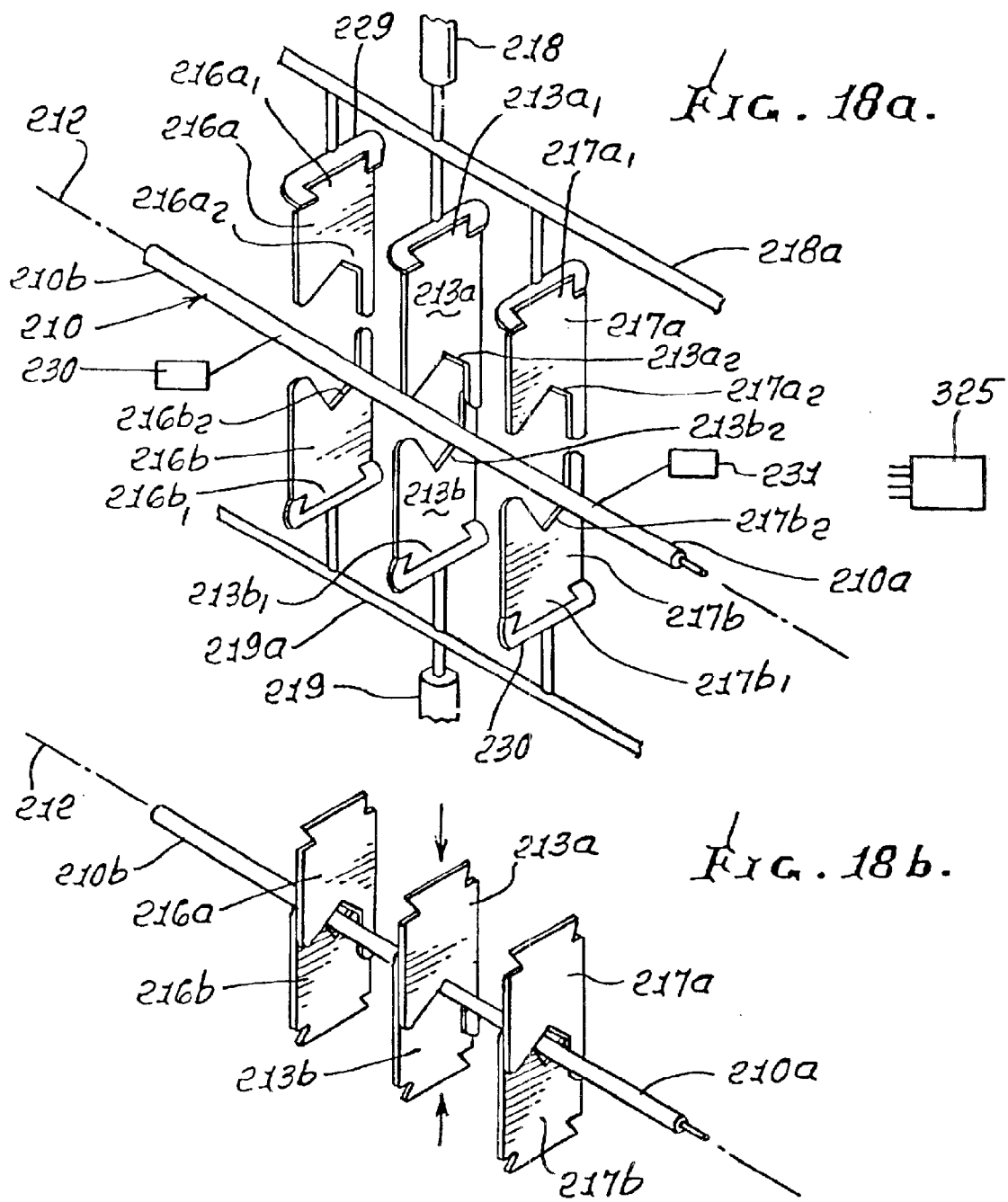

FIG. 18a shows wire 11 axially endwise advancement of the wire to first position. FIG. 18b shows the step of severing the wire, thereby to form wire forward and rearward sections 210a and 210b, the blades 213a and 213b being advanced laterally toward the wire, from opposite sides, to accomplish severing.

Note that wire forward section 210a has a rearward end portion 210aa; the wire rearward section 210b has a forward end portion 210bb.

FIG. 18c shows the step of controllably separating the two sections 210a and 210b axially endwise oppositely, as to the positions shown, in which the end portions 210aa and 210bb are spaced from the close-together blades 213a and 213b. Guides provided between the blade sets serve to accurately guide the wire and the sections 210a and 210b during the cutting and severing operation. Such guides are seen for example in 524 and 525 in FIGS. 34, 35a, 35b, 35c, 37, 38, and 39. Note the tapered entrances 524a and 525a to the guides to receive and center the forwardly advanced wire.

Wire drives, schematically indicated at 230 and 231, are controllably operated to axially advance and separate the two wire sections 210a and 210b, as indicated in FIGS. 18a and 18c.

FIG. 18d shows a sub-step included within the step of stripping sheathing from the forward section rearward portion and from the rearward section forward portion, thereby to expose wire ends at the portions. Note that blades 216a and 216b are simultaneously advanced laterally oppositely, as blades 217a and 217b are also simultaneously advanced laterally oppositely (and to the same extent if such stripping is to be equal for each wire section).

Note that blades 213a and 213b now extend in laterally overlapping condition, due to operation of blade drives 218 and 219 as one, i.e., equal downward lateral displacement for blades 213a, 216b, and 217b, and equal upward lateral displacement for blades 213b, 216b, and 217b; however, they may be separately driven so as not to extend in such relation, as shown. Blades 213a, 216a, and 217a may be connected together to move downwardly to equal extent; and blades 213b, 216b, and 217b are connected together to move upwardly as one, for extreme simplicity.

Figure 18E:
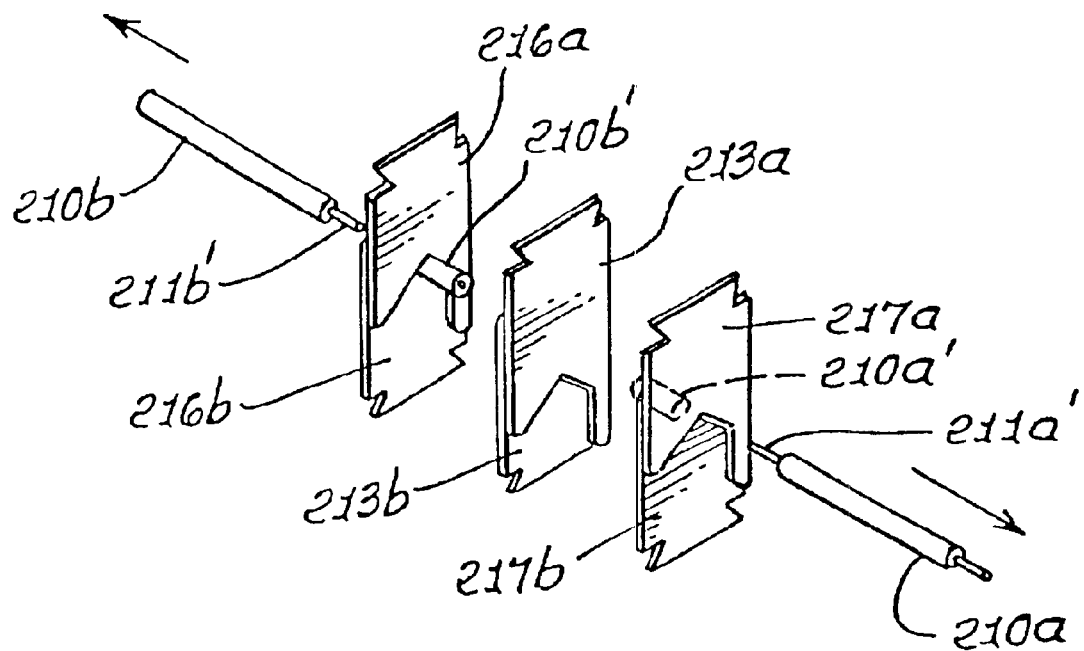

FIG. 18e shows operation of the wire drives 230 and 231, to further endwise separate the wire section 210a and 210b, so as to pull or strip two sheathing end portions 210a', and 210b' from the wire sections 210a and 210b, thereby to expose the wire core end portions 211a' and 211b'. The stripped sheathing end portions or slugs 210a' and 210b' are rejected, as will be seen, from between the pairs of guides 524 and 525, which may be shaped to provide for slug sideward de-confinement and ejection, as will be described further.

Figure 18F:
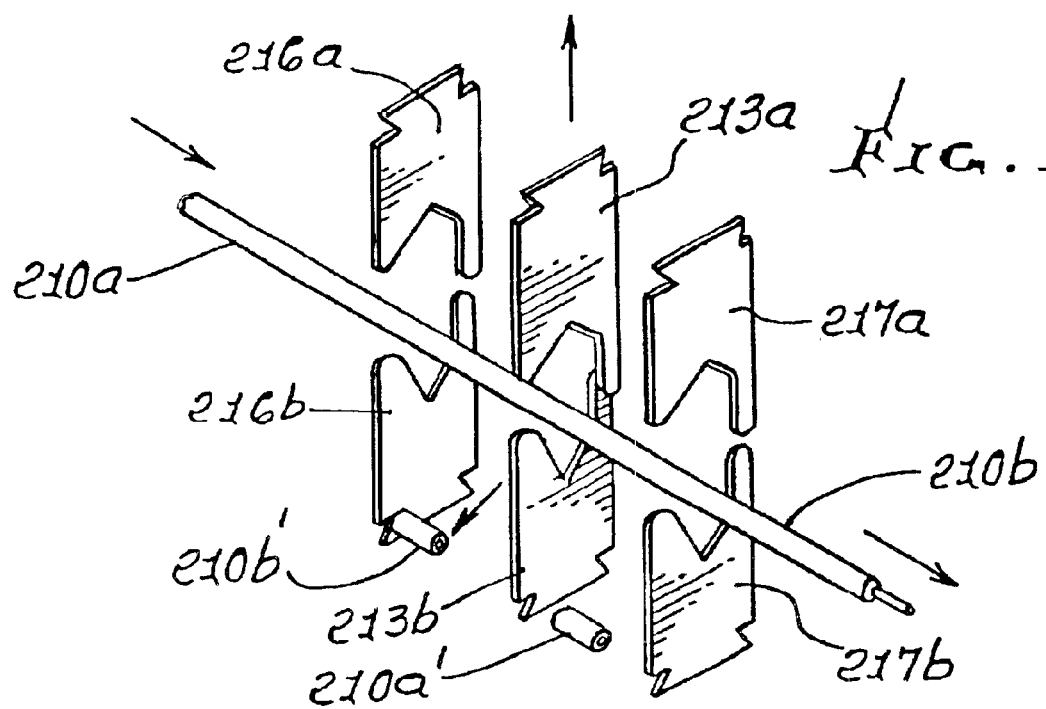

FIG. 18f shows all blades laterally retracted and the wire rearward section 210b fully advanced into position corresponding to FIG. 1a position, for controlled length, endwise positioning to be processed, as in FIGS. 18b–18e, to provide an exposed core end at its opposite end. Thus, controlled length wires (or cables), with exposed core lengths at each end of each wire, are efficiently and rapidly, and controllably provided. See master control 325 to control all the drives, as described, and to be described.

Referring to FIGS. 19–25, apparatus to perform the operations described as respects FIGS. 18a–18f is shown in detail. A frame is provided as at 240–244 and 244a, to mount conveyors, as represented by roller groups 245 and 246. These may be regarded as included within the wire drives 230 and 231, as mentioned. Such conveyors may include two rearwardly positioned endless belts 247 and 248; and two forwardly positioned endless belts 249 and 250. The belts 247 and 248 provide stretches, as at 247' and 248', which are adapted to sidewise flatly grip the wire or cable 210 (and specifically section 210b) for endwise advancement and retraction, as during separation of the wire sections 210a and 210b in FIG. 18c. Likewise, stretches 249' and 250', provided by belts 249 and 250, are adapted to sidewise grip the wire or cable 210 (and specifically the forward wire section 210a) for endwise advancement and retraction.

Figure 20:
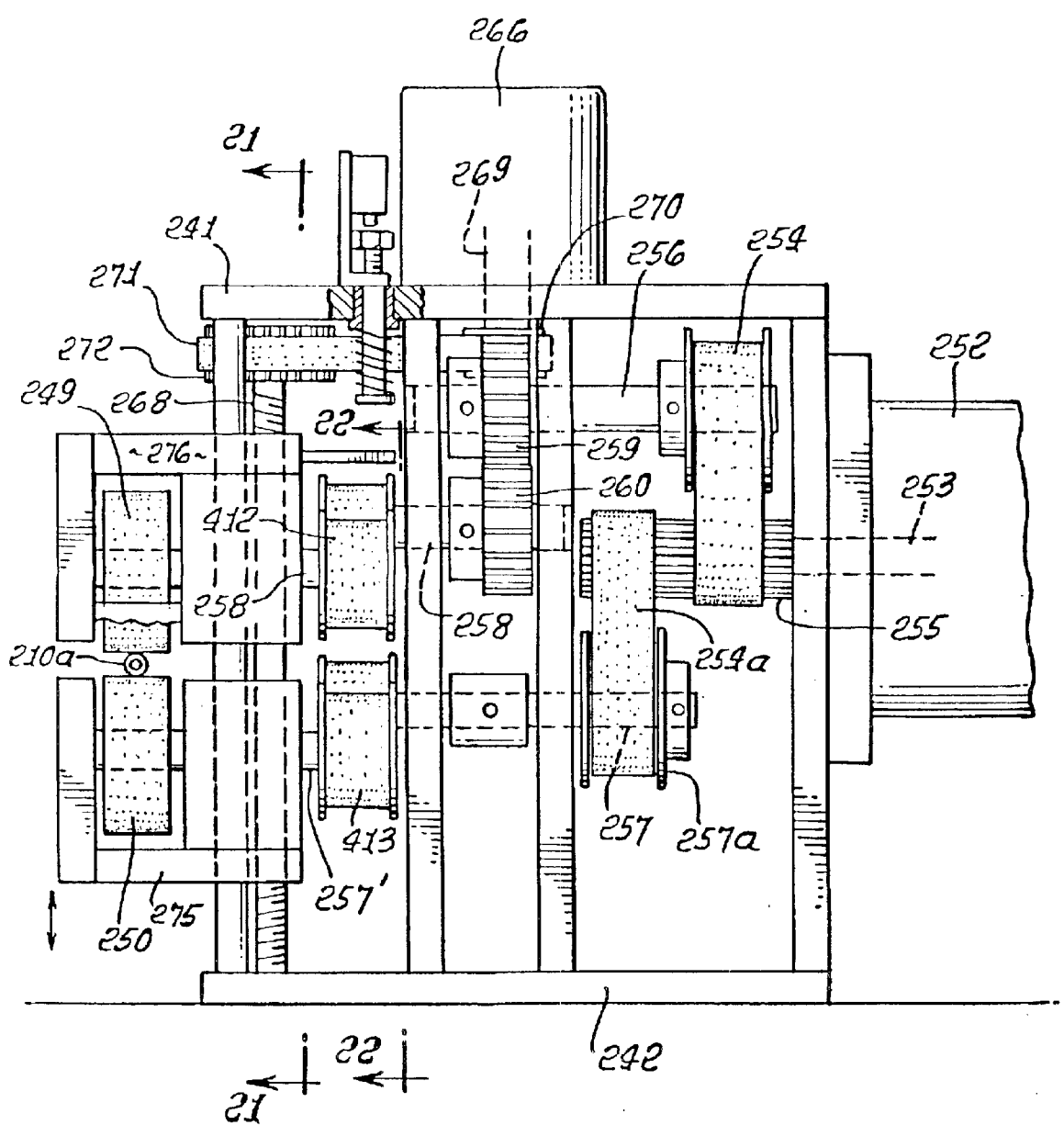
FIG. 20 is an end view taken on lines 20—20 of FIG. 19.
Figure 23:
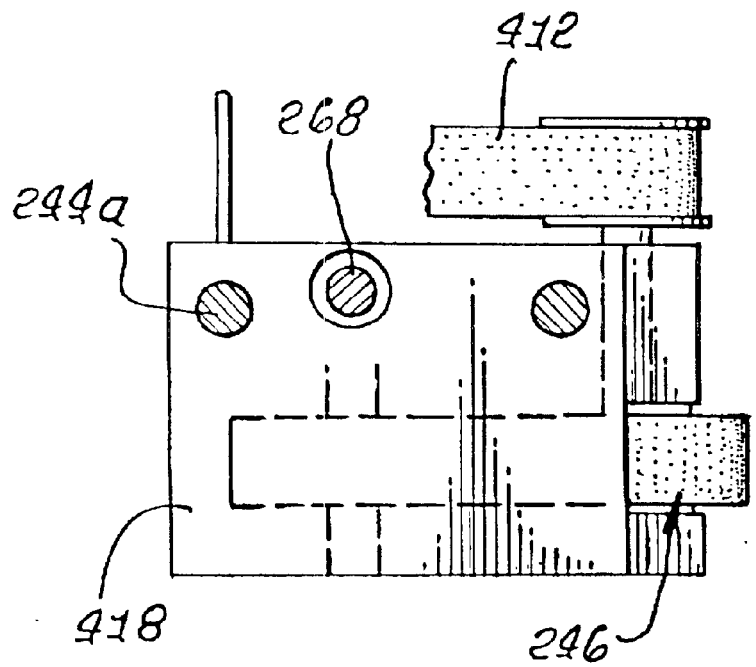
FIG. 23 is a section taken on lines 23—23 of FIG. 21.

Belts 249 and 250 are driven to advance or retract the wire section 210a, as from a drive motor 252 (see FIG. 20). The output shaft 253 of the motor drives belt 254, as via a sprocket 255, and belt 254 drives shaft 256. Sprocket 255 also drives a belt 254a, which drives a shaft 257 via a pulley 257a. Shaft 256 drives another shaft 258, as via angular reversing gearing 259 and 260, in order to drive shaft 258, shaft 258', and upper conveyor belt 249 counterclockwise; whereas, lower shaft 257, shaft 257', and lower conveyor belt 250, are driven clockwise, in FIG. 19. The conveyor belts drive the wire endwise in one axial direction; whereas, when the motor 252 is reversed, the wire is driven endwise in the opposite axial direction.

FIG. 22 shows additional coupling 410 between offset shafts 258 and 258', and coupling 411 between offset shafts 257 and 257'. Such couplings include the timing belts 412 and 413, and timing gears 414 and 415, and 416 and 417, as shown. Shafts 257 and 258 are typically not pivotable (to swing bodily); whereas, shafts 257' and 258' may pivot, in effect, as their support plates 418 and 419 are moved up and down as lead screw 268 rotates. See the horizontal lost-motion, connection-type, bearing supports 418' and 419' for those shafts in FIG. 22. This allows the conveyor belt stretches 249' and 250' to be flatly and adjustably engaged and disengaged with the wire or cable 210, as seen in FIG. 22. See also FIG. 21.

FIG. 19 also shows conveyor rotors 260 and 261, and 262 and 263. These carry the belts 249 and 250. Axle 258" for rotor 261 is suitably driven by axle 258', as via a belt and pulleys; and axle 257" is suitably driven by axle 257', as via a belt and pulleys (see in FIG. 2 drive belts 14 and 15, etc.). Accordingly, when the belt stretches 249' and 250' are closed against the opposite sides of the wire 210b, and the motor 252 is operating, the wire is displaced endwise. Similar drives for conveyors 247 and 248 are provided, as shown.

Means is provided to move the conveyor belt stretches 249' and 250' relatively toward one another to clutch the wire, and away from one another to de-clutch the wire. See for example in FIGS. 19–21 the motor or drive 266 carried by a frame part 241 to rotate a vertical lead screw shaft 268, as via motor output shaft 269, sprocket 270, timing belt 271, and sprocket 272 on shaft 268. The screw shaft has screw thread engagement at 273 and 274, with nut members 275 and 276 associated relatively with plates 418 and 419.

Plate 418 supports the end of shaft 258', for up and down movement; and plate 419 supports the end of shaft 257' for up and down movement. Support of such shaft ends is via the lost-motion connections described above at 418' and 419'. Screw threaded connection to the nut 275 is oppositely "handed" relative to threaded connection to nut 276, so that, when shaft 268 is rotated in one direction about its axis, the nuts 275 and 276, and plates 418 and 419 (and shafts 257' and 258') are yieldably displaced toward one another, whereby conveyor stretches 249' and 250' may clamp the wire; and when the shaft 268 is rotated in the opposite direction about its axis, the nuts and plates are yieldably displaced away from one another, and the wire is de-clutched. Nuts 275 and 276 are confined in vertical slots 275' and 276' in plates 418 and 419, allowing relative movement between the nuts and plates.

Compression springs 290 and 291 are provided (see FIGS. 22) between the nuts and the supports 418 and 419 to yieldably urge the supports 418 and 419 toward one another, in response to lead screw 268 rotation in one direction, to provide clearance "take-up" for better control of wire gripping, especially for smaller diameter wires. Those springs engage shoulders 418a and 419a, as shown. Additional compression springs 290a and 291a are provided between the nuts and shoulder 418b and 419b to yieldably urge the plates and shafts apart as the lead screw rotates in the opposite angular direction. Similar structures are associated with the conveyors 247 and 248, and bearing the same identifying numbers.

The rearward conveyor unit 245 embodies conveyor belt drive, and up/down movement, the same as described in connection with unit 246 in FIGS. 19–22. The drive motor 252a (not shown) for driving the belt stretches 247' and 248' forwardly and reversely is similar to motor 252, and corresponds to motor 66 in FIG. 2. The motor to control belt clamping of the wire is seen at 266a in FIG. 19. Mechanism operation between such rearward motors and the respective belts 247 and 248 is the same as mechanism between motors 266 and 252, the belts 249 and 250. The forward and rearward belt motors 252 and 252a are typically operated simultaneously, either to drive the wire or wire sections forwardly, as in FIGS. 18a and 18f, or to drive the wire sections endwise oppositely, as in FIGS. 18c and 18e. A master control to control all drives in a predetermined manner is seen at 325 in FIG. 18a.

Figure 30:
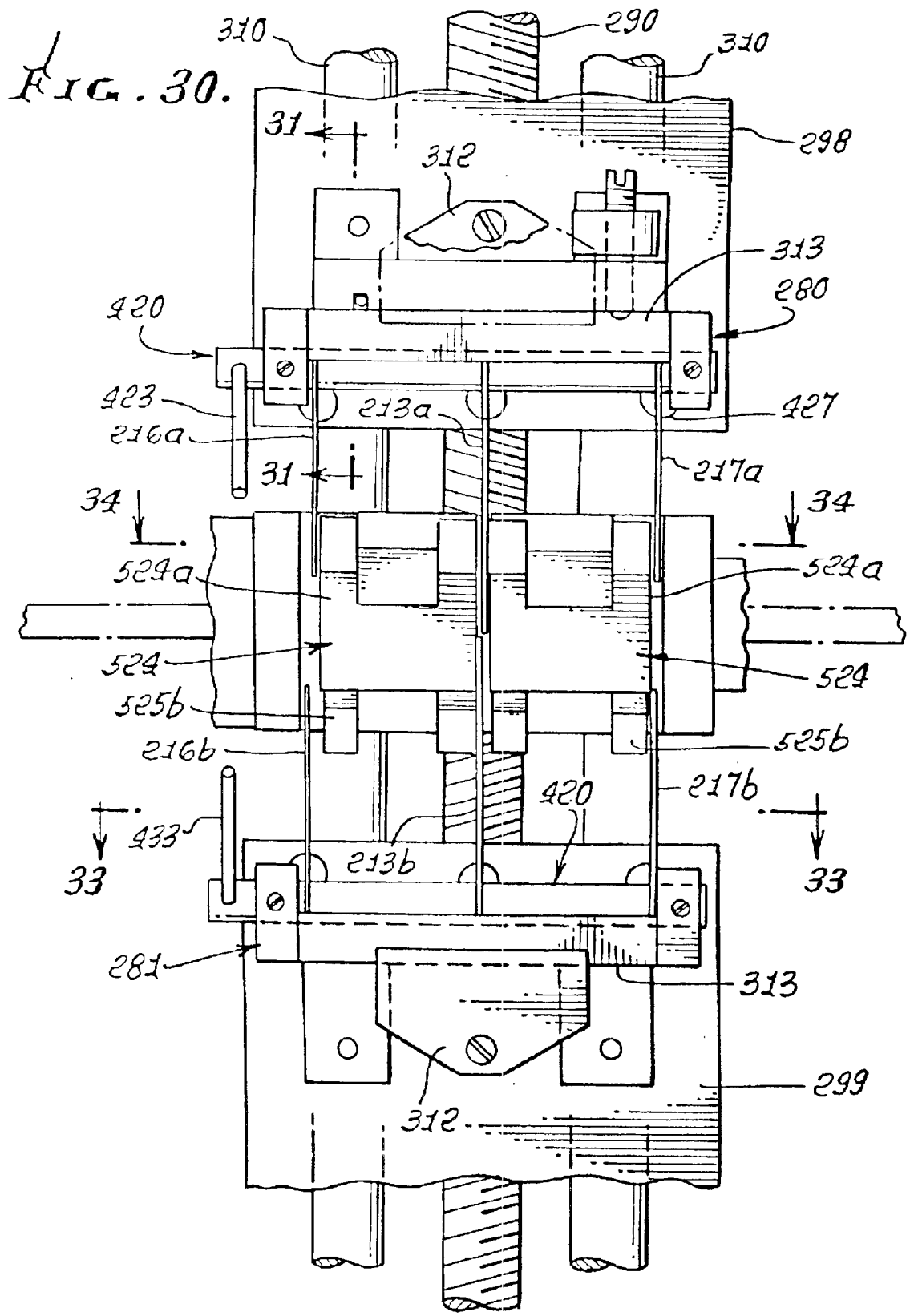
FIG. 30 is an enlarged frontal elevation taken on lines 30—30 of FIG. 25.
Figure 31:
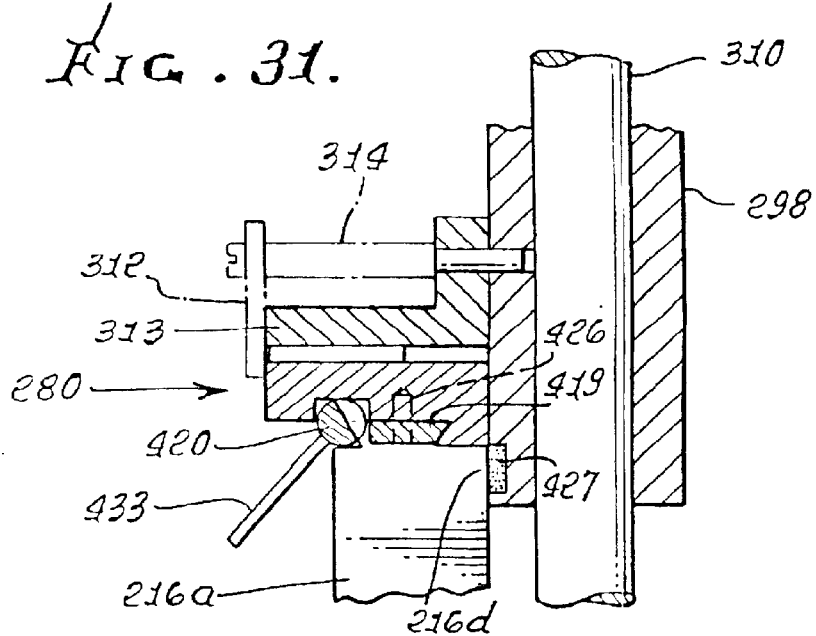
FIG. 31 is an enlarged vertical section taken on lines 31—31 of FIG. 30 showing blade retention means.

In FIGS. 25, 30, and 31, blades 213a, 216a, and 217a at the upper side of the wire are interconnected, as by the laterally extending blade holder 280; and the blades 213b, 216b, and 217b at the lower side of the wire are interconnected by laterally extending blade holder 281, vertically spaced from holder 280. Those holders are vertically movable toward one another to effect wire severing, as by V edges of blades 213a and 213b. Those holders are further movable toward one another to effect penetration into the sheathing of the edges of blades 216a, 216b, and 217a and 217b. Thereafter, the wire forward and rearward sections 210b and 210a are separated, axially, as in FIGS. 18e, to endwise strip the insulation tubular slugs off the wire cores, a typical slug 210aa being ejected, as in FIG. 35c. That view also shows dropping of the ejected slug, away from the mechanism.

Means to effect the described lateral movement of the blade holders 280 and 281 is shown in FIGS. 19, 25, and 30. As seen, a vertical lead screw 290 is rotatable by a drive motor 291, carried by drive structure 292a–292c. Screw 290 bearings are indicated at 290a. Belt and pulley elements 501–503 connect motor 291 to the screw. As screw 290 rotates in one direction about its axis, nuts 294 and 295 on the screw threads travel axially oppositely along the screw to move blade holder 280 down and holder 281 upwardly. See sliding blocks 298 and 299 connecting holder 280 with nut 294, and holder 281 with nut 295. Block bearings 298a and 299a slide along guide rods 310, carried by frame structure 292a and 292c.

Figure 32:
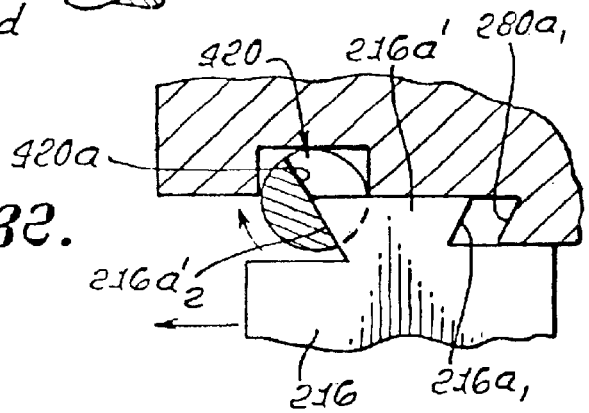
FIG. 32 is a further enlarged section showing a portion of FIG. 31, with a blade retention means in released position.
Figure 33:
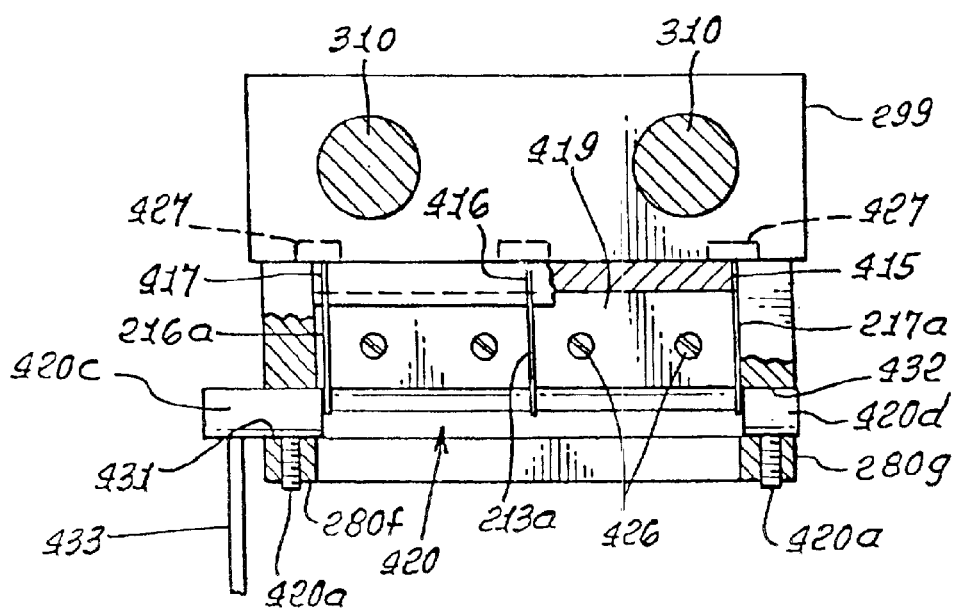
FIG. 33 is a horizontal plan view taken in section on lines 33—33 of FIG. 30.

In FIGS. 31–33, the blade holder 280 is held in interengagement at 311 with the block 298 by a clamp 312, which engages the front side of the holder at 313. A fastener 314 attaches the clamp to the block 298. Dovetailed tongue end 216a' of blade 216a has one angled edge surface $216a_1$', engaged with correspondingly dovetailed surface $280a_1$, for retention. A retainer in the form of a shaft 420 has an interior flat surface 420a rotatable into corresponding engagement with the oppositely angled surface $216a_2$' of the blade, thereby to retain and locate the blade, vertically. Set screws 420a keep shaft 420 from rotating.

FIGS. 31 and 33 also show the dovetailed portions of three blades fitting in position, as in vertical slots 415–417, defined by a blade clamp bar or bars 419. Screws 426 attach bar or bars 419 to blade holder 280. Magnets 427, carried by the block 298, are positioned to magnetically attract vertical edge portions of the blades (as at 216*d* in FIG. 31), to keep the three blades positioned as they are initially received in slots 415–417, and prior to rotation of shaft 420, as described, into FIG. 31 position, to positively hold the blade. Shaft 420 has end extents 420*c* and 420*d* carried in bearing openings 431 and 432 in holder 280 parts 280*f* and 280*g*. See also manually rotatable handle 433 of shaft 420. Reverse rotation of shaft 420 allows quick, manual, frontward reversal, and replacement of the blades.

Referring now to FIGS. 26–29, 34, 35*a*–35*c*, and 36, structure is shown that serves to guide the wire during its axial movement relative to the blades, and to facilitate removal of a severed slug or slugs or insulation or sheathing material.

Figure 34:
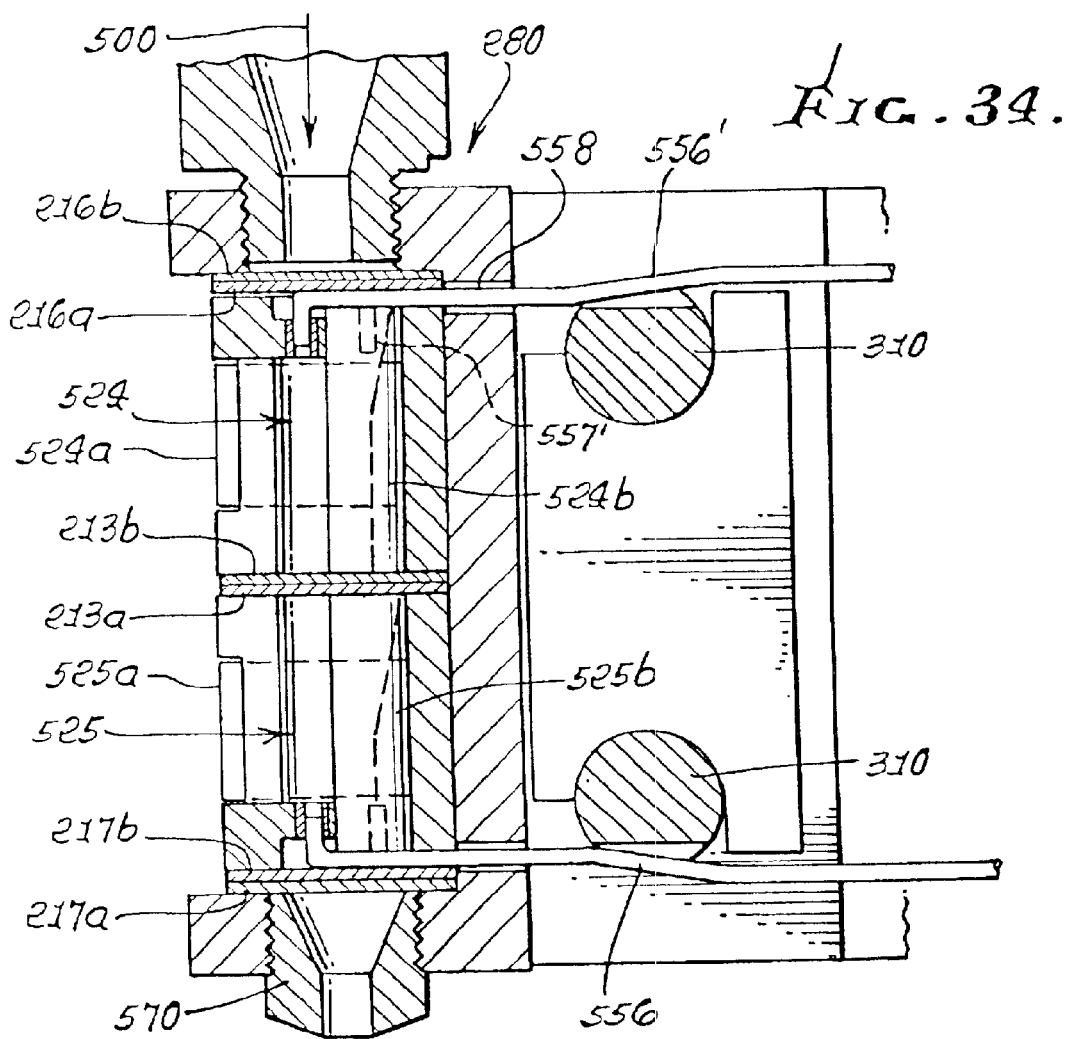
FIG. 34 is a horizontal plan view taken in section on lines 34—34 of FIG. 30.
Figure 36:
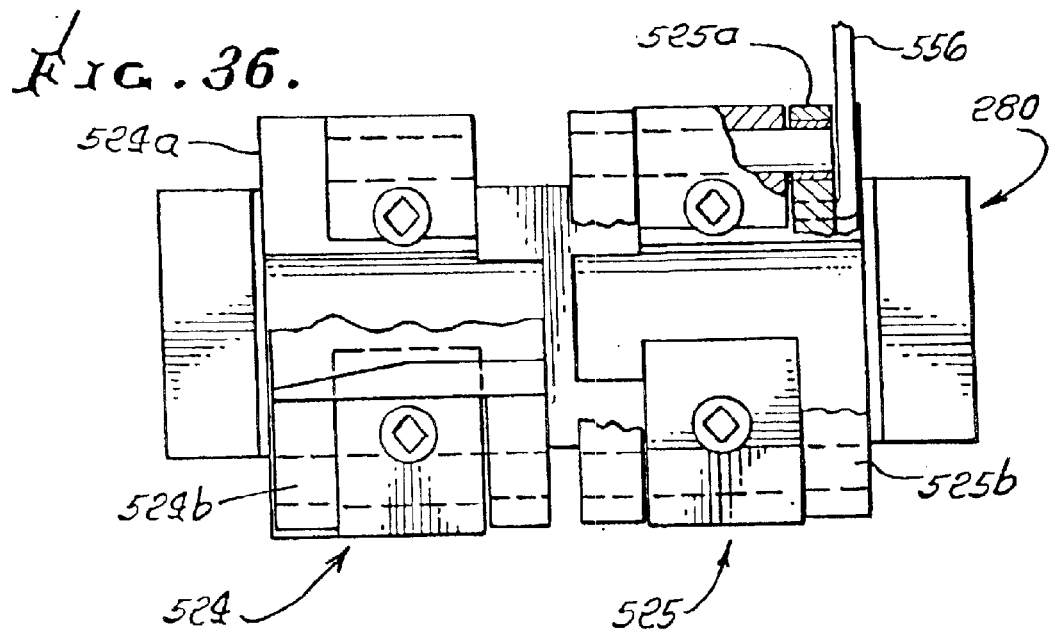

In FIG. 34, wire passing in horizontal direction 500 through the blade region is guided by two guides generally indicated at 524 and 525. A part of each guide is movable away from a slug of insulation formed by closing of the blades, and wire retraction, as described above. As shown, the two guides have parts 524*a* and 525*a* that are swingable laterally and upwardly, away from the wire axis, as better seen in FIG. 35*c*.

Figure 35A:
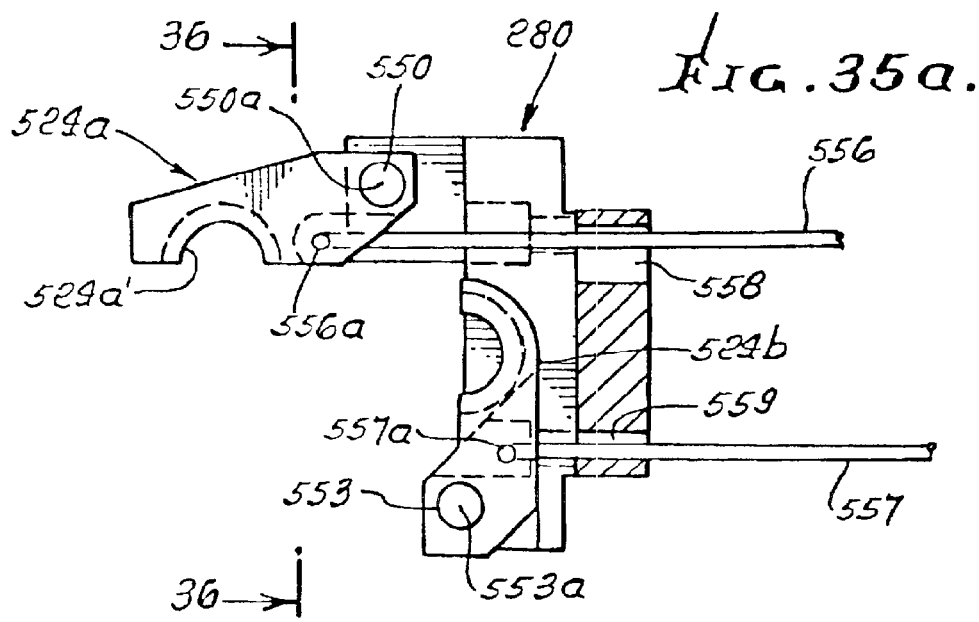
FIGS. 35a–35c are enlarged views showing actuation of wire slug trap door and pusher elements.
Figure 35B:
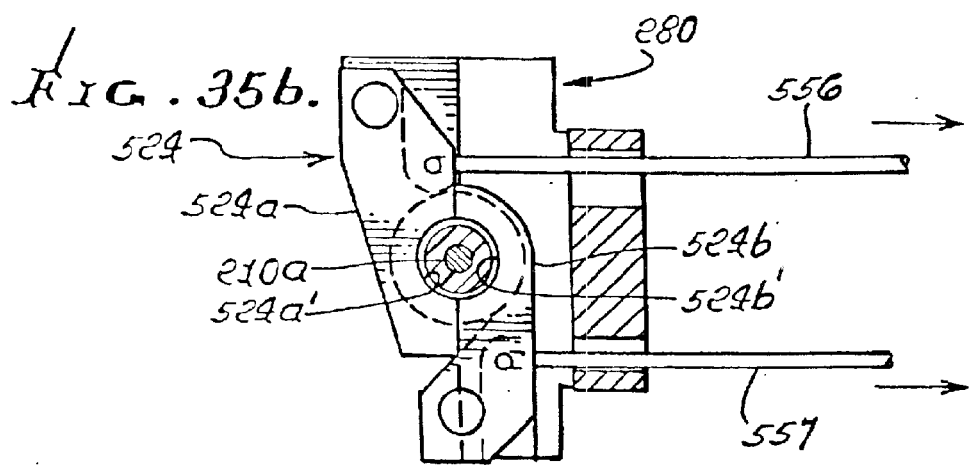

Guide part 524*a* is pivotally connected at 550 to blade holder 280, to swing about horizontal axis 550*a* extending parallel to the direction of wire advancement. Part 524*a* may be considered as a trap door, in the sense that when swung to FIGS. 35*c* and 35*a* positions, it has swung away from the side of the wire slug, leaving the slug free for ejection. Part 524*a* forms a semi-circular guide surface 524*a*' that guides the wire 210 when the part 524*a* is in closed position, as seen in FIG. 35*b*. Part 525*a* of guide 525 has construction and operation the same as described for part 524*a*.

The guides 524 and 525 also incorporate parts 524*b* and 525*b* which act as pushers, to bodily push against the sides of the severed lengths (slugs) of sheathing, for ejecting same laterally, in cooperative conjunction with pivoting movement of parts 524*a* and 525*a*, as described. Thus, part 524*b* is pivotally connected at 553 to blade holder 280, to swing about horizontal axis 553*a*, extending parallel to the direction of wire advancement.

Figure 35C:
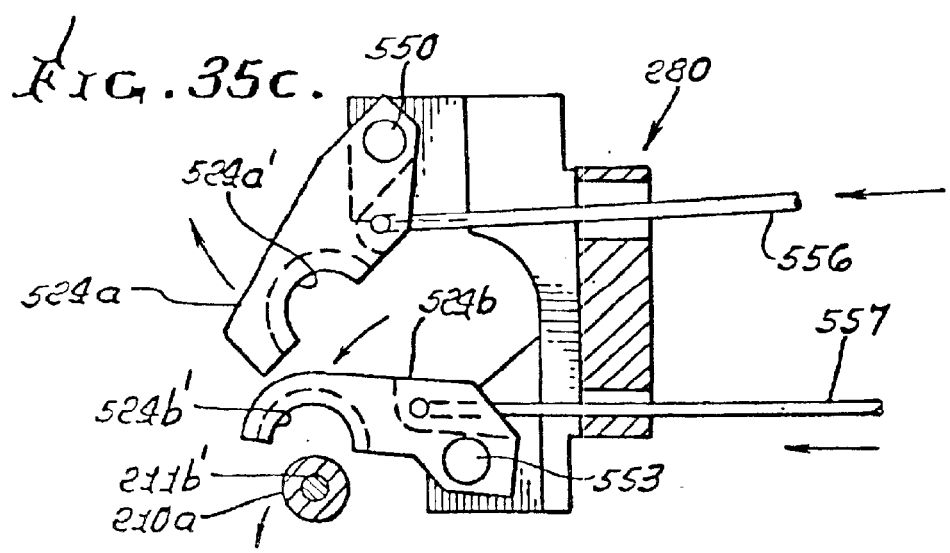
Figure 37:
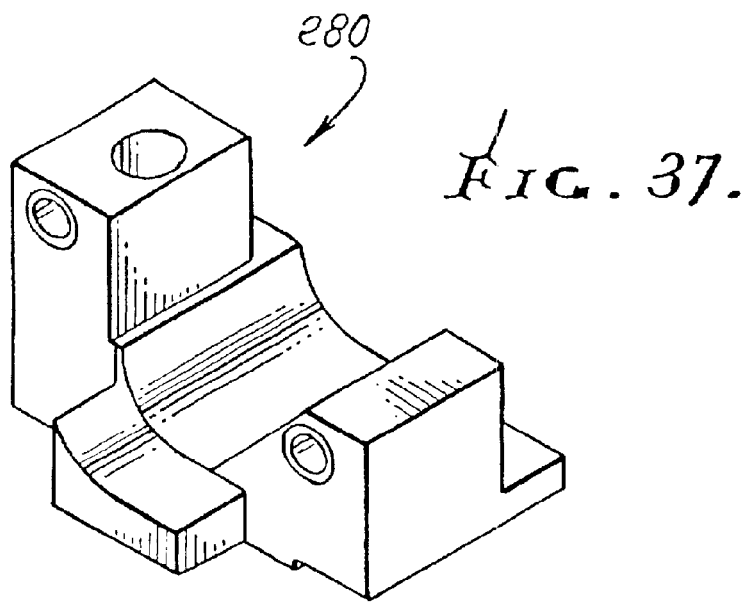
FIG. 37 is a perspective view of a wire guide element.
Figure 38:
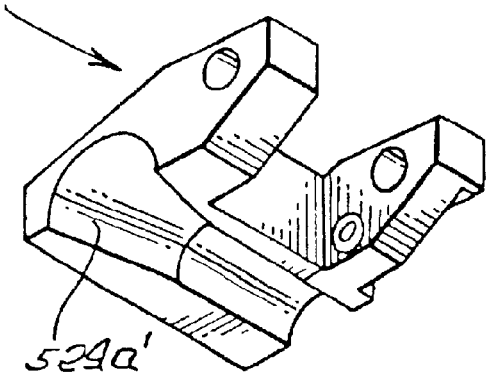
FIG. 38 is a perspective view of a wire slug trap door element.
Figure 39:
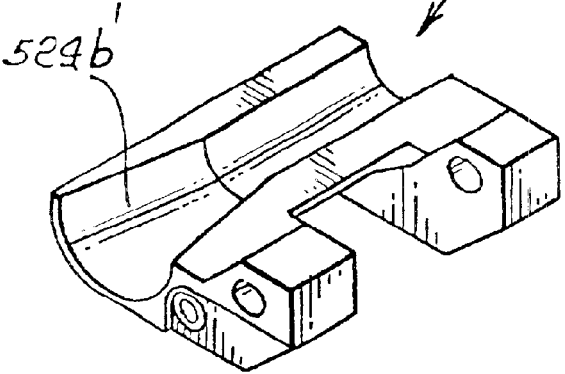
FIG. 39 is a perspective view of a wire slug pusher door element.

Part 524*b* may be considered as a pusher or ejector, in the sense that, as seen in FIG. 35*c*, it bodily ejects or displaces the wire slug 211*b*' laterally and downwardly, positively and assuredly away from the mechanism, immediately after the trap door part 524*a* opens (swings to the position seen in FIG. 35*c*). Part 524*b* has a semi-circular guide surface 524*b*' that guides the wire 210 when parts 524*a* and 524*b* are in closed positions, as seen in FIG. 35*b*.

Part 525*b* of guide 525 has a construction and operation the same as described for part 524*a*. Parts 525*a* and 524*b* lie between blades 216*a* and 216*b*, and blades 213*a* and 213*b*; and parts 525*a* and 525*b* lie between blades 213*a* and 213*b*, and blades 217*a* and 217*b*, as is seen from FIG. 34.

The trap door parts 524*a* and 524*b*, and pusher parts 524*b* and 525*b*, have associated reciprocating drives, to open and close them in timed relation, as described. See for example in FIGS. 35*a*–35*c* the links 556 and 557, respectively, pivotally connected with parts 524*a* and 524*b*, as at 556*a* and 557*a*, the links passing through guide openings 558 and 559 in the blade holder structure.

Figure 29:
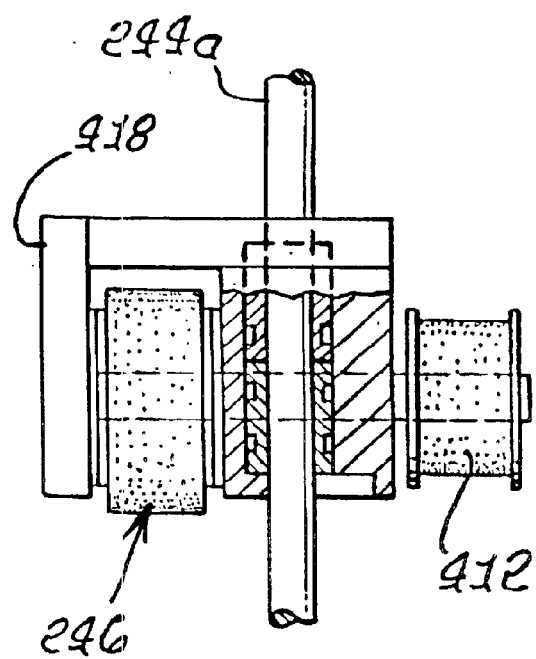
FIG. 29 is an elevation taken on lines 29—29 of FIG. 28.

FIGS. 28 and 29 show link 556 driven by a motor 560, as via crank arm 561 connected to the motor shaft 560*a*, link 562 extending from 561 to a slider 563, and that slider also connected to link 557. Frame part 565 carries the motor. Link 557 is also driven by motor 560, as via crank arm 561, link 558 extending away from 561 to a slider 559', and that slider connected to link 557. Guide posts for the sliders appear at 563*a* and 559*a*. See also FIG. 29.

FIG. 34 shows corresponding actuating link 556' for the trap door part 524*a*, and link 557' for the pusher part 524*b*, these operated in the same way as links 556 and 557.

Finally, a sensor is provided to sense arrival of the wire endwise in proximity to the trap door parts and to the pusher elements, as described. See sensor 569 in FIG. 19.

Figure 40:
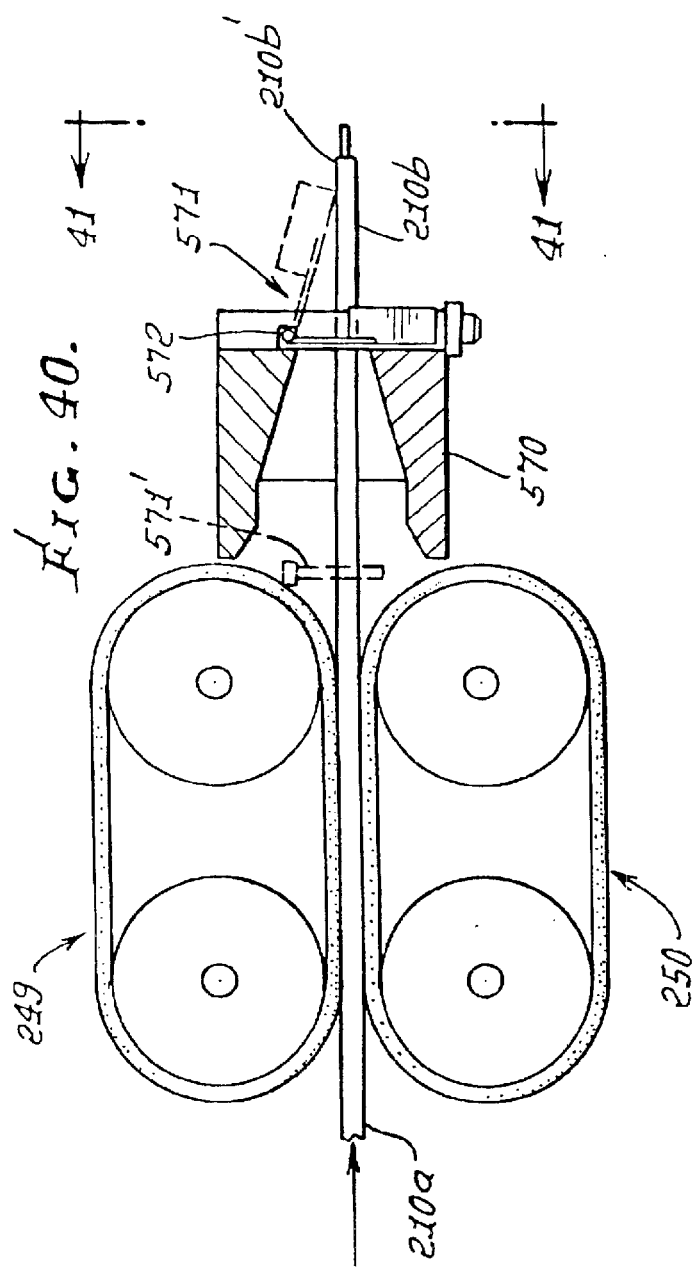
FIG. 40 is a side elevational view of a wire advancement detection means.
Figure 41:
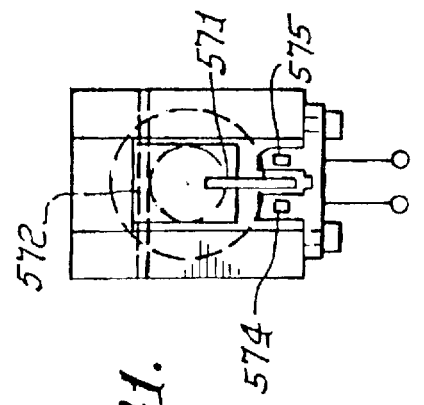
FIG. 41 is an end view taken on lines 41—41 of FIG. 40.
Figure 92:
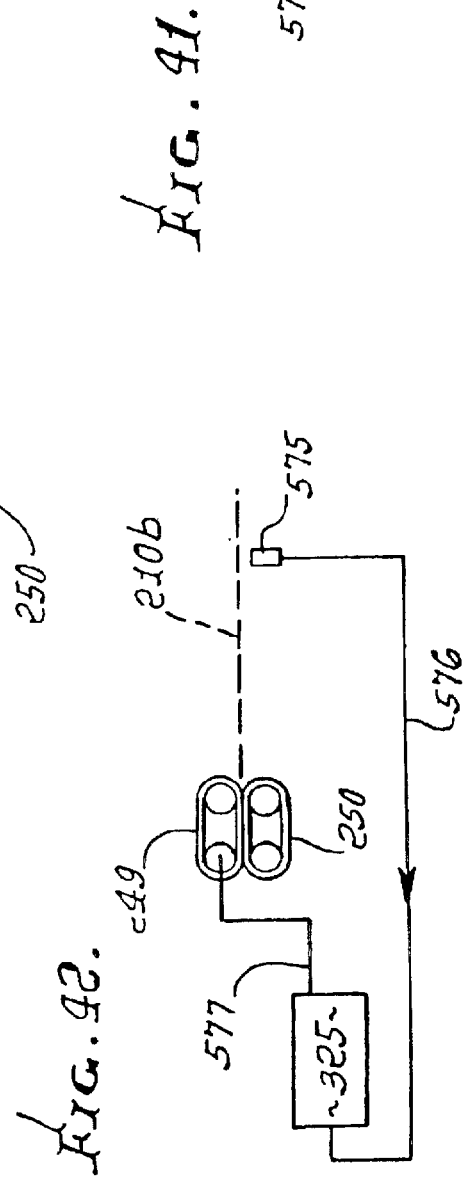

FIGS. 34 and 40 show a tapered, tubular guide 570 at which the advancing wire end arrives after traversing the blade region.

In FIG. 40, the sensor takes the form of a very lightweight, swingable door 571 extending across the wire path, and hinged at 572 to swing forwardly upwardly in response to engagement by the traveling wire 210*b* forward end 210*b*'. Such swinging movement is sensed, as by an optical sensor. The latter typically includes a light beam (electromagnetic wave) source 574 producing a beam sensed at 575, such sensing occurring for example when the beam is interrupted by door swinging. This serves to notify the operator that the wire end has arrived at the sensor position, i.e., the wire has traversed the blade zone. For example, the sensor at 575 in FIG. 42 may control drive 325, so as to stop the advancement of the wire conveyors 249 and 250. See circuit connections 576 and 577. An alternate position for the door is shown at 571', in closer proximity to the conveyor means 249 and 250.

Referring now to FIGS. 43–48, the multiple blade structures shown are adapted to use in apparatus of the type described above for processing wire to cut the wire into sections and to strip sheathing from the sections to expose section wire ends, the apparatus including conveyor means for displacing the wire axially endwise.

As shown, upper and lower supports are provided at 600 and 601 for supporting multiple blade structures. The latter includes at least two of such structures, seen at 602 and 603, that mutually interfit as they are moved (by supports 600 and 601 for example) relatively oppositely toward and away from the axis 604 defined by the wire or cable 605 to be cut, in directions generally normal to that axis. See arrows 606 and 607.

Referring also to FIG. 45, at least one of the structures (603 for example) defines first shoulders 608*a* and 609*a* on ribs 608 and 609, respectively, such shoulders being elongated in directions 606 and 607, and being laterally spaced and opposed, to form intermediate space 610 between which the other of the two structures (601 for example) or a portion thereof extends or relatively moves or slides, as during such relative movement. Shoulders 608*a* and 609*a* may, in this regard, act as guide shoulders on blade-strengthening ribs 608 and 609; such structures also enhancing correct positioning for gripping and cutting of the cable by the upper structure (see FIG. 45), correct alignment of the blade structures normal to axis 604, correct closing of the blade structures, as seen in FIG. 46, gripping by lower support structure 601, as well as providing other benefits.

Gripping occurs at dovetail shoulders 610 and 611 on base portion 612 of the structure 603, of a thickness the same as that of ribs 608 and 609, and thicker than reduced thickness of the reduced blade plate 613 of 603, supported and stiffened by 608, 609, and 612. See also edge 614 of blade plate 603 which has portions 614*a* and 614*b* extending oppositely from a C-shape, medial or bridging cutting edge 614*c* that receives one half the wire metallic core 616 (see FIG. 44) without cutting into it, as during insulation stripping. Thus edge 614*c* cuts one half the insulation or sheathing 636. Elements 610, 608, 609, and 612 may be integral or of one piece (if metal).

The other or second blade structure (602 for example) defines second shoulders 617a and 618a on ribs 617 and 618, such shoulders also being elongated in directions 606 and 607, and being laterally spaced and opposed to align ribs 617 and 618 with ribs 608 and 609, respectively, during relative structure movement. See aligned ribs in FIG. 46 at time of blade structure maximum closing, shoulder 617a aligning with shoulder 608a, and shoulder 618a aligning with shoulder 609a.

The ribs 617 and 618 are provided on a blade holder 620, which is part of 602 and is downwardly U-shaped, as shown, there being a base 621 integral with 617 and 618. An upper blade plate 622 is riveted at 623 and 624 to the flat section 625 of the holder, section 625 being integral with 617, 618, and 621, i.e., 622 fits between 617a and 618a. Thus, the upper blade plate is stiffened and strengthened by holder 620, to provide support for the downwardly extending legs 622a and 622b of 622 that fit closely between and are guided by rib shoulders 608a and 609a on 603, during closing together of the two blade structures, as seen in FIG. 46.

Upwardly tapering wire guide edges 630 and 631 are provided on the two legs, and they terminate at a C-shaped medial or bridging cutting edge 632 that closes toward corresponding edge 614c to form a circular or oval-shaped opening to receive the uncut wire core during sheathing cutting and stripping. Edge 632 cuts through the remaining one half of the sheathing. See FIGS. 46a and 46b. That oval opening is of minimum diameter greater than wire core diameter, to allow slippage of the core through that opening as during stripping, to remove the sheathing slug, seen at 636a in FIG. 44, off the wire core.

Figure 46A:
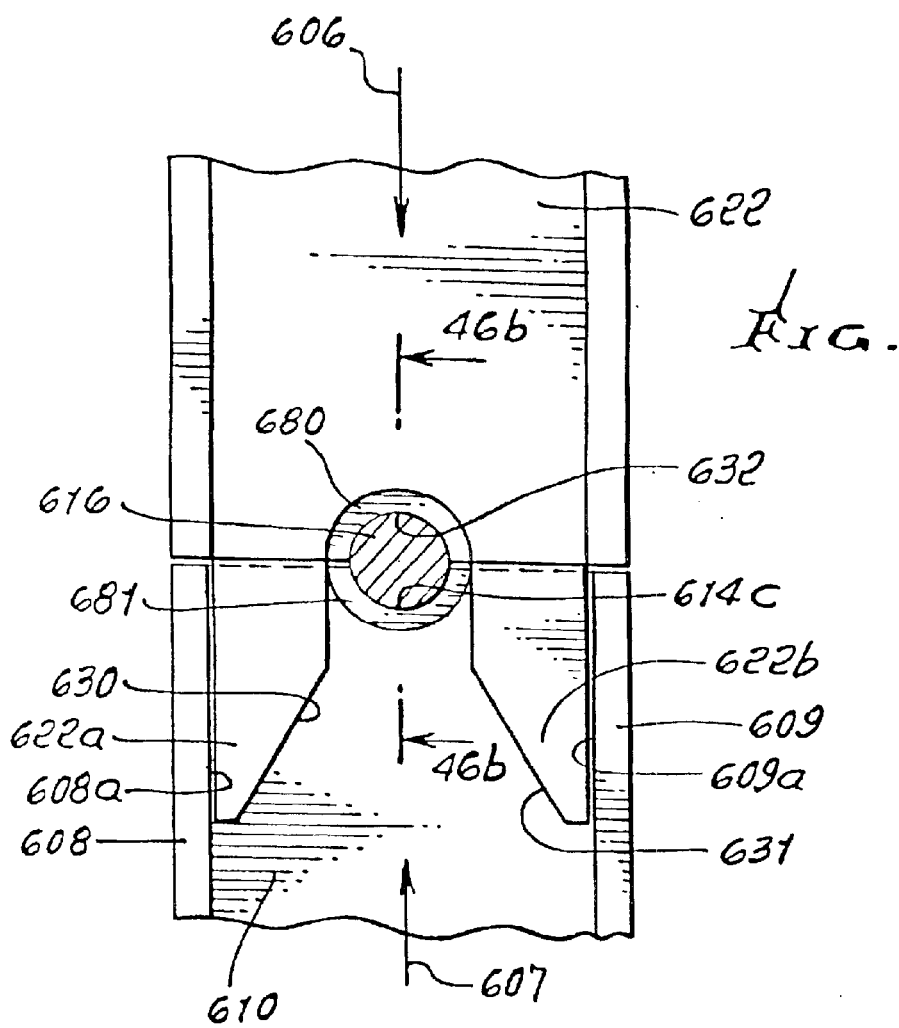
FIG. 46a is an enlarged view showing C-shaped cutting edges cutting sheathing.
Figure 46B:
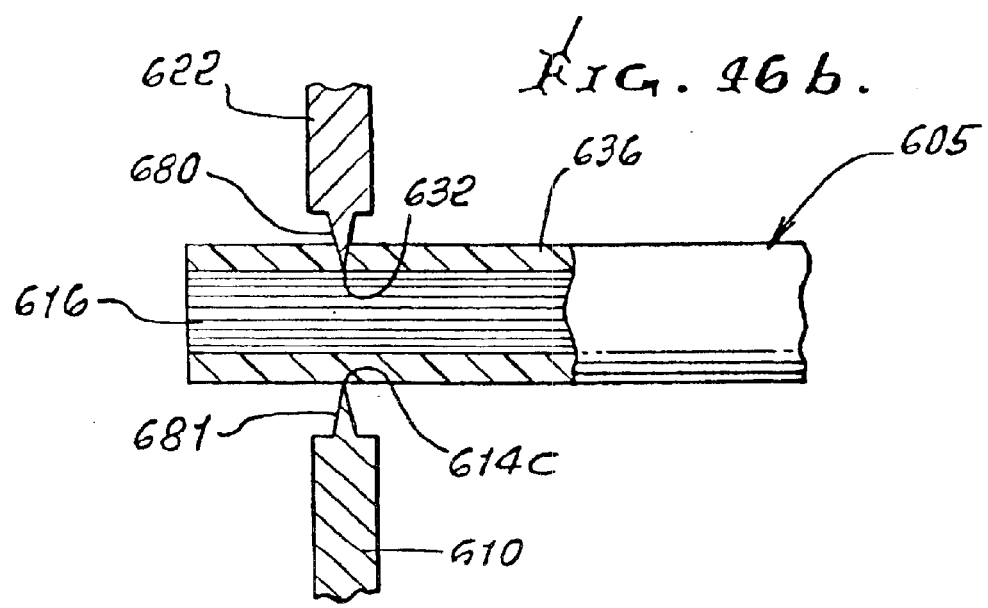
Figure 47:
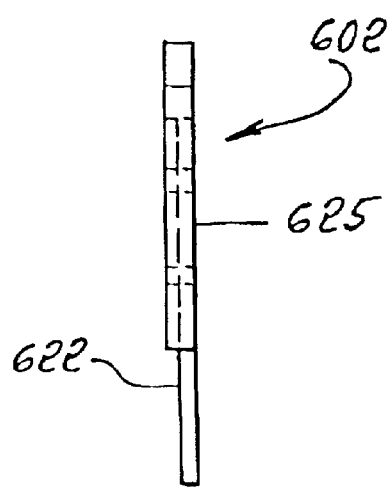
FIG. 47 is an edge view of the overlapping blades of the two blade structures seen in FIG. 46.
Figure 48:
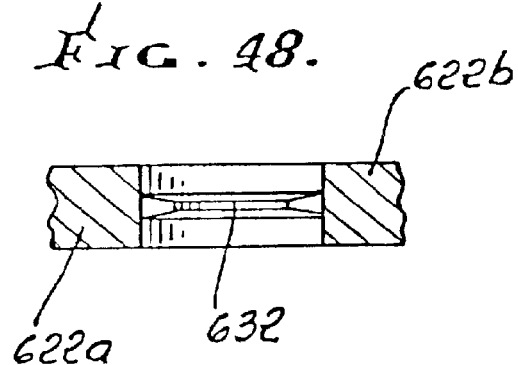
FIG. 48 is a section taken on lines 48—48 of FIG. 45.
Figure 49:
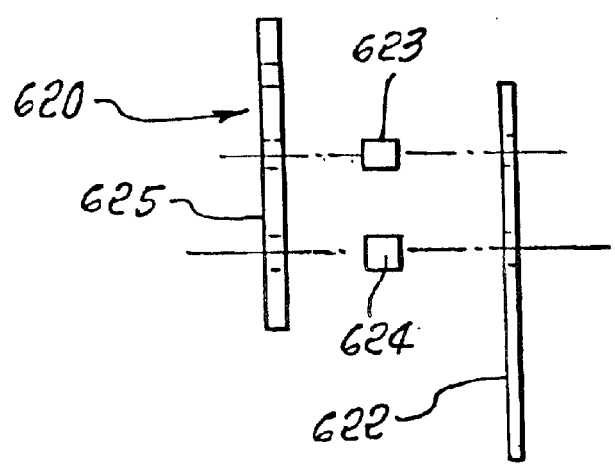
FIG. 49 is an exploded edge view showing a blade and its holder and rivets for interconnecting same.

Note that during closing together of the blade plates, they extend in side-by-side interfitting and overlapping relation, as in FIGS. 46 and 46b; however, the C-shaped edges 614c and 632 are directly opposed, as are their tapered cutting edge bodies 680 and 681, whereby the end faces of the cut sheathing sections are pushed equally, endwise. Base 621 of the holder is thickened and forms dovetailed grip shoulders 650 and 651, with advantages as described above the shoulders 610 and 611.

Figure 51:
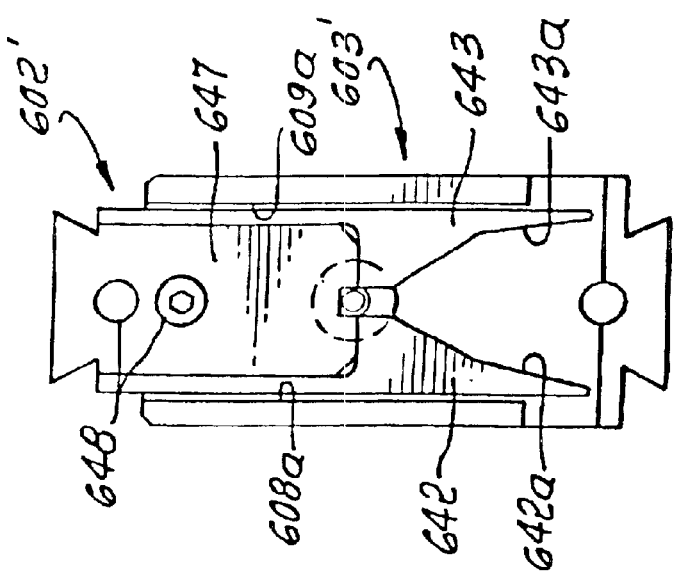
FIG. 51 is a view like FIG. 46 but depicting the modified blade structures of FIG. 50 in closed together condition.
Figure 50:
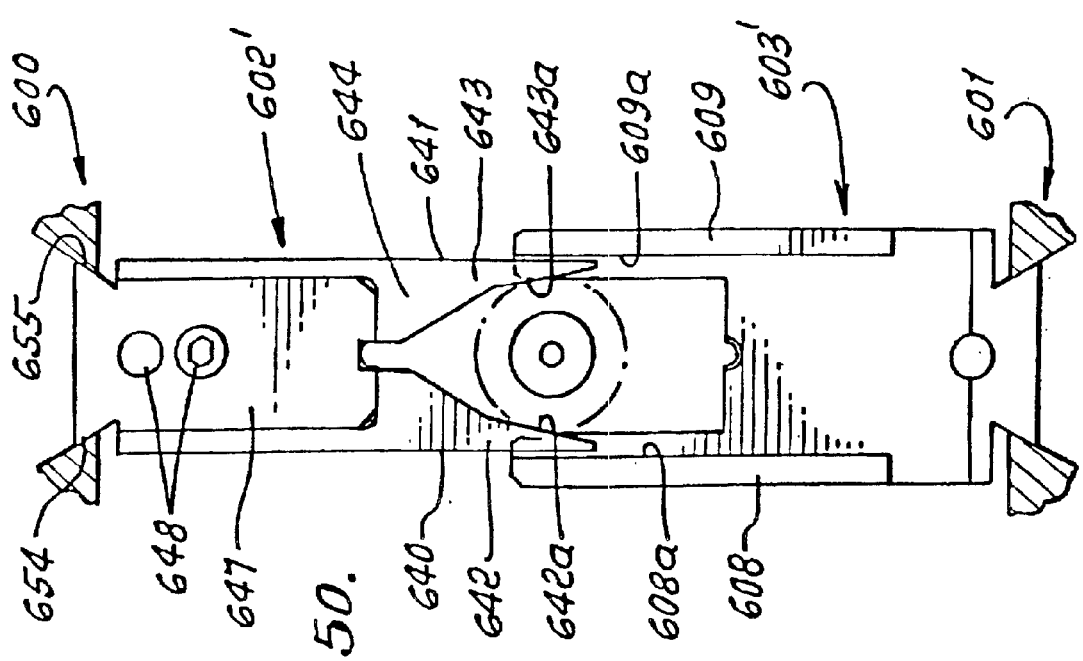
FIG. 50 is a view like FIG. 45 showing a modification.

In the modification seen in FIG. 50, the second shoulders are defined by opposite edges 640 and 641 of the legs 642 and 643 of upper blade plate 644; and shoulders 640 and 641 fit or slide adjacent rib shoulders 608a and 609a on the lower blade structure 603'. Tapered wire guide edges 642a and 643a are formed on legs 642 and 643, and urges the wire toward cutting position, as seen in FIG. 51. The upper blade structure 602' also includes strengthening holder 647 riveted at 648 to the upper blade plate 644, and forming dovetailed retention grip shoulders or edges 654 and 655, with the advantages of shoulders 650 and 651 described above. Gripping of the dovetailed shoulders, in support 600 and 601, proceeds as described in FIGS. 31–33 above.

Figure 43:
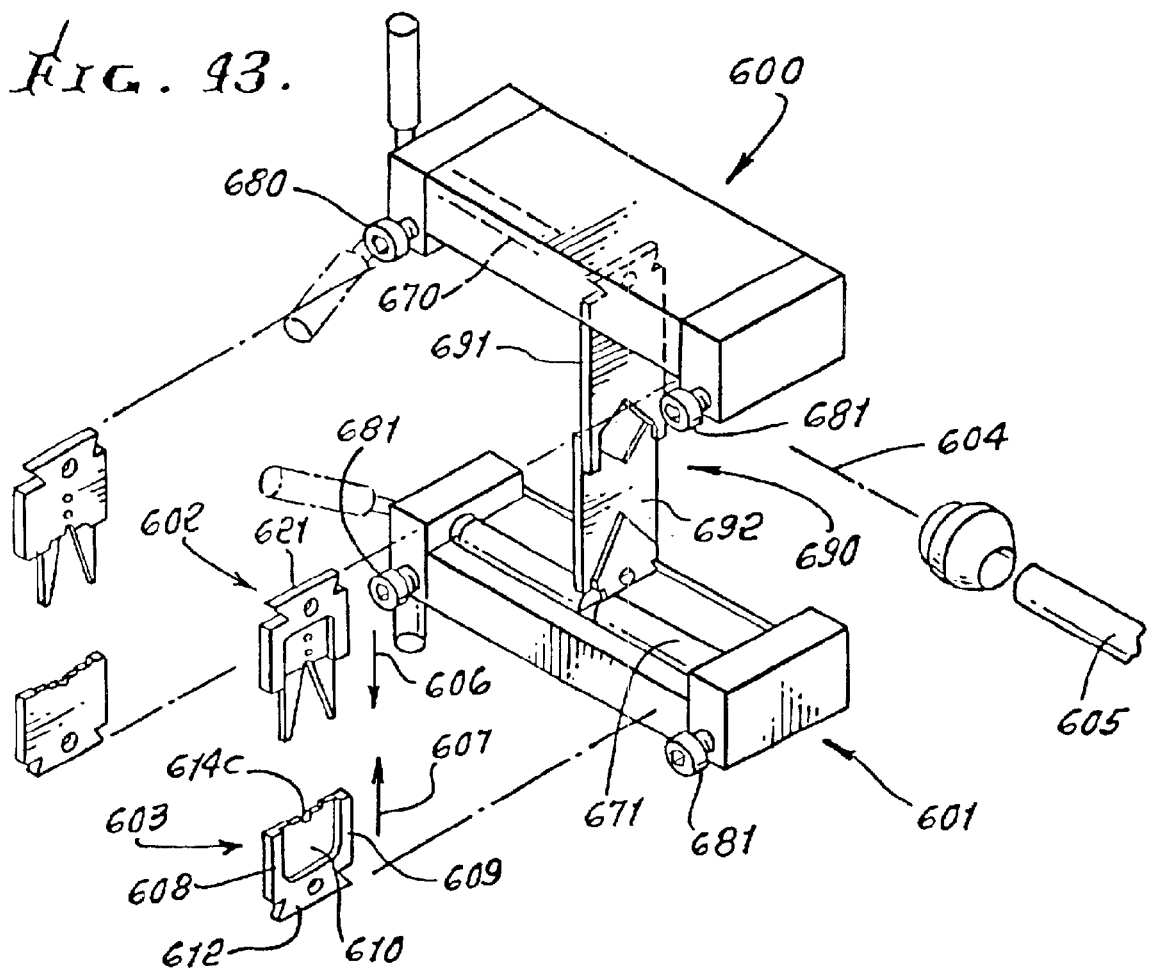
FIG. 43 is a view like FIG. 18 (a) but showing a modification.
Figure 44:
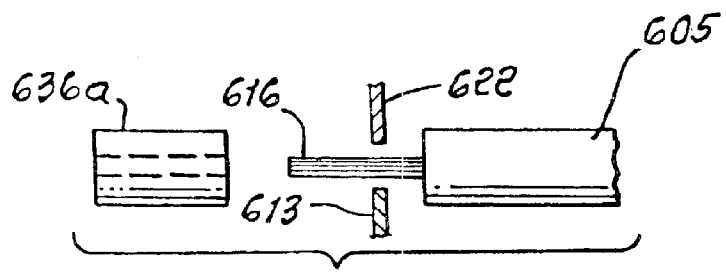
FIG. 44 is an elevation showing a wire sheathing slug removed from an exposed wire core end.

Retainers 670 and 671 in FIG. 43 correspond to retainer 420 in FIGS. 31–33. Handles 673 and 674 enable rotation of 670 and 671 to quickly grip and release the blade structures. Set screws 680 and 681 are adjustable to lock the rotary retainers in position.

Figure 52:
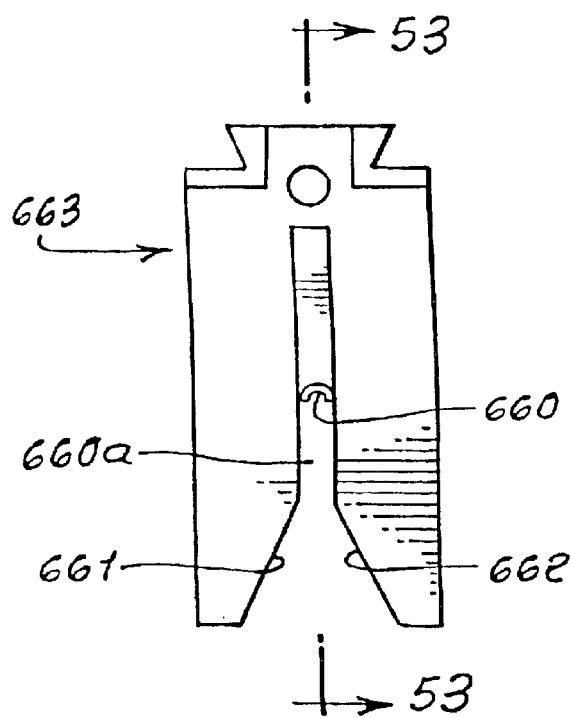
FIG. 52 is an elevation showing a further modified blade structure.

FIG. 52 shows a further modification of an upper blade structure, with C-shaped edge 660 in a medial slot 660a, and above tapered wire guide edges 661 and 662 on the upper blade structure plate 663, otherwise similar to 641.

In FIG. 43, a medial blade set 690 includes upper and lower blades 691 and 692 to cut completely through the wire when the supports are closed toward one another in the manner seen in FIG. 18e or in FIG. 10.

Accordingly, the apparatus provides a first set of multiple of the blade structures at one side of the axis, and a second set of multiple of the blade structures at the opposite side of the axis, the retainer means including a first retainer carried by the support means at one side of the axis for rotary advancement to hold the multiple blade structures of the first set in the fixed position, and for rotary retractions to allow release of the blade structures of the first set.

Also, the retainer means includes a second retainer carried by the support means at the opposite side of the axis for rotary advancement to hold the multiple blade structures of the second set in the fixed position and for rotary retention to allow release of the multiple blade structures of the second set. The multiple blade structure of each set includes two or three of the pairs of blade structures, and typically two, as seen in FIG. 43, with an additional wire severing blade pair intermediate the two stripping pairs of blade structures, as shown.

IMPROVEMENTS OF THE PRESENT INVENTION

Figure 55:
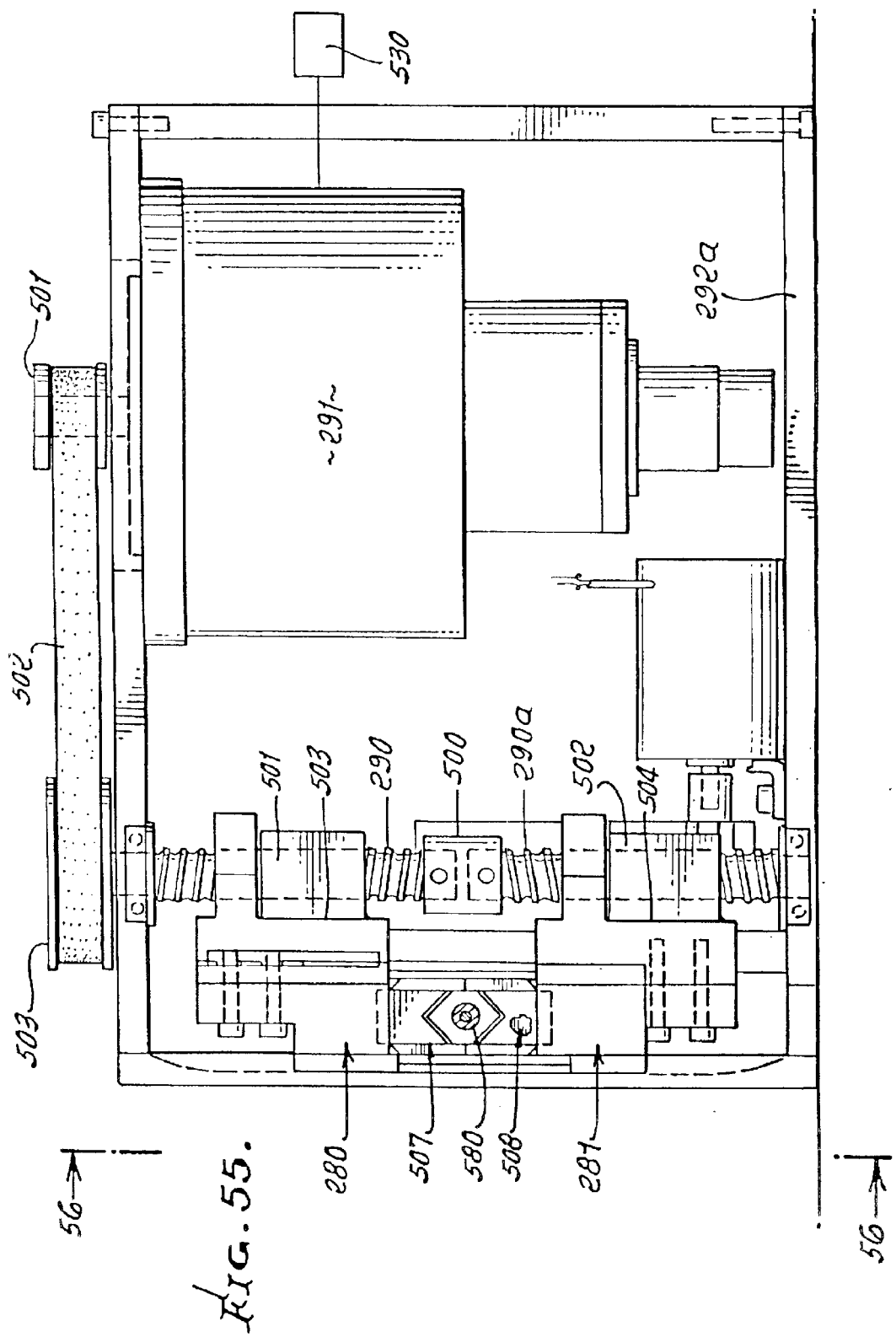
FIG. 55 is a view like FIG. 25 showing wire conveying and processing apparatus as adapted to the improved blade structures of the present invention.
Figure 56:
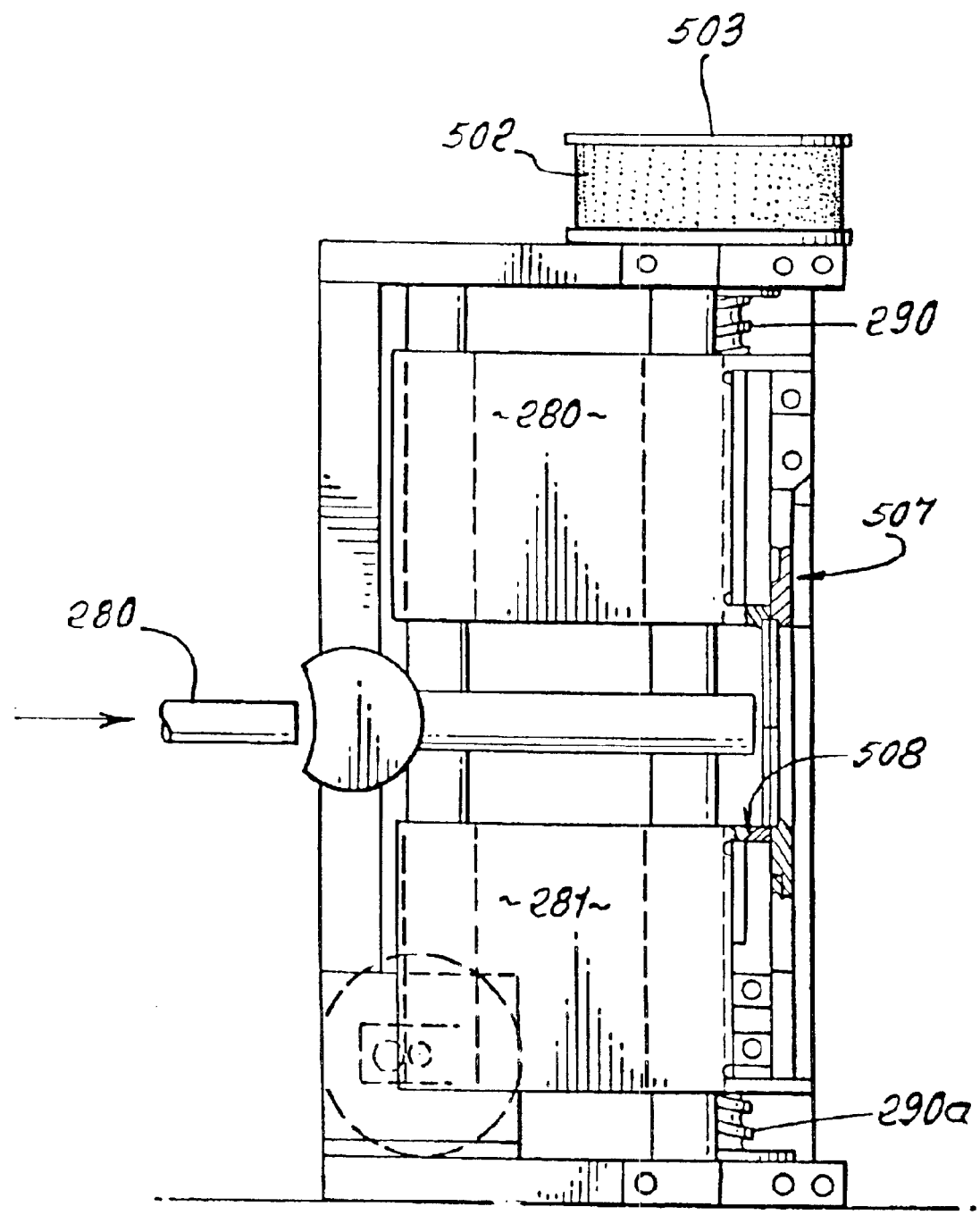
FIG. 56 is an elevation taken on lines 56—56 of FIG. 55, and corresponds generally to FIG. 30.

In FIGS. 55 and 56, elements corresponding to those disclosed above in FIGS. 25 and 30, as well as the other figures, are given the same numbers as previously employed. Drive elements 290 and 290a are coupled together at 500 and oppositely screw threaded as shown to drive the blade holders 280 and 281 endwise oppositely, i.e., toward one another and away from one another, depending upon the direction of rotation of 290 and 290a. Elements 501 and 502 on 290 and 290a engage holders 280 and 281 at surface interengagement loci 503 and 504, to guide holders 280 and 281 accurately, as they travel endwise oppositely.

Multiple blade structures are provided, including at least two such structures 507 and 508 that mutually move adjacent one another (as for example slidably interfit at plane 506) and such two structures move relatively oppositely, toward and away from the axis 515 of the wire or cable 580 being processed. Blade structure cutting edges are indicated at 509 and 510 on structure 507, and at 511 and 512 on structure 508.

Figure 53:
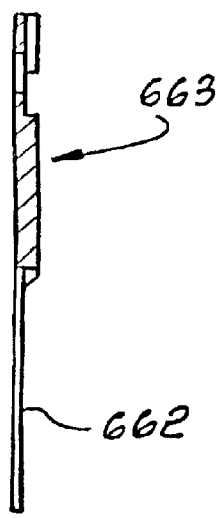
FIG. 53 is an edge view section taken on lines 53—53 of FIG. 52.

FIG. 54a shows the blade structures 507 and 508 in "open" position, i.e., with all cutting edges spaced from the wire 580 being processed; FIG. 54(b) shows the blade structures 507 and 508 moved in directions 520 and 521 into wire cutting positions with cutting edges 510 and 511 overlapping at opposite sides of axis 515; and FIG. 54(c) shows the blade structures 507 and 508 moved in directions 522 and 523 into wire stripping positions, with cutting edges 509 and 512 partially penetrating the wire or cable, i.e., to cut into the wire insulation 580a sufficiently to strip the insulation from wire core 580b when the wire is moved endwise, as described, in detail above. Note in this regard that each of the structures extend at opposite sides of the wire axis; that only two such structures 507 and 508 are employed, each defining a single plane; that the two structure planes extend in parallel relation; that the structures remain in sidewardly overlapping relation during their movements, as is clear from FIG. 54; that cutting blade 510 is on one structure 507, and cutting blade 511 is on the other structure 508; and that stripping blade 509 is on the one structure 507 and stripping blade 512 is on the other structure 508. Consequently, the blade structures and their functioning are very simple, i.e., much simpler than in FIGS. 1–53, since only two moving blade structures are needed.

Accordingly, the invention is characterized in that b) each of the two structures has first and second cutting edges, c) the cutting edges are configured such that, when the two the structures are moved relatively longitudinally in a primary mode, two of the cutting edges cut through the wire, and when the two structures are moved relatively longitudinally in a second mode, the remaining two of the cutting edges cut into the wire sheathing to enable stripping of the sheathing of the wire. Stripping may be completed by relatively axial movement of the wire or cable, as referred to earlier.

Programming means to operate the drive 291, or multiple drives, and the means to drive the wire endwise, as previously described, is indicated at 530 in FIG. 55.

FIGS. 57–59 show the blade structures to include separate blade plates 507a and 507b, 508a and 508b, the plates 507a and 507b carried by frame-type holder 280; and plates 508a and 508b carried by frame-type holder 281. Each separate blade plate has a V-shaped cutting edge, making it much easier to grind that edge than if there were two oppositely facing cutting edges on a one-piece blade structure (i.e., if plates 507a and 507b were integral, for example).

Blades 507a and 507b have endwise interengagement at lateral locus line 535 seen in FIGS. 57 and 59; and plates 508a and 508b have endwise interengagement at lateral locus line 536, as seen in FIGS. 58 and 59. Plate 507a longitudinal edges shown at 560 and 561 in FIG. 57 engage holder 280 frame edges 562 and 563, to locate them laterally; plate 508a longitudinal edges corresponding to 560 and 561 engage holder 281 from edges corresponding to 562 and 563; plate 507b longitudinal edges shown at 560' and 561' also engage holder 280 from edges 562' and 563'; plate 508b longitudinal edges corresponding to 562 and 563 engage holder 281 from edges corresponding to 562' and 563'; and plate lateral edges at 564 and 565 engage holder frame lateral edges at 566 and 567. Frame edges 563 and 563' are on a frame part 583 that is laterally removable in direction 568, to enable easy retrieval and replacement of any one or more of the four plates 507a, 507b, 508a, and 508b.

Accordingly, the invention provides:

a) blade pair means including two blade structures each extending at opposite sides of the wire travel path, b) one or more drive means, c) and other means operatively connected between the drive means and the blade structures, and responsive to operation of the drive means to cause one blade structure to be displaced in direction A toward the wire travel path as the other blade structure is displaced in direction –A, to process the wire, and subsequently to cause one blade structure to be displaced in direction –A, as the other blade structure is displaced in direction A, to process the wire.

Similarly, the method of processing wire in accordance with the invention includes the steps:

a) providing blade pair means including two blade structures each extending at opposite sides of the wire travel path, b) providing drive means, and other means operatively connected between the drive means and the blade structure, c) and operating the one or more drive, means to cause one blade structure to be displaced in direction A toward the path as the other blade structure is displaced in direction –A, to process the wire, and subsequently to cause one blade structure to be displaced in direction –A, as the other blade structure is displaced in direction A, to process the wire.

In FIG. 61, a loader means 600 receives a pair of blades, such as blades 508a and 508b, stacked at 603, with guide edges 601 and 602, to engage and guide blade outer edges, as the blades are advanced leftwardly.

A pusher 604 is shown as having a plunger 604a to push blade edges 508d and 508e, to advance the blades into the holder 281 referred to above, i.e., into space 606 in that holder.

In FIG. 62, two blade structures 610 and 611, with blades 610a and 610b, and 611a and 611b, correspond to structures 508 and 507, with blades 508a and 508b, and 507a and 507b, respectively, as referred to above. First and second cutting edges 610aa and 610bb of structure 610 have different configurations; and first and second cutting edges 611aa and 611bb of other structure 611 have different configurations. However, the first cutting edge 610aa and second cutting edge 611bb have the same, or substantially the same, configuration; and the second cutting edge 610bb and first cutting edge 611aa also have the same or substantially the same configurations. For example, edges 610aa and 610bb have C-shape $C_1$; and the edges 610bb and 611aa have C-shape $C_2$, wherein $C_1$ is larger tha $C_2$.

Structure 610 and 611 are adjacent one another in operation. Thus, when 610 is moved down and 611 is moved up, edges 610aa and 611bb can sever a wire, if such movement is great enough; or they can penetrate into and strip insulation off a first wire or cable of diameter $D_1$; and when 610 is moved up and 611 is moved down, edges 610bb and 611cc can penetrate into and strip insulation off a second wire or cable of diameter $D_2$; and first and second insulation $D_1$ and $D_2$ can be on the same wire.

Since blades are characterized as "die types" blades, useful for stripping coaxial cables, and the loader described above, enables their quick replacement with blades of other cutting edge sizes. Very long strip lengths are enabled, for full removal of long strips. Soft wire control at 700 allows quick selection and loading of different blades.

I claim:

1. An apparatus for processing wire, comprising:

a) conveyors for displacing the wire endwise, said conveyors including first upper and lower endless conveyors engageable with opposite sides of the wire, b) and wherein the conveyors include second upper and lower endless conveyors engageable with opposite sides of the wire, and spaced from said first upper and lower conveyors in the direction of wire displacement, and wire cutting blades located between said first conveyors and said second conveyors, c) and wherein said conveyors have the form of endless belts having stretches extending in the direction of the wire displacement at opposite sides of the wire, d) first upper and lower assemblies for carrying and controllably driving said first conveyors, e) at least one timing belt operatively connected with at least one of said assemblies to effectively transmit rotary drive to said first conveyors via said at least one assembly, f) said at least one assembly including at least one driven timing pulley on which said at least one timing belt is entrained.

2. The apparatus, as defined in claim 1, comprising:

g) said first upper and lower assemblies carrying and controllable driving said first upper and lower endless conveyors, h) and a frame including a guide on which at least one of said assemblies is supported and guided for relative movement toward and away from the assembly.

3. The apparatus, as defined in claim 1, comprising:
g) said first upper and lower assemblies carrying and controllably driving said first upper and lower endless conveyors,
h) and second upper and lower assemblies for carrying and controllable driving said second upper and lower endless conveyors.

4. The apparatus, as defined in claim 1, comprising:
g) said first upper and lower assemblies carrying and controllably driving said first upper and lower endless conveyors,
h) a frame including at least one guide supporting at least one of said first assemblies for guided movement toward and away from the other assembly,
i) second upper and lower assemblines for carrying and controllably driving said second upper and lower endless conveyors.

5. The apparatus, as defined in claim 1, comprising:
g) said first upper and lower assemblies carrying and controllably driving said first upper and lower endless conveyers,
h) a frame including at least one guide supporting at least one of said first assemblies for guided movement toward and away from the other assembly,
i) a force exerter for exerting yieldable force to urge at least one of said first conveyors toward the other and the toward the wire,
j) there being second upper and lower assemblies for carrying and controllably driving said second upper and lower endless conveyors.

6. The apparatus, as defined in claim 1, comprising:
g) said upper and lower assemblies carrying and controllably driving said upper and lower endless conveyors.

7. The apparatus, as defined in claim 1, comprising:
g) said first upper and lower assemblies carrying and controllably driving said first upper and lower endless conveyers,
h) a frame including at least one guide supporting and least one of said first assemblies for guided movement toward and away from the other assembly,
i) and at least one spring for exerting yieldable force to urge at least one of said first conveyors toward the other and toward the wire.

8. An apparatus for processing wire, comprising:
a) conveyors for displacing the wire endwise said conveyors including first upper and lower endless conveyors engageable with opposite sides of the wire,
b) and wherein the conveyors include second upper and lower endless conveyors engageable with opposite sides of the wire, and spaced from said first upper and lower conveyors in the direction of wire displacement, and wire cutting blades located between said first conveyors and said second conveyors,
c) and wherein said conveyors have the form of endless belts having stretches extending in the direction of the wire displacement at opposite sides of the wire,
d) first upper and lower assemblies for carrying and controllably driving said first conveyors,
e) at least one time belt operatively connected with at least one of said first conveyors via said at least on assembly,
f) said at least one assembly including at least one driven timing pulley on which said at least one timing belt is entrained,
g) said at least one assembly including at least one drive motor, at least one driving timing pulley operatively connected with said at least one drive motor to be driven thereby, and said at least one timing belt being entrained on said at least one driving timing pulley.

9. An apparatus for processing wire, comprising:
a) conveyors for displacing the wire endwise, said conveyors including first upper and lower endless conveyors engageable with opposite sides of the wire,
b) and wherein the conveyors include second upper and lower endless conveyors engageable with opposite sides of the wire, and spaced from said first upper and lower conveyors in the direction of wire displacement, and wire cutting blades located between said first conveyors and said second conveyors,
c) and wherein said conveyors have the form of endless belts having stretches extending in the direction of the wire displacement at opposite sides of the wire,
d) first upper and lower assemblies for carrying and controllably driving said first conveyors,
e) at least one timing belt operatively connected with at least one first assembly to effectively transmit rotary drive to said first conveyors via said at least one first assembly,
f) said at least one first assembly including at least one driven timing pulley on which said at least one timing belt is entrained,
g) at least one first drive motor, at least one driving timing pulley operatively connected with said at least one first drive motor to be driven thereby, and said at least one timing belt being entrained on said at least one driving timing pulley,
h) and second upper and lower assemblies for carrying and controllably driving said second upper and lower endless conveyors.

10. An apparatus for processing wire, comprising:
a) conveyors for displacing the wire endwise, said conveyors including first upper and lower endless conveyors engageable with opposite sides of the wire,
b) and wherein the conveyors include second upper and lower endless conveyors engageable with opposite sides of the wire, and spaced from said first upper and lower conveyors in the direction of wire displacement, and wire cutting blades located between said first conveyors and said second conveyors,
c) and wherein said conveyors have the form of endless belts having stretches extending in the direction of the wire displacement at opposite sides of the wire,
d) first upper and lower assemblies for carrying and controllably driving said first upper and lower endless conveyors,
e) at least one first drive motor operatively connected with at least one of said first assemblies to drive said first upper and lower endless conveyors,
f) second upper and lower assemblies for carrying and controllably driving said second upper and lower endless conveyors,
g) at least one second drive motor operatively connected with at least one of said second assemblies to drive said second upper and lower endless conveyors,
h) at least one timing belt operatively connected with at least one of said assemblies to effectively transmit rotary drive to said first conveyors via said at least one assembly,
i) said at least one assembly including at least one driven timing pulley on which said at least on timing belt is entrained.

11. An apparatus for processing wire, comprising:

a) conveyors for displacing the wire endwise, said conveyors including first upper and lower endless conveyors engageable with opposite sides of the wire, b) and wherein the conveyors include second upper and lower endless conveyors engageable with opposite sides of the wire, and spaced from said first upper and lower conveyors in the direction of wire displacement, and wire cutting blades located between said first conveyors and said second conveyors, c) and wherein said conveyors have the form of endless belts having stretches extending in the direction of the wire displacement at opposite sides of the wire, d) first upper and lower assemblies for carrying and controllably driving said first conveyors, e) at least one timing belt operatively connected with at least one first assembly to effectively transmit rotary drive to said first conveyors via said at least one first assembly, f) said at least one first assembly including at least one driven timing pulley on which said at least one timing belt is entrained, g) said at least one first assembly including at least one first drive motor, at least one driving timing pulley operatively connected with said at least one first drive motor to be driven thereby, and said at least one timing belt being entrained on said at least one driving timing pulley, h) and second upper and lower assemblies for carrying the controllably driving said second upper and lower endless conveyors.

* * * * *

UNITED STATES PATENT AND TRADEMARK OFFICE
CERTIFICATE OF CORRECTION

PATENT NO. : 6,854,177 B2  Page 1 of 1
DATED : February 15, 2005
INVENTOR(S) : Jack L. Hoffa It is certified that error appears in the above-identified patent and that said Letters Patent is hereby corrected as shown below:

<u>Column 4,</u>
Line 39, "DETAILED DESCRIPTION OF BACKGROUND APPARATUS AND METHOD DISCLOSED IN U.S. Ser.No.08/022,981 AND U.S. Ser.08/148,568" should read -- DETAILED DESCRIPTION --.

Signed and Sealed this

Twenty-fifth Day of April, 2006

JON W. DUDAS
*Director of the United States Patent and Trademark Office*